US011431962B2

(12) United States Patent
Berliner et al.

(10) Patent No.: US 11,431,962 B2
(45) Date of Patent: Aug. 30, 2022

(54) ANALOG MODULATED VIDEO TRANSMISSION WITH VARIABLE SYMBOL RATE

(71) Applicant: QUALCOMM Incorporated, San Diego, CA (US)

(72) Inventors: Ran Berliner, Kfar-Aviv (IL); Roman Budilovsky, Lod (IL); Yehonatan Dallal, Kfar Saba (IL); Shay Landis, Hod Hasharon (IL)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/137,080

(22) Filed: Dec. 29, 2020

(65) Prior Publication Data
US 2022/0210401 A1 Jun. 30, 2022

(51) Int. Cl.
*H04N 19/105* (2014.01)
*H04N 19/176* (2014.01)
*H04L 27/04* (2006.01)
*H04N 19/124* (2014.01)

(52) U.S. Cl.
CPC ........... *H04N 19/105* (2014.11); *H04L 27/04* (2013.01); *H04N 19/124* (2014.11); *H04N 19/176* (2014.11)

(58) Field of Classification Search
None
See application file for complete search history.

(56) References Cited

U.S. PATENT DOCUMENTS

| 2002/0116184 A1 | 8/2002 | Gottsman et al. |
| 2002/0186783 A1 | 12/2002 | Opas et al. |
| 2009/0281811 A1 | 11/2009 | Oshikiri et al. |

(Continued)

FOREIGN PATENT DOCUMENTS

| WO | 9113506 A1 | 9/1991 |
| WO | 2019218269 A1 | 11/2019 |

OTHER PUBLICATIONS

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 Pages.

(Continued)

*Primary Examiner* — Chikaodili E Anyikire
(74) *Attorney, Agent, or Firm* — Shumaker & Sieffert, P.A.

(57) ABSTRACT

A method of encoding video data comprising: generating coefficients based on digital sample values of the video data; determining a spectral efficiency for a channel; determining a value n based on the spectral efficiency of the channel; generating coefficient vectors, wherein each of the coefficient vectors includes n of the coefficients; determining an amplitude value for a coefficient vector based on a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values, and modulating an analog signal based on the amplitude values.

30 Claims, 22 Drawing Sheets

(56) References Cited

U.S. PATENT DOCUMENTS

| | | |
|---|---|---|
| 2014/0153660 A1 | 6/2014 | Vaman |
| 2015/0009410 A1 | 1/2015 | Ikushima et al. |
| 2018/0098069 A1 | 4/2018 | Ueki et al. |
| 2018/0152205 A1 | 5/2018 | Kim et al. |
| 2019/0141316 A1 | 5/2019 | Lan et al. |
| 2019/0305868 A1 | 10/2019 | Myung et al. |
| 2019/0372822 A1 | 12/2019 | Woodsum |
| 2020/0313744 A1 | 10/2020 | Hindy et al. |
| 2021/0194559 A1 | 6/2021 | Li et al. |

OTHER PUBLICATIONS

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

International Search Report and Written Opinion of International Application No. PCT/US2021/057603, dated Mar. 16, 2022, 14 pp.

Jakubczak et al., "A Cross-Layer Design for Scalable Mobile Video", ACM 2012 Conference on Computer Supported Cooperative Work Companion, CSCW' 12, ACM, USA, Sep. 19, 2011 (Sep. 19, 2011), pp. 289-300, XP058600591, DOI: 10.1145/2030613.2030646 ISBN: 978-1-4503-1051-2.

Tan; Bin et al. "An Optimal Resource Allocation for Superposition Coding-Based Hybrid Digital-Analog System", IEEE Internet of Things Journal, vol. 4, No. 4, Aug. 1, 2017 (Aug. 1, 2017), pp. 945-956, XP055413227, DOI: 10.11 09/JIOT.2017.2680407.

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 15 | 197 | 198 | 201 | 202 | 205 | 206 | 209 | 210 | 213 | 214 | 217 | 218 | 221 | 222 | 225 | 226 |
| 14 | 196 | 199 | 200 | 203 | 204 | 207 | 208 | 211 | 212 | 215 | 216 | 219 | 220 | 223 | 224 | 227 |
| 13 | 195 | 192 | 191 | 188 | 187 | 184 | 183 | 180 | 179 | 176 | 175 | 172 | 171 | 170 | 229 | 228 |
| 12 | 194 | 193 | 190 | 189 | 186 | 185 | 182 | 181 | 178 | 177 | 174 | 173 | 168 | 169 | 230 | 231 |
| 11 | 101 | 102 | 105 | 106 | 109 | 110 | 113 | 114 | 117 | 118 | 121 | 122 | 167 | 166 | 233 | 232 |
| 10 | 100 | 103 | 104 | 107 | 108 | 111 | 112 | 115 | 116 | 119 | 120 | 123 | 164 | 165 | 234 | 235 |
| 9 | 99 | 96 | 95 | 92 | 91 | 88 | 87 | 84 | 83 | 82 | 125 | 124 | 163 | 162 | 237 | 236 |
| 8 | 98 | 97 | 94 | 93 | 90 | 89 | 86 | 85 | 80 | 81 | 126 | 127 | 160 | 161 | 238 | 239 |
| 7 | 37 | 38 | 41 | 42 | 45 | 46 | 49 | 50 | 79 | 78 | 129 | 128 | 159 | 158 | 241 | 240 |
| 6 | 36 | 39 | 40 | 43 | 44 | 47 | 48 | 51 | 76 | 77 | 130 | 131 | 156 | 157 | 242 | 243 |
| 5 | 35 | 32 | 31 | 28 | 27 | 26 | 53 | 52 | 75 | 74 | 133 | 132 | 155 | 154 | 245 | 244 |
| 4 | 34 | 33 | 30 | 29 | 24 | 25 | 54 | 55 | 72 | 73 | 134 | 135 | 152 | 153 | 246 | 247 |
| 3 | 5 | 6 | 9 | 10 | 23 | 22 | 57 | 56 | 71 | 70 | 137 | 136 | 151 | 150 | 249 | 248 |
| 2 | 4 | 7 | 8 | 11 | 20 | 21 | 58 | 59 | 68 | 69 | 138 | 139 | 148 | 149 | 250 | 251 |
| 1 | 3 | 2 | 13 | 12 | 19 | 18 | 61 | 60 | 67 | 66 | 141 | 140 | 147 | 146 | 253 | 252 |
| 0 | 0 | 1 | 14 | 15 | 16 | 17 | 62 | 63 | 64 | 65 | 142 | 143 | 144 | 145 | 254 | 255 |

FIG. 10

| -106 | -107 | -108 | -109 | -110 | -111 | -112 | 85 | 86 | 87 | 88 | 89 | 90 | 91 | 92 | 7 |
|---|---|---|---|---|---|---|---|---|---|---|---|---|---|---|---|
| -105 | -66 | -65 | -64 | -63 | -62 | -61 | 84 | 83 | 82 | 81 | 80 | 79 | 78 | 93 | 6 |
| -104 | -67 | -56 | -57 | -58 | -59 | -60 | 41 | 42 | 43 | 44 | 45 | 46 | 77 | 94 | 5 |
| -103 | -68 | -55 | -28 | -27 | -26 | -25 | 40 | 39 | 38 | 37 | 36 | 47 | 76 | 95 | 4 |
| -102 | -69 | -54 | -29 | -22 | -23 | -24 | 13 | 14 | 15 | 16 | 35 | 48 | 75 | 96 | 3 |
| -101 | -70 | -53 | -30 | -21 | -6 | -5 | 12 | 11 | 10 | 17 | 34 | 49 | 74 | 97 | 2 |
| -100 | -71 | -52 | -31 | -20 | -7 | -4 | 1 | 2 | 9 | 18 | 33 | 50 | 73 | 98 | 1 |
| -99 | -72 | -51 | -32 | -19 | -8 | -3 | 0 | 3 | 8 | 19 | 32 | 51 | 72 | 99 | 0 |
| -98 | -73 | -50 | -33 | -18 | -9 | -2 | -1 | 4 | 7 | 20 | 31 | 52 | 71 | 100 | -1 |
| -97 | -74 | -49 | -34 | -17 | -10 | -11 | -12 | 5 | 6 | 21 | 30 | 53 | 70 | 101 | -2 |
| -96 | -75 | -48 | -35 | -16 | -15 | -14 | -13 | 24 | 23 | 22 | 29 | 54 | 69 | 102 | -3 |
| -95 | -76 | -47 | -36 | -37 | -38 | -39 | -40 | 25 | 26 | 27 | 28 | 55 | 68 | 103 | -4 |
| -94 | -77 | -46 | -45 | -44 | -43 | -42 | -41 | 60 | 59 | 58 | 57 | 56 | 67 | 104 | -5 |
| -93 | -78 | -79 | -80 | -81 | -82 | -83 | -84 | 61 | 62 | 63 | 64 | 65 | 66 | 105 | -6 |
| -92 | -91 | -90 | -89 | -88 | -87 | -86 | -85 | 112 | 111 | 110 | 109 | 108 | 107 | 106 | -7 |
| -7 | -6 | -5 | -4 | -3 | -2 | -1 | 0 | 1 | 2 | 3 | 4 | 5 | 6 | 7 | |

FIG. 12

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 15 | 87 | 88 | 93 | 94 | 99 | 100 | 105 | 106 | 111 | 112 | 117 | 118 | 125 | 126 | 127 | 128 |
| 14 | 86 | 89 | 92 | 95 | 98 | 101 | 104 | 107 | 110 | 113 | 116 | 119 | 124 | 123 | -100 | -101 |
| 13 | 85 | 90 | 91 | 96 | 97 | 102 | 103 | 108 | 109 | 114 | 115 | 120 | 121 | 122 | -99 | -102 |
| 12 | 84 | 81 | 80 | 77 | 76 | 73 | 72 | 69 | 68 | 67 | 66 | 65 | -96 | -97 | -98 | -103 |
| 11 | 83 | 82 | 79 | 78 | 75 | 74 | 71 | 70 | 61 | 62 | 63 | 64 | -95 | -94 | -105 | -104 |
| 10 | 42 | 43 | 46 | 47 | 50 | 51 | 54 | 55 | 60 | 59 | -52 | -53 | -92 | -93 | -106 | -107 |
| 9 | 41 | 44 | 45 | 48 | 49 | 52 | 53 | 56 | 57 | 58 | -51 | -54 | -91 | -90 | -109 | -108 |
| 8 | 40 | 37 | 36 | 33 | 32 | 31 | 30 | 29 | -48 | -49 | -50 | -55 | -88 | -89 | -110 | -111 |
| 7 | 39 | 38 | 35 | 34 | 25 | 26 | 27 | 28 | -47 | -46 | -57 | -56 | -87 | -86 | -113 | -112 |
| 6 | 14 | 15 | 18 | 19 | 24 | 23 | -20 | -21 | -44 | -45 | -58 | -59 | -84 | -85 | -114 | -115 |
| 5 | 13 | 16 | 17 | 20 | 21 | 22 | -19 | -22 | -43 | -42 | -61 | -60 | -83 | -82 | -117 | -116 |
| 4 | 12 | 11 | 10 | 9 | -16 | -17 | -18 | -23 | -40 | -41 | -62 | -63 | -80 | -81 | -118 | -119 |
| 3 | 5 | 6 | 7 | 8 | -15 | -14 | -25 | -24 | -39 | -38 | -65 | -64 | -79 | -78 | -121 | -120 |
| 2 | 4 | 3 | -4 | -5 | -12 | -13 | -26 | -27 | -36 | -37 | -66 | -67 | -76 | -77 | -122 | -123 |
| 1 | 1 | 2 | -3 | -6 | -11 | -10 | -29 | -28 | -35 | -34 | -69 | -68 | -75 | -74 | -125 | -124 |
| 0 | 0 | -1 | -2 | -7 | -8 | -9 | -30 | -31 | -32 | -33 | -70 | -71 | -72 | -73 | -126 | -127 |

FIG. 14

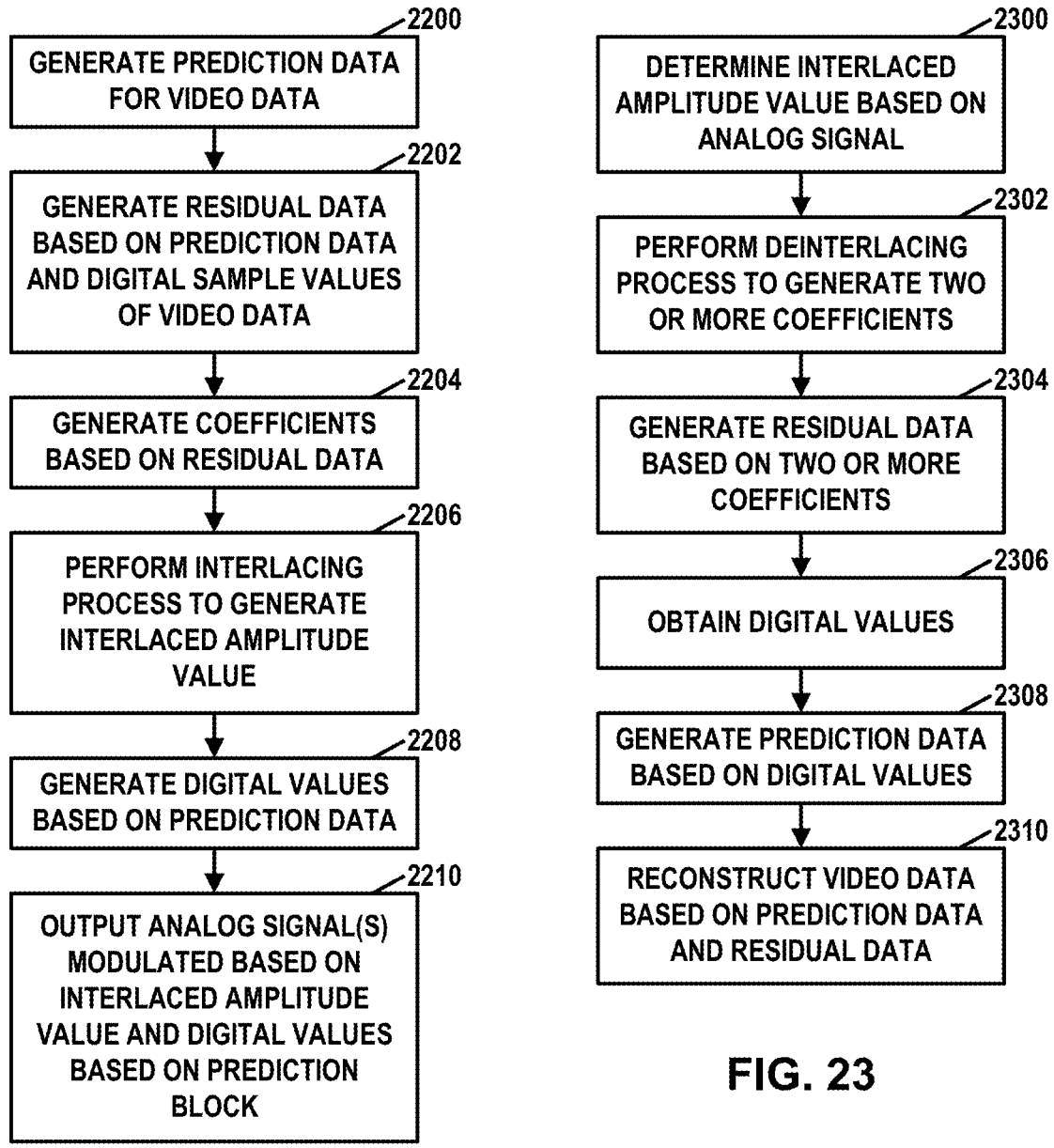

ANALOG MODULATED VIDEO TRANSMISSION WITH VARIABLE SYMBOL RATE

TECHNICAL FIELD

This disclosure relates to video encoding and decoding.

BACKGROUND

The ability to send and receive high-quality video data is one of the compelling use-cases for deployment of advanced wireless networks, such as Fifth Generation (5G) wireless networks. For example, 5G wireless networks and beyond may enable streaming of high-quality video of live events, teleconferencing, and so on. In some instances, a user device may encode video data and then use a radio system to transmit the encoded video data to a wireless base station. The wireless base station, in turn, may route the encoded video data through a network, such as the Internet, to a destination device.

Even with the high bandwidth capabilities of advanced wireless networks, devices may need to encode video data prior to transmission of the video data. However, modern video coding standards may involve consumption of considerable amounts of power, which may be in limited supply on mobile devices, such as smartphones and tablets.

SUMMARY

This disclosure describes techniques for encoding and decoding video data. As described herein, a video encoder may perform hybrid digital-analog modulation for transmission of video data. When performing hybrid digital-analog modulation for transmission of video data, the video encoder may transmit digital data and an analog signal. A video decoder uses both the digital data and analog signal to reconstruct the video data. The use of hybrid digital-analog modulation may provide compression for the video data while potentially using less power or other resources than digital video codecs.

In one example, this disclosure describes a method of encoding video data, the method comprising: generating coefficients based on the video data; generating coefficient vectors, wherein each of the coefficient vectors includes n of the coefficients; for each of the coefficient vectors, determining an amplitude value for the coefficient vector based on a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values; modulating an analog signal based on the amplitude values for the coefficient vectors; and outputting the analog signal.

In another example, this disclosure describes a method of decoding video data, the method comprising: determining, based on an analog signal, amplitude values for a plurality of coefficient vectors; for each of the coefficient vectors, determining coefficients in the coefficient vector based on the amplitude value for the coefficient vector and a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values; and generating the video data based on the coefficients in the coefficient vectors.

In another example, this disclosure describes a device for encoding video data, the device comprising: one or more processors implemented in circuitry, the one or more processors configured to: generate coefficients based on video data; generate coefficient vectors, wherein each of the coefficient vectors includes n of the coefficients; and for each of the coefficient vectors, determine an amplitude value for the coefficient vector based on a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values; and a modem configured to modulate an analog signal based on the amplitude values for the coefficient vectors.

In another example, this disclosure describes a device for decoding video data, the device comprising: a modem configured to receive an analog signal; and one or more processors implemented in circuitry, the one or more processors configured to: determine, based on the analog signal, amplitude values for a plurality of coefficient vectors; for each of the coefficient vectors, determine coefficients in the coefficient vector based on the amplitude value for the coefficient vector and a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values; and generate video data based on the coefficients in the coefficient vectors.

In another example, this disclosure describes a device for encoding video data, the device comprising: means for generating coefficients based on video data; means for generating coefficient vectors, wherein each of the coefficient vectors includes n of the coefficients; for each of the coefficient vectors, means for determining an amplitude value for the coefficient vector based on a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values; and means for modulating an analog signal based on the amplitude values for the coefficient vectors.

In another example, this disclosure describes a device for decoding video data, the device comprising: means for determining, based on an analog signal, amplitude values for a plurality of coefficient vectors; for each of the coefficient vectors, means for determining coefficients in the coefficient vector based on the amplitude value for the coefficient vector and a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values; and means for generating video data based on the coefficients in the coefficient vectors.

In another example, this disclosure describes a computer-readable data storage medium having instructions stored thereon that, when executed, cause one or more processors to: generate coefficients based on video data; generate coefficient vectors, wherein each of the coefficient vectors includes n of the coefficients; for each of the coefficient vectors, determine an amplitude value for the coefficient vector based on a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values; and modulate an analog signal based on the amplitude values for the coefficient vectors.

In another example, this disclosure describes a computer-readable data storage medium having instructions stored thereon that, when executed, cause one or more processors to: determine, based on an analog signal, amplitude values for a plurality of coefficient vectors; for each of the coefficient vectors, determine coefficients in the coefficient vector based on the amplitude value for the coefficient vector and a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values; and generate video data based on the coefficients in the coefficient vectors.

In another example, this disclosure describes a method of encoding video data, the method comprising: generating coefficients based on digital sample values of the video data; determining a spectral efficiency for a channel on which to send an analog signal; determining a value n based on the spectral efficiency of the channel; generating coefficient vectors, wherein each of the coefficient vectors includes n of the coefficients; for each of the coefficient vectors, determining an amplitude value for the coefficient vector based on a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values, and modulating the analog signal based on the amplitude values for the coefficient vectors; and outputting the analog signal on the channel.

In another example, this disclosure describes a method of decoding video data, the method comprising: receiving an analog signal that was transmitted via a channel; demodulating the analog signal to determine amplitude values for a plurality of coefficient vectors; determining a value n, wherein the value n is based on the spectral efficiency of the channel; for each of the coefficient vectors, determining coefficients in the coefficient vector based on the amplitude value for the coefficient vector and a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values; and generating the video data based on the coefficients in the coefficient vectors.

In another example, this disclosure describes a device for encoding video data, the device comprising: a memory configured to store the video data; one or more processors implemented in circuitry, the one or more processors configured to: generate coefficients based on digital sample values of the video data; determine a spectral efficiency for a channel on which to output an analog signal; determine a value n based on the spectral efficiency of the channel; generate coefficient vectors, wherein each of the coefficient vectors includes n of the coefficients; for each of the coefficient vectors, determine an amplitude value for the coefficient vector based on a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values, and modulate the analog signal based on the amplitude values for the coefficient vectors; and a modem configured to output the analog signal on the channel.

In another example, this disclosure describes a device for decoding video data, the device comprising: a modem configured to receive an analog signal that was transmitted via a channel; one or more processors implemented in circuitry, the one or more processors configured to: demodulate the analog signal to determine amplitude values for a plurality of coefficient vectors; determine a value n, wherein the value n is based on the spectral efficiency of the channel; for each of the coefficient vectors, determine coefficients in the coefficient vector based on the amplitude value for the coefficient vector and a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values; and generate the video data based on the coefficients in the coefficient vectors.

In another example, this disclosure describes a device for encoding video data, the device comprising: means for generating coefficients based on digital sample values of the video data; means for determining a spectral efficiency for a channel on which to output an analog signal; means for determining a value n based on the spectral efficiency of the channel; means for generating coefficient vectors, wherein each of the coefficient vectors includes n of the coefficients; for each of the coefficient vectors, means for determining an amplitude value for the coefficient vector based on a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values, and means for modulating the analog signal based on the amplitude values for the coefficient vectors; and means for outputting the analog signal on the channel.

In another example, this disclosure describes a device for decoding video data, the device comprising: means for receiving an analog signal that was transmitted via a channel; means for demodulating the analog signal to determine amplitude values for a plurality of coefficient vectors; means for determining a value n, wherein the value n is based on the spectral efficiency of the channel; for each of the coefficient vectors, means for determining coefficients in the coefficient vector based on the amplitude value for the coefficient vector and a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values; and means for generating the video data based on the coefficients in the coefficient vectors.

In another example, this disclosure describes a computer-readable data storage medium having instructions stored thereon that, when executed, cause one or more processors to: generate coefficients based on digital sample values of video data; determine a spectral efficiency for a channel on which to output an analog signal; determine a value n based on the spectral efficiency of the channel; generate coefficient vectors, wherein each of the coefficient vectors includes n of the coefficients; for each of the coefficient vectors, determine an amplitude value for the coefficient vector based on a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values, and modulate the analog signal based on the amplitude values for the coefficient vectors; and output the analog signal on the channel.

In another example, this disclosure describes a computer-readable data storage medium having instructions stored thereon that, when executed, cause one or more processors to: receive an analog signal that was transmitted via a channel; demodulate the analog signal to determine amplitude values for a plurality of coefficient vectors; determine a value n, wherein the value n is based on the spectral efficiency of the channel; for each of the coefficient vectors, determine coefficients in the coefficient vector based on the amplitude value for the coefficient vector and a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values; and generate video data based on the coefficients in the coefficient vectors.

In another example, this disclosure describes a method of encoding video data, the method comprising: generating prediction data for the video data; generating residual data based on the prediction data and digital sample values of the video data; generating coefficients based on the residual data; performing an interlacing process to generate an interlaced amplitude value, wherein the interlacing process interlaces bits of two or more of the coefficients to generate the interlaced amplitude value; generating digital values based on the prediction data; and outputting one or more analog signals modulated based on the interlaced amplitude value and the digital values.

In another example, this disclosure describes a method of decoding video data, the method comprising: determining an interlaced amplitude value based on an analog signal; performing a deinterlacing process to generate two or more coefficients, wherein bits of the two or more coefficients are interlaced in the interlaced amplitude value; generating residual data based on the two or more coefficients; obtaining digital values; generating prediction data based on the digital values; and reconstructing the video data based on the prediction data and the residual data.

In another example, this disclosure describes a device for encoding video data, the device comprising: a memory configured to store the video data, one or more processors implemented in circuitry, the one or more processors configured to: generate prediction data for the video data; generate residual data based on the prediction data and digital sample values of the video data; generate coefficients based on the residual data; perform an interlacing process to generate an interlaced amplitude value, wherein the interlacing process interlaces bits of two or more of the coefficients to generate the interlaced amplitude value; and generate digital values based on the prediction data; and a modem configured to output one or more analog signals modulated based on the interlaced amplitude value and the digital values.

In another example, this disclosure describes a device for decoding video data, the device comprising: a modem configured to obtain an analog signal and digital values; and one or more processors implemented in circuitry, the one or more processors configured to: determine an interlaced amplitude value based on an analog signal; perform a deinterlacing process to generate two or more coefficients, wherein bits of the two or more coefficients are interlaced in the interlaced amplitude value; generate residual data based on the two or more coefficients; obtain digital values; generate prediction data based on the digital values; and reconstruct the video data based on the prediction data and the residual data.

In another example, this disclosure describes a device for encoding video data, the device comprising: means for generating prediction data for the video data; means for generating residual data based on the prediction data and digital sample values of the video data; means for generating coefficients based on the residual data; means for performing an interlacing process to generate an interlaced amplitude value, wherein the interlacing process interlaces bits of two or more of the coefficients to generate the interlaced amplitude value; and means for modulating an analog signal based on the interlaced amplitude value; means for generating digital values based on the prediction data; and means for outputting the analog signal and digital values based on the prediction block.

In another example, this disclosure describes a device for decoding video data, the device comprising: means for determining an interlaced amplitude value based on an analog signal; means for performing a deinterlacing process to generate two or more coefficients, wherein bits of the two or more coefficients are interlaced in the interlaced amplitude value; means for generating residual data based on the two or more coefficients; means for obtaining digital values; means for generating prediction data based on the digital values; and means for reconstructing the video data based on the prediction data and the residual data.

In another example, this disclosure describes a computer-readable data storage medium having instructions stored thereon that, when executed, cause one or more processors to: generate prediction data for video data; generate residual data based on the prediction data and digital sample values of the video data; generate coefficients based on the residual data; perform an interlacing process to generate an interlaced amplitude value, wherein the interlacing process interlaces bits of two or more of the coefficients to generate the interlaced amplitude value; and modulate an analog signal based on the interlaced amplitude value; generate digital values based on the prediction data; and output the analog signal and digital values based on the prediction block.

In another example, this disclosure describes a computer-readable data storage medium having instructions stored thereon that, when executed, cause one or more processors to: determine an interlaced amplitude value based on an analog signal; perform a deinterlacing process to generate two or more coefficients, wherein bits of the two or more coefficients are interlaced in the interlaced amplitude value; generate residual data based on the two or more coefficients; obtain digital values; generate prediction data based on the digital values; and reconstruct video data based on the prediction data and the residual data.

The details of one or more examples are set forth in the accompanying drawings and the description below. Other features, objects, and advantages will be apparent from the description, drawings, and claims.

BRIEF DESCRIPTION OF DRAWINGS

FIG. 10 is a conceptual diagram illustrating amplitude values corresponding to the mapping pattern of FIG. 9, in accordance with one or more techniques of this disclosure.

FIG. 12 is a conceptual diagram illustrating amplitude values corresponding to the mapping pattern of FIG. 11, in accordance with one or more techniques of this disclosure.

FIG. 14 is a conceptual diagram illustrating amplitude values corresponding to the mapping pattern of FIG. 13, in accordance with one or more techniques of this disclosure.

FIG. 22 is a flowchart illustrating an example method for encoding video data in accordance with one or more techniques of this disclosure.

FIG. 23 is a flowchart illustrating an example method for decoding video data in accordance with one or more techniques of this disclosure.

DETAILED DESCRIPTION

As mentioned above, the ability to send and receive high-quality video data is one of the compelling use-cases for deployment of advanced wireless networks, such as Fifth Generation (5G) wireless networks. However, the use of state-of-the-art video codecs, such as H.264/Advanced Video Coding and H.265/High Efficiency Video Coding (HEVC), for encoding video data may be resource intensive and therefore involve consumption of considerable amounts of power. This disclosure describes techniques for encoding video data that may be less resource intensive.

This disclosure describes a hybrid digital-analog modulation system for coding video data. As described herein, a video encoder may generate coefficients based on video data. Additionally, the video encoder may generate coefficient vectors. Each of the coefficient vectors includes n of the coefficients. For each of the coefficient vectors, the video encoder may determine an amplitude value for the coefficient vector based on a mapping pattern. The mapping pattern may map each allowed coefficient vector to a unique amplitude value that is adjacent in an n-dimensional space to at least one other amplitude value that is adjacent to the unique amplitude value in a monotonic number line of the amplitude values (e.g., the number line of natural numbers, non-negative integers, integer values, etc.). The video encoder may modulate an analog signal based on the amplitude values for the coefficient vectors.

A corresponding video decoder may perform analog amplitude demodulation and may determine, based on an analog signal, amplitude values for a plurality of coefficient vectors. For each of the coefficient vectors, the video decoder may determine coefficients in the coefficient vector based on the amplitude value for the coefficient vector and a mapping pattern. The mapping pattern may map each allowed coefficient vector to a unique amplitude value that is adjacent in n-dimensional space to at least one other amplitude value that is adjacent to the unique amplitude value in a monotonic number line of the amplitude values. Each of the coefficient vectors may include n of the coefficients. The video decoder may generate video data based on the coefficients in the coefficient vectors. The use of this mapping pattern may provide compression when signaling data in the analog signal. Additionally, using analog amplitude modulation and demodulation may reduce power and resource consumption relative to video codecs like H.264/Advanced Video Coding and H.265/HEVC.

Figure 1:
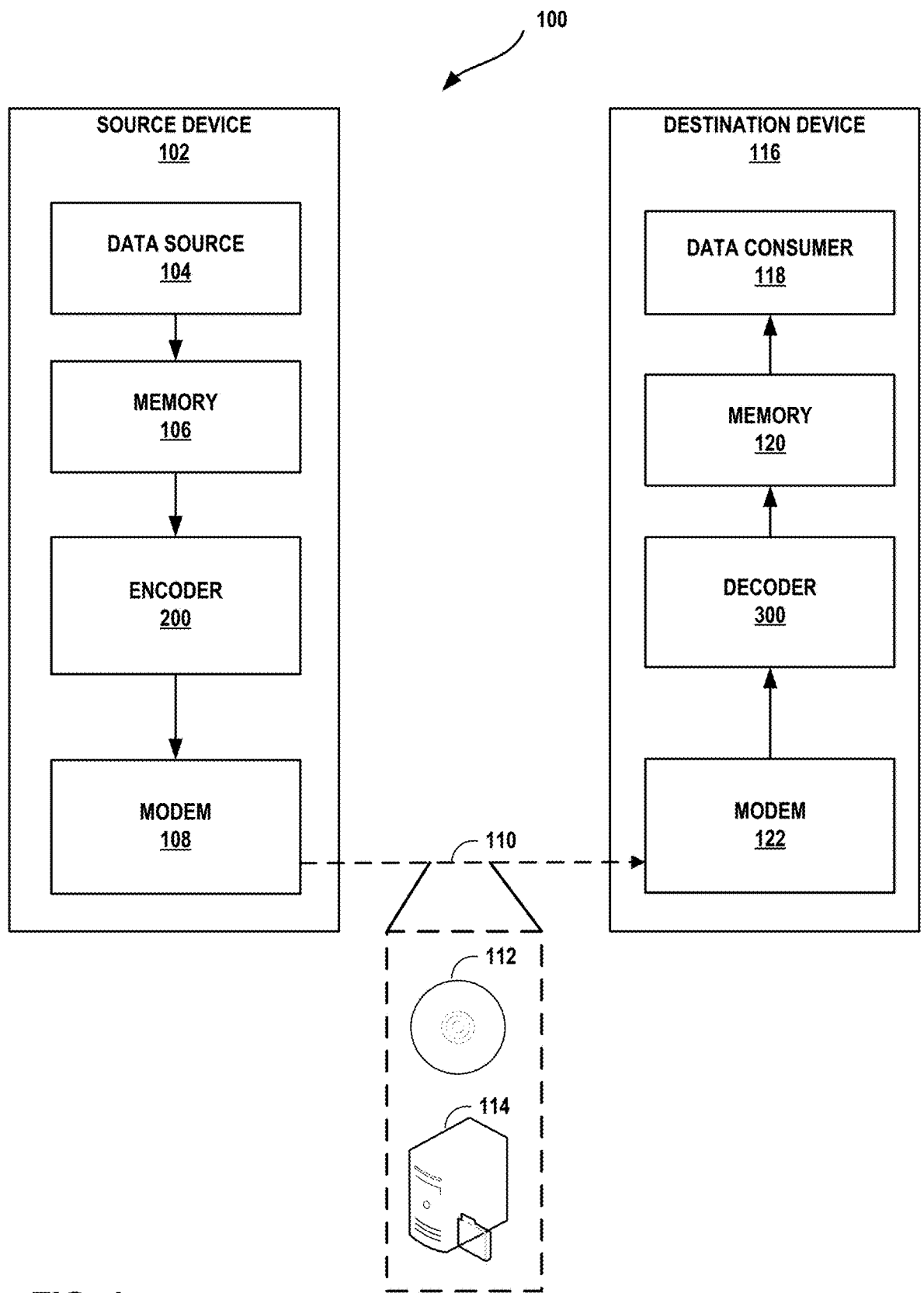
FIG. 1 is a block diagram illustrating an example encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, module device (e.g., telephone handsets such as smartphones, tablet computers, etc.), televisions, cameras, display devices, digital media players, video gaming consoles, video streaming device, broadcast receiver devices, set-top boxes, or the like. In some cases, source device 102 and destination device 116 may be equipped for wireless communication, and thus may be referred to as wireless communication devices.

In the example of FIG. 1, source device 102 includes video source 104, memory 106, video encoder 200, and modem 108. Destination device 116 includes modem 122, video decoder 300, memory 120, and display device 118. In accordance with this disclosure, video encoder 200 of source device 102 and video decoder 300 of destination device 116 may be configured to perform hybrid digital-analog modulation for video transmission. Source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform the techniques of this disclosure for hybrid digital-analog modulation for video transmission. Source device 102 and destination device 116 are merely examples of such coding devices in which source device 102 generates encoded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Source device 102 may then output the encoded video data via modem 108 onto computer-readable medium 110 for reception and/or retrieval by, e.g., modem 122 of destination device 116.

Memory 106 of source device 102 and memory 120 of destination device 116 may represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Modem 108 may modulate a transmission signal including the encoded video data, and modem 122 may demodulate the received transmission signal, according to a communication standard, such as a wireless communication protocol. The communication medium may comprise any wireless or wired communication medium, such as a radio frequency (RF) spectrum or one or more physical transmission lines. For instance, the communication medium may include one or more 5G wireless communication links. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from modem 108 to storage device 112. Similarly, destination device 116 may access encoded data from storage device 112 via modem 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and modem 122 may be configured to operate according to a streaming transmission protocol, a download transmission protocol, or a combination thereof.

Modem 108 and modem 122 may represent wireless transmitters/receivers, modems, wired networking components (e.g., Ethernet cards), wireless communication components that operate according to any of a variety of IEEE 802.11 standards, or other physical components. In examples where modem 108 and modem 122 comprise wireless components, modem 108 and modem 122 may be configured to transfer data, such as encoded video data, according to a cellular communication standard, such as $4^{th}$ Generation (4G), 4G-LTE (Long-Term Evolution), LTE Advanced, 5G, or the like. In examples where modem 108 comprises a wireless transmitter, modem 108 and modem 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or modem 108, and destination device 116 may include an SoC device to perform the functionality attributed to video decoder 300 and/or modem 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Modem 122 of destination device 116 receives encoded video data from computer-readable medium 110 (e.g., a communication medium, storage device 112, file server 114, or the like). The encoded video data may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

In general, video encoder 200 and video decoder 300 may code video data represented as arrays of digital sample values. Each digital sample value may be a value of color component in color coding format such as the YUV (e.g., Y, Cb, Cr) format, red, green, and blue (RGB) format, Hue Saturation Value (HSV) format, or other types of color format. In some examples, video encoder 200 converts data formatted in a first color format to a second color format prior to encoding, and video decoder 300 converts the data in the second color format to the first color format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding.

In accordance with a technique of this disclosure, video encoder 200 may use hybrid digital-analog modulation to encode the video data. As described herein, video encoder 200 may generate coefficients based on video data. That is, video encoder 200 may generate coefficients based on the arrays of digital sample values of the video data. In some examples, as part of generating the coefficients, video encoder 200 may generate prediction data based on the video data (e.g., based on a picture of the video data). The prediction data may be an approximation of the video data (e.g., an approximation of a picture of the video data) containing digital sample values. Video encoder 200 may quantize and entropy encode the digital sample values. Modem 108 may transmit the entropy encoded digital sample values. Furthermore, as part of generating the coefficients, video encoder 200 may generate residual data based on the prediction data and the original video data. For instance, the residual data may include residual values indicating differences between digital sample values of the prediction data and corresponding digital sample values of the video data. Furthermore, video encoder 200 may apply a binarization process to convert the residual values to coefficients. In some examples, video encoder 200 may then quantize the coefficients.

Video encoder 200 may use the coefficients to generate coefficient vectors. Each of the coefficient vectors may include n of the coefficients, where n is an integer value (e.g., an integer value greater than 1). In some examples, the coefficient vectors may consist of consecutive coefficients in a block of coefficients. In some examples, video encoder 200 may determine the value of n based on a spectral efficiency of a channel.

For each of the coefficient vectors, video encoder 200 may determine an amplitude value for the coefficient vector based on a mapping pattern. The mapping pattern maps each allowed coefficient vector to a unique amplitude value $a_1$, where amplitude value $a_1$ is adjacent in an n-dimensional space to an amplitude value $a_2$, and amplitude value $a_1$ is adjacent to an amplitude value $a_2$ in a monotonic number line of the amplitude values. As described in greater detail below, example mapping patterns may include an S-Snake mapping pattern, an M-Snake mapping pattern, an MS-Snake mapping pattern, and so on. In some examples, instead of determining amplitude values for coefficient vectors, video encoder 200 may perform an interlacing process that generates amplitude values by interlacing bits of two or more coefficients.

Furthermore, video encoder 200 may modulate an analog signal based on the amplitude values. For instance, video encoder 200 may convert a set of one or more amplitude values into an analog symbol. An analog symbol may be a combination of a phase shift and a power (i.e., amplitude). Video encoder 200 may set a phase shift and power of a symbol sampling instant of the analog signal based on the analog symbol.

Video decoder 300 may perform a decoding process that is generally reciprocal to the encoding process performed by video encoder 200. For instance, video decoder 300 may determine amplitude values based on an analog signal. In some examples, video decoder 300 may also obtain entropy-encoded digital sample values of prediction data. Video decoder 300 may entropy decode and dequantize the entropy-encoded digital sample values to determine digital sample values of the prediction data. In some examples, for each of the coefficient vectors, video decoder 300 may determine coefficients in the coefficient vector based on the amplitude value for the coefficient vector and a mapping pattern. The mapping pattern used by video decoder 300 may be the same as the mapping pattern used by video encoder 200. Thus, the mapping pattern may map each allowed coefficient vector to a unique amplitude value that is adjacent in an n-dimensional space to at least one other amplitude value that is adjacent to the unique amplitude value in a monotonic number line of the amplitude values. Each of the coefficient vectors includes n of the coefficients. In some examples, the value n may be determined based on a spectral efficiency of a channel. Furthermore, in some examples, instead of using the mapping pattern, video decoder 300 may perform a deinterlacing process that deinterlaces bits of two or more coefficients from an amplitude value.

Furthermore, video decoder 300 may generate video data based on the coefficients in the coefficient vectors. For instance, video decoder 300 may dequantize the coefficients in the coefficient vectors and apply a de-binarization process to the dequantized coefficients to generate digital sample values. Video decoder 300 may reconstruct the video data based on the digital sample values generated from the coefficients and the digital sample values of the prediction block. For instance, video decoder 300 may add digital sample values generated from the coefficients to corresponding digital sample values of the prediction block to generate the video data. Encoding and decoding video data in this way may provide compression of the video data while not using as many computational resources as other video codecs, such as H.264/AVC and H.265/HEVC.

Figure 2:
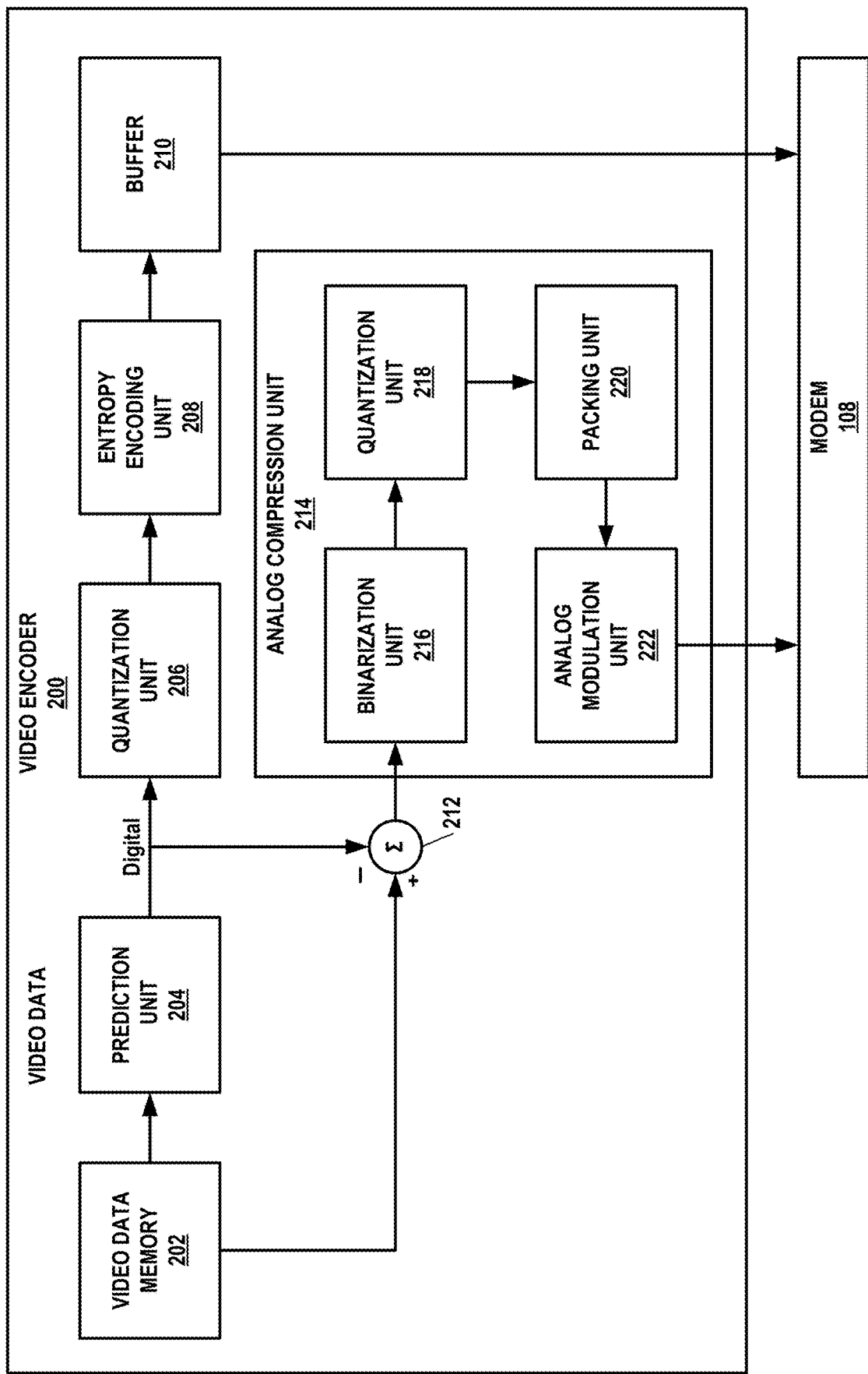
FIG. 2 is a block diagram illustrating an example video encoder, in accordance with one or more techniques of this disclosure.

FIG. 2 is a block diagram illustrating an example video encoder 200, in accordance with one or more techniques of this disclosure. FIG. 2 is provided for purposes of explanation and should not be considered limiting of the techniques as broadly exemplified and described in this disclosure. In the example of FIG. 2, video encoder 200 includes video data memory 202, a prediction unit 204, a quantization unit 206, an entropy encoding unit 208, a buffer 210, a residual generation unit 212, and an analog compression unit 214. In the example of FIG. 2, analog compression unit 214 includes a binarization unit 216, a quantization unit 218, a packing unit 220, and an analog modulation unit 222. Any or all of video data memory 202, prediction unit 204, quantization unit 206, entropy encoding unit 208, buffer 210, residual generation unit 212, and analog compression unit 214 (including binarization unit 216, quantization unit 218, packing unit 220, and analog modulation unit 222) may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 202 may store video data to be encoded by the components of video encoder 200. Video encoder 200 may receive the video data stored in video data memory 202 from, for example, video source 104 (FIG. 1). Video data memory 202 and buffer 210 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 202 and buffer 210 may be provided by the same memory device or separate memory devices. In various examples, video data memory 202 may be on-chip with other components of video encoder 200, as illustrated, or off-chip relative to those components.

In this disclosure, references to video data memory 202 should not be interpreted as being limited to memory internal to video encoder 200, unless specifically described as such, or memory external to video encoder 200, unless specifically described as such. Rather, reference to video data memory 202 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions. Video data memory 202 is configured to store received video data.

In the example of FIG. 2, video data memory 202 may receive and store video data. Prediction unit 204 may generate prediction data based on the video data. The prediction data include digital sample values. In some examples, the prediction data may be a coarse image description, which may also be referred to as an "image approximation." The coarse image description may typically be transmitted with data packets having small sizes. Video decoder 300 may use the data in such data packets to reconstruct a low-resolution image. Modem 108 may transmit the data packets using a regular 5G digital data multiplexing and channel coding scheme or another digital data multiplexing and channel coding scheme.

Prediction unit 204 may generate the prediction data in one of various ways. For instance, in some examples, prediction unit 204 may generate digital sample values of the prediction data by determining, for each 2-dimensional group (i.e., block) of digital sample values in a picture of the original video data, an average of the digital sample values in the block. For purposes of determining residual data, residual generation unit 212 may assume that each sample value in the block is equal to the average. However, only the average for the block is passed on to quantization unit 206. In another example, prediction unit 204 may generate the prediction data by determining a digital sample value of a top-left or center pixel of each block in a picture and discarding the remaining sample values. For purposes of determining residual data, residual generation unit 212 may assume that each sample value in the block is equal to the determined digital sample value. However, only the determined sample value is passed on to quantization unit 206. Thus, the number of digital sample values passed on to quantization unit 206 may be significantly less than the number of digital sample values in the picture.

Quantization unit 206 may apply a quantization process to generate quantized digital sample values based on the prediction data generated by prediction unit 204. Quantization generally refers to a process in which the digital sample values, such as the digital sample values in the prediction data, are quantized to possibly reduce the amount of data used to represent the digital sample values, providing further compression. By performing the quantization process, quantization unit 206 may reduce the bit depth associated with some or all of the digital sample values. For example, quantization unit 206 may round an n-bit digital sample value down to an m-bit digital sample value during quantization, where n is greater than m. In some examples, to perform quantization, quantization unit 206 may perform a bitwise right-shift of the value to be quantized.

Entropy encoding unit 208 may then perform entropy encoding on the quantized digital sample values. For example, entropy encoding unit 208 may perform various types of entropy encoding processes, such as a Contact Adaptive Binary Arithmetic Coding (CABAC) encoding process, a context-adaptive variable length coding (CAVLC) process, a variable-to-variable (V2V) length encoding process, a syntax-based context-adaptive binary arithmetic coding (SBAC) process, a Probability Interval Partitioning Entropy (PIPE) encoding process, an Exponential-Golomb encoding process, or another type of entropy encoding process. Buffer 210 may store the entropy-encoded quantized digital sample values.

Furthermore, in the example of FIG. 2, residual generation unit 212 generates residual data based on the digital sample values of the prediction data and digital sample values of the original video data. For example, residual generation unit 212 may subtract digital sample values of the prediction data from corresponding digital sample values of the original video data to generate the residual data.

Analog compression unit 214 modulates an analog signal based on the residual data. In the example of FIG. 2, binarization unit 216 of analog compression unit 214 converts the residual data into coefficients. The coefficients may be binary values. In some examples, binarization unit 216 applies a transform to the residual data to generate the coefficients. For instance, in one example, binarization unit 216 may apply a transform (e.g., a Discrete Cosine Transform (DCT), a Discrete Sine Transform (DST), or other type of transform) to the residual data to generate the coefficients.

Quantization unit 218 of analog compression unit 214 may apply a quantization process to the coefficients. The quantization process may reduce the number of bits used to represent the coefficients. In some examples, quantization unit 218 may perform the quantization process by right shifting binary representations of the coefficients by a specific number of positions. In other examples, the coefficients may be generated in other ways. For example, video encoder 200 may generate the coefficients without applying the quantization process.

In accordance with some examples of this disclosure, packing unit 220 of analog compression unit 214 generates coefficient vectors. Each of the coefficient vectors includes n of the coefficients. For each of the coefficient vectors, packing unit 220 determines an amplitude value for the coefficient vector based on a mapping pattern. As described in greater detail elsewhere in this disclosure, an amplitude value may indicate an amplitude of an in-phase (I) component or a quadrature (Q) component in an I-Q domain. As described in greater detail elsewhere in this disclosure, the mapping pattern may map each allowed coefficient vector to a unique amplitude value that is adjacent in an n-dimensional space to at least one other amplitude value that is adjacent to the unique amplitude value in a monotonic number line of the amplitude values. The monotonic number line is a sequence of numbers that always increases or always decreases. Numbers in the number line may or may not be equally separated. The allowed coefficient vectors include any vector of n coefficients, where each coefficient within the vector is limited to a predefined allowable set of values for that coefficient. In some examples, packing unit 220 determines n based on a spectral efficiency of a channel. In some examples, packing unit 220 performs an interlacing process that interlaces the bits of two or more of the coefficients to form an amplitude value.

Analog modulation unit 222 may modulate an analog signal based on the amplitude values. In some examples, as part of modulating the analog signal, analog modulation unit 222 may determine analog symbols based on one or more of the amplitude values. In some examples, the analog symbols are continuous, e.g., the analog symbols are not quantized to any quadrature amplitude modulation (QAM) level as is common in traditional digital transmission. Using analog modulation, as opposed to standard modulation techniques, might not require retransmission. For instance, errors occurring when transmitting modulated digital data may be detected (e.g., using checksums) and a receiver may request retransmission of the digital data. However, minor changes in phase shift and power during transmission of analog modulated data may not require retransmission because small changes in phase or power in the analog modulated data are unlikely to introduce large amounts of distortion in the reconstructed video data. Thus, the use of analog modulation may reduce complexity, reduce latency, and may reduce power consumption. Modem 108 may transmit the analog symbols.

In some examples, analog modulation unit 222 may generate pairs of amplitude values (i.e., amplitude value pairs) to generate an analog symbol. The amplitude values in an amplitude value pair may be consecutive amplitude values generated by packing unit 220. As described below with respect to FIG. 5 and FIG. 6, analog modulation unit 222 may determine a point in an I-Q plane that corresponds to the analog symbol. One amplitude value in the amplitude value pair may correspond to an I component of the point and the other amplitude value in the amplitude value pair may correspond to the Q component of the point. Analog modulation unit 222 may determine, based on the determined point, a phase shift and power for a symbol sampling instant in an analog signal that modem 108 transmits to destination device 116.

Figure 3:
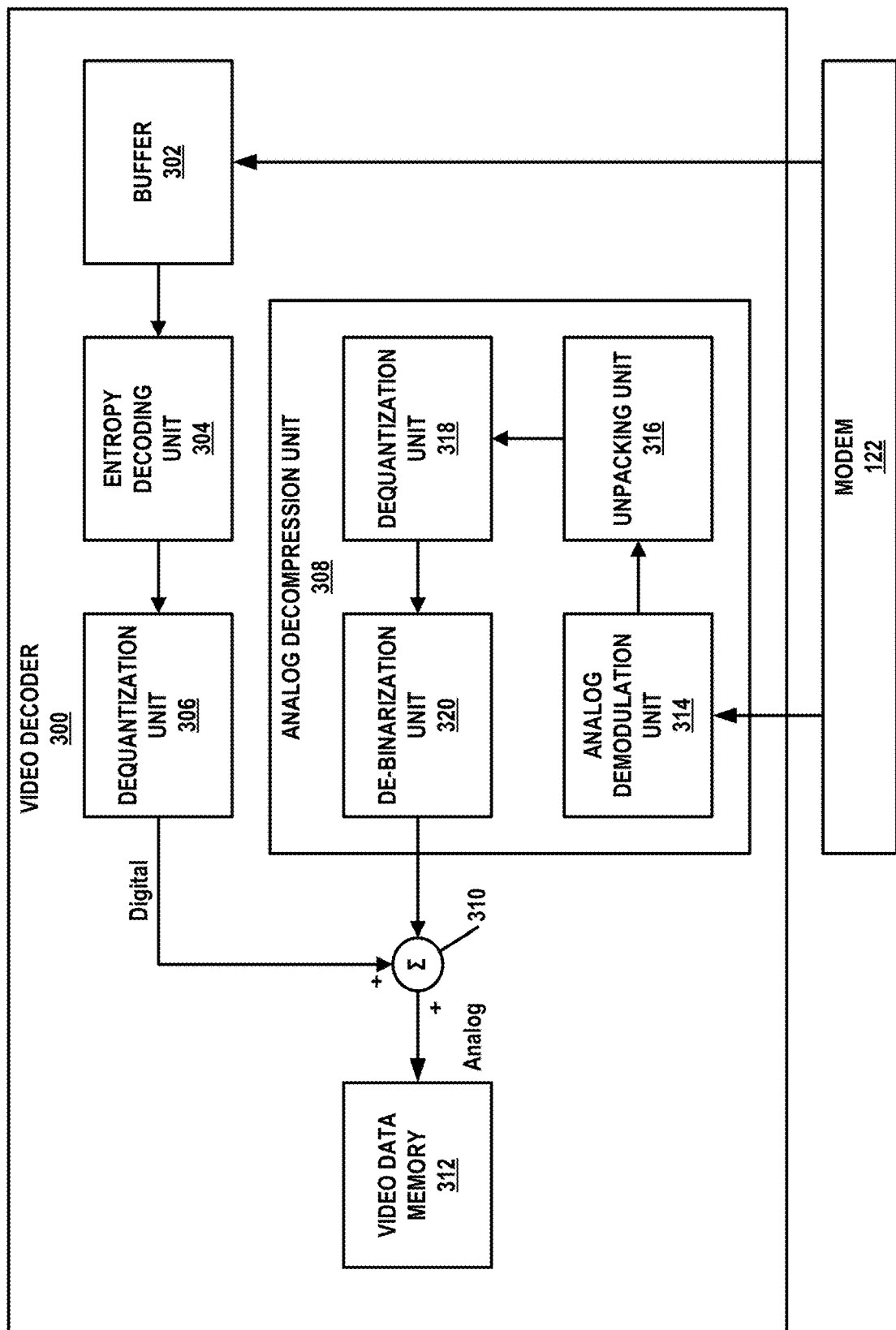
FIG. 3 is a block diagram illustrating an example video decoder, in accordance with one or more techniques of this disclosure.

FIG. 3 is a block diagram illustrating an example video decoder 300, in accordance with one or more techniques of this disclosure. FIG. 3 is provided for purposes of explanation and is not limiting on the techniques as broadly exemplified and described in this disclosure. In the example of FIG. 3, video decoder 300 includes a buffer 302, an entropy decoding unit 304, a dequantization unit 306, an analog decompression unit 308, a reconstruction unit 310, and a video data memory 312. In the example of FIG. 3, analog decompression unit 308 includes an analog demodularization unit 314, an unpacking unit 316, a dequantization unit 318, and a de-binarization unit 320. Any or all of entropy decoding unit 304, dequantization unit 306, analog decompression unit 308 (including analog demodularization unit 314, unpacking unit 316, dequantization unit 318, and de-binarization unit 320), and reconstruction unit 310 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Buffer 302 may store digital video data to be decoded by the components of video decoder 300. The digital video data stored in buffer 302 may be obtained, for example, from modem 122 or a storage medium. Video data memory 312 generally stores decoded pictures, which video decoder 300 may output. Buffer 302 and video data memory 312 may be formed by any of a variety of memory devices, such as DRAM, including SDRAM, MRAM, RRAM, or other types of memory devices. Buffer 302 and video data memory 312 may be provided by the same memory device or separate memory devices. In various examples, buffer 302 and video data memory 312 may be on-chip with other components of video decoder 300, or off-chip relative to those components.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

In the example of FIG. 3, modem 122 may receive entropy-encoded digital sample values. Buffer 302 may store the entropy-encoded digital sample values received by modem 122. Entropy decoding unit 304 may perform a process to entropy decode the entropy-encoded digital sample values in buffer 302. Entropy decoding unit 304 may perform various types of entropy decoding processes, such as a CABAC decoding process, a CAVLC decoding process, a V2V length decoding process, a SBAC decoding process, a PIPE decoding process, an Exponential-Golomb decoding process, or another type of entropy decoding process. Dequantization unit 306 may dequantize the digital sample values.

Analog demodulation unit 314 of analog decompression unit 308 may obtain an analog signal from modem 122. Analog demodulation unit 314 may then determine a phase shift and power of the analog signal for a symbol sampling instant. Analog demodulation unit 314 may then determine a point in an I-Q plane that corresponds to the phase shift and power for the symbol sampling instant. Analog demodulation unit 314 may then determine a pair of amplitude values corresponding to the determined point. Specifically, analog demodulation unit 314 may set a first amplitude value of the amplitude value pair to an I component of the point and may set a second amplitude value of the amplitude value pair to a Q component of the point.

For each coefficient vector (and therefore for each amplitude value determined by analog demodulation unit 314), unpacking unit 316 may determine coefficients in the coefficient vector based on the amplitude value for the coefficient vector and a mapping pattern. The mapping pattern may map each allowed coefficient vector to a unique amplitude value that is adjacent in an n-dimensional space to at least one other amplitude value that is adjacent to the unique amplitude value in a monotonic number line of the amplitude values. Each of the coefficient vectors includes n of the coefficients. The allowed coefficient vectors include any vector of n coefficients, where each coefficient within the vector is limited to a predefined allowable range for that coefficient. In other examples, unpacking unit 316 may perform a deinterlacing process that deinterlaces the bits of two or more coefficients from bits of the amplitude value.

Dequantization unit 318 of analog decompression unit 308 may dequantize the coefficients of the coefficient vectors. For example, dequantization unit 318 may left-shift binary values representing the coefficients. De-binarization unit 320 of analog decompression unit 308 may then convert the coefficients into digital sample values. For example, de-binarization unit 320 may apply an inverse transform (e.g., an inverse DCT, an inverse DST, etc.) to the coefficients to convert the coefficients into digital sample values. Reconstruction unit 310 may reconstruct digital sample values of a picture of the video data based on the digital sample values generated by analog decompression unit 308 and the digital sample values generated by dequantization unit 306. As described above, the prediction data generated by prediction unit 204 may include a single digital sample value for each block of a picture. Reconstruction unit 310 may determine digital sample values for each sample location of the block. For instance, reconstruction unit 310 may set the digital sample value of each sample location of the block equal to the digital sample value for the block included in the prediction data. In some examples, reconstruction unit 310 may interpolate digital sample values for the block based on the transmitted digital sample value for the block and the transmitted digital sample values for one or more neighboring blocks. Reconstruction unit 310 may reconstruct digital sample values of the picture based on the digital sample values generated by analog decompression unit 308 and the determined digital sample values for the locations within each of the blocks of the picture. For instance, reconstruction unit 310 may add digital sample values generated by analog decompression unit 308 to corresponding digital sample values for locations within the blocks of the picture. Video data memory 312 may store the reconstructed digital sample values, e.g., for subsequent output and display.

Figure 4:
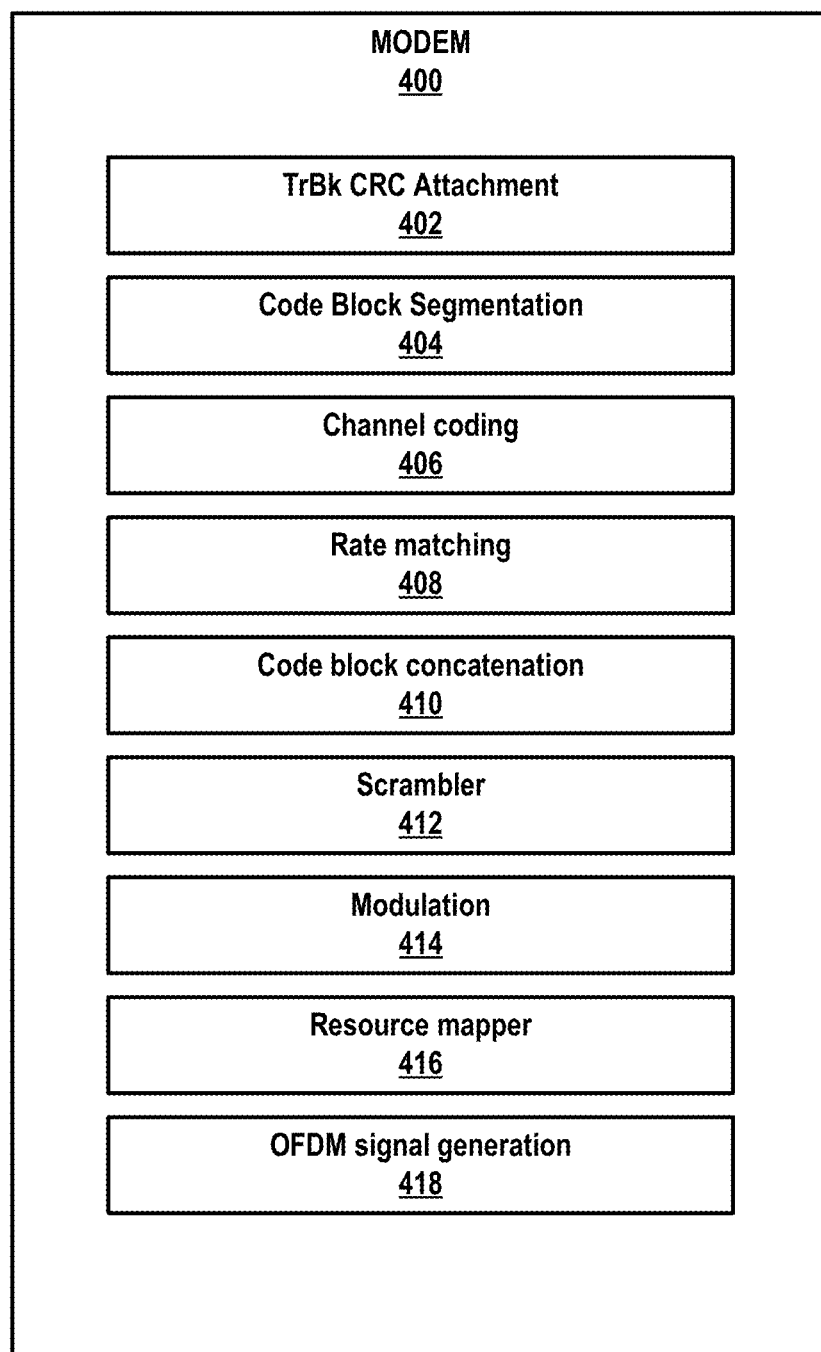
FIG. 4 is a block diagram illustrating an example modem, in accordance with one or more techniques of this disclosure.

FIG. 4 is a block diagram illustrating an example modem 400, in accordance with one or more techniques of this disclosure. Modem 400 may be an instance of modem 108 of source device 102 or modem 122 of destination device 116. In the example of FIG. 4, modem 400 includes a TrBk cyclic redundancy check (CRC) attachment unit 402, a code block segmentation unit 404, a channel coding unit 406, a rate matching unit 408, a code block concatenation unit 410, a scrambler unit 412, a modulation unit 414, a resource mapper 416, and an Orthogonal Frequency-Division Multiplexing (OFDM) signal generation unit 418. In other examples, other types of modems may include other components. TrBk CRC attachment unit 402 may receive the entropy-encoded digital sample values from buffer 210 of video encoder 200. Resource mapper 416 may receive the analog symbols generated by analog modulation unit 222.

TrBk CRC attachment unit 402 calculates CRC bits for a payload. The payload may include digital values generated by video encoder 200 (e.g., entropy-encoded data generated by entropy encoding unit 208, shift values, interlacing process information, quantization information, data indicating numbers of coefficients in coefficient vectors, and/or other information). Code block segmentation unit 404 may segment a payload into code blocks, where a code block is the maximal payload size that a channel decoder (e.g., low-density parity-check code (LDPC) for 5G data channel or Turbo code for 4G data) is allowed to encode. Channel coding unit 406 implements a channel coder that adds redundancy to cope with channel error (e.g., LDPC for 5G data and Turbo code for 4G data). Rate matching unit 408 selects the number of bits to be transmitted according to the data size allocation, per code block. Code block concatenation unit 410 may concatenate the selected bits of all the code blocks. Scrambler unit 412 may generate scrambled bits by applying an exclusive-or (XOR) operation to XOR the concatenated data with a pseudo random gold sequence that is unique per user. Modulation unit 414 may modulate the scrambled bits according to a modulation mode, e.g., $\pi/2$-Binary Phase-Shift Keying (BPSK), Quadrature Phase-Shift Keying (QPSK), 16-QAM, 64-QAM, or 256-QAM. In this way, modulation unit 412 may determine analog symbols from sequences of scrambled bits (i.e., scrambled bit sequences). Resource mapper 416 may place analog symbols in the frequency and time domain according to the allocated frequency bandwidth and time symbols for the transmission. The analog symbols may include analog symbols determined by analog modulation unit 222 of analog compression unit 214 or analog symbols by modulation unit 412 (e.g., analog symbols based on the scrambled bits, which may ultimately be based on the prediction data passing through quantization unit 206, entropy encoding unit 208, etc.). OFDM signal generation unit 418 may apply an integer fast Fourier transform (iFFT) to the analog symbols, insert cyclic prefixes, and up-sample an analog signal to a radio frequency (RF). When receiving data, the series of actions performed by the units of modem 400 may be performed in reverse.

A digital path in modem 108 is a set of steps or units for transmitting digital data. In the example of FIG. 4, the digital path includes TrBk CRC attachment unit 402, code block segmentation unit 404, channel coding unit 406, rate matching unit 408, code block concatenation unit 410, scrambler unit 412, modulation unit 414, resource mapper 416, and OFDM signal generation unit 418. In other examples, the digital path may include more or fewer units or steps. An analog path in modem 108 may include resource mapper 416 and OFDM signal generation unit 418, and not TrBk CRC attachment unit 402, code block segmentation unit 404, channel coding unit 406, rate matching unit 408, code block concatenation unit 410, scrambler unit 412, modulation unit 414.

Figure 5:
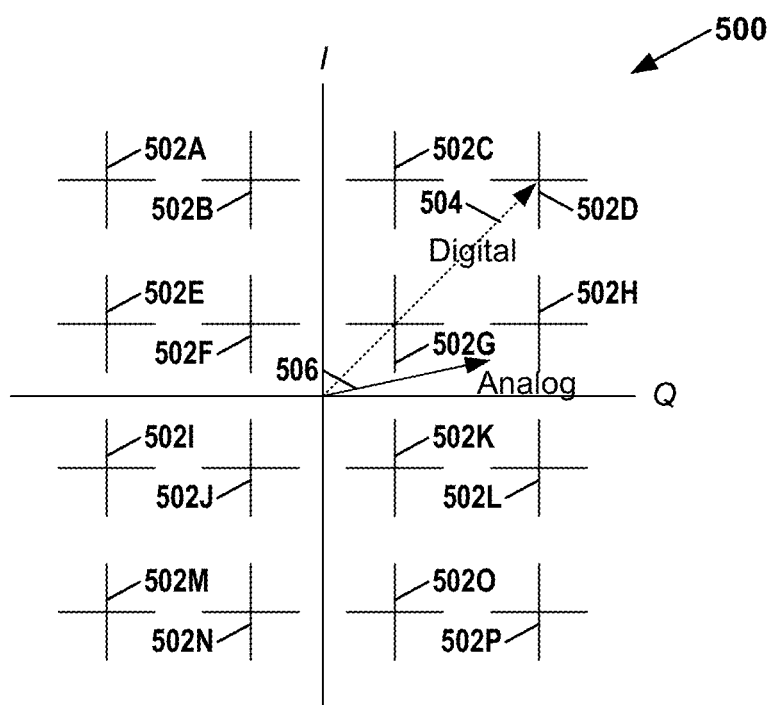
FIG. 5 is an example constellation diagram for analog modulation in an I-Q domain.

FIG. 5 is an example constellation diagram 500 for analog modulation in an I-Q domain. Constellation diagram 500 is a representation of signal modulation by quadrature amplitude modulation (QAM). Constellation diagram 500 displays a signal as a 2-dimensional xy-plane scatter diagram in a complex plane for a symbol sampling instant. In the context of this disclosure, a symbol sampling instant corresponds to a moment in time during which an analog symbol is transmitted.

In the example of FIG. 5, the vertical axis of constellation diagram 500 corresponds to a I-component, and therefore the real number component of the imaginary number. The horizontal axis of constellation diagram 500 corresponds to a Q-component, and therefore the imaginary number component of the imaginary number.

Figure 6:
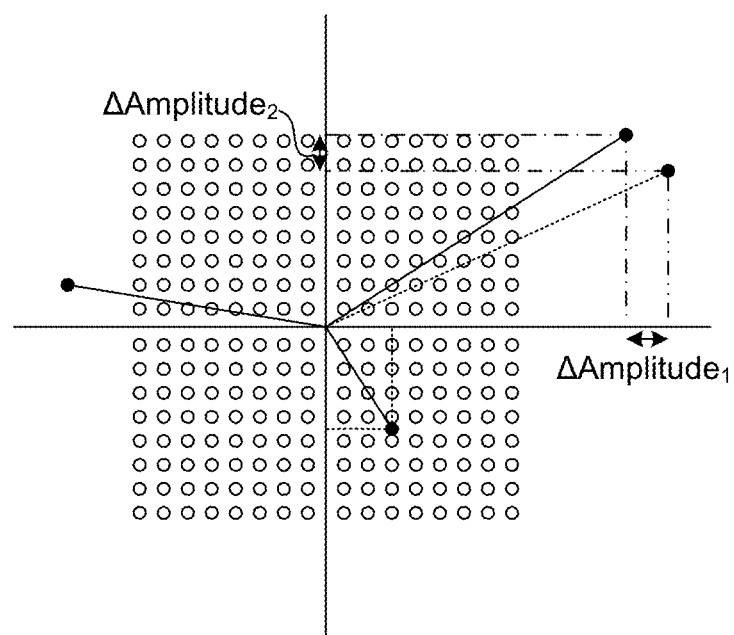
FIG. 6 is a conceptual diagram illustrating received error during analog modulation transmission.

The 2-dimensional plane of constellation diagram 500 is continuous (i.e., non-discrete). However, constellation diagram 500 contains a set of reference points 502A through 502P (collectively, "reference points 502"). In the example of FIG. 5, the reference points are represented as crosses. In the example of FIG. 6, the reference points are represented as circles. Reference points 502 may be shown as any arbitrary shape used to represent points within the I-Q plane. In the example of FIG. 5, constellation diagram 500 includes a set of sixteen reference points 502. For any point in constellation diagram 500 (including reference points 502 and non-reference points), the distance of the point from the origin represents a measure of the amplitude or power of an analog signal. The angle of a point as measured counterclockwise from the horizontal axis (i.e., Q axis) represents a phase shift of a carrier wave from a reference phase.

Each of reference points 502 may correspond to a different bit sequence in an "alphabet" of bit sequences. Because there are sixteen reference points 502 in constellation diagram 500, the alphabet of bit sequences may be equal to 0000, 0001, 0010, 0011, 0100, 0101, 0110, 0111, 1000, 1001, 1010, 1011, 1100, 1101, 1110, and 1111.

When modem 108 is transmitting digital data (e.g., entropy-encoded prediction data), modulation unit 412 (FIG. 4) may identify a reference point (e.g., one of reference points 502) that corresponds to a bit sequence (e.g., a scrambled bit sequence) based on the digital data. For example, if the bit sequence is equal to 0011 and reference point 502D corresponds to the bit sequence of 0011, modulation unit 412 may determine an analog symbol having the phase shift and power corresponding to reference point 502K, e.g., as indicated by arrow 504. Resource mapper 414 and OFDM signal generation unit 416 of modem 108 may use the phase shift and amplitude during a symbol sampling instance when transmitting the analog symbol in an analog signal, such as an electrical signal or a radio signal.

When performing analog modulation on analog data (e.g., amplitude values generated by packing unit 220), analog modulation unit 222 of analog compression unit 214 does not use reference points 502 of constellation diagram 500. Rather, analog modulation unit 222 may determine a pair of amplitude values generated by packing unit 220. Analog modulation unit 222 may then use the amplitude value pair as the coordinates (e.g., Cartesian coordinates) of a point in the I-Q plane. Analog modulation unit 222 may determine the analog symbol as the phase shift and power of the point indicated by the coordinates. Because analog modulation unit 222 does not use reference points 502, the determined point may be between reference points 502, e.g., as shown by arrow 506.

Modem 122 of destination device 116 is configured to receive the analog signal. When demodulating digital data (e.g., entropy-encoded prediction data), modulation unit 414 may determine a phase shift and power of the analog signal during a symbol sampling instant. Modulation unit 414 may then determine a point in an I-Q plane of constellation diagram 500 corresponding to the phase shift and power of the analog signal during the symbol sampling instant. Modulation unit 414 may then determine a reference point (e.g., one of reference points 402) closest to the determined point. The determined point may not match the reference point due to noise during transmission. Modulation unit 414 may output (e.g., to scrambler 412) the bit sequence corresponding to the determined reference point. Remaining parts of modem 400 (e.g., scrambler 412, code block catenation unit 410, rate matching unit 412, channel coding unit 414, code block segmentation 404, and TrBk CRC attachment unit 402) may process the bit sequence to recover digital values.

Modem 122 (or, in the context of FIG. 4, resource mapper 416 of modem 400) may determine an analog symbol corresponding to a phase shift and power of the analog signal during a symbol sampling instant. Analog demodulation unit 314 may then form a pair of amplitude values by assigning an I-coordinate of the determined point to a first amplitude value of the amplitude value pair and a Q-coordinate of the determined point to a second amplitude value of the amplitude value pair. Thus, analog demodulation unit 314 may determine an amplitude value for the coefficient vector as one of the coordinates of the analog symbol in an I-Q plane. Analog demodulation unit 314 may output the amplitude values of the amplitude value pair to unpacking unit 316.

FIG. 6 is a conceptual diagram illustrating received error during analog modulation transmission. More specifically, FIG. 6 shows a constellation diagram 600. Modem 400, analog modulation unit 222 and analog demodulation unit 314 may use constellation diagram 600 in the same manner as constellation diagram 500 of FIG. 5. In the example of FIG. 6, small circles are used in place of crosses to indicate reference points. Due to noise, the phase shifts and power, and hence analog symbols, may change during transmission. However, small amounts of noise typically do not generate large displacements in terms of the amplitude values corresponding to the received analog symbol. In other words, the difference between the original I-component and the I-component corresponding to the received analog symbol (i.e., $\Delta\text{Amplitude}_2$) and the difference between the original Q-component and the Q-component corresponding to the received analog symbol (i.e., $\Delta\text{Amplitude}_1$) are typically small during transmission of the analog symbol.

As discussed above, packing unit 220 may convert a coefficient vector to an amplitude value based on a mapping pattern. In some examples, the process for determining the amplitude value for a coefficient vector may assume that each coefficient of the coefficient vector is an unsigned value. However, the coefficients in the coefficient vector may include positive and negative values. Accordingly, packing unit 220 may perform a process that converts the coefficients in the coefficient vector into unsigned values.

In some examples, packing unit 220 may use sign data coding to convert the coefficients in the coefficient vector into unsigned values. That is, to convert the coefficients in the coefficient vector into unsigned values, packing unit 220 may determine sign values for each of the coefficients in the coefficient vector. Additionally, packing unit 220 may generate a modified coefficient vector containing the absolute values of the coefficients. In this example, packing unit 220 may then use the modified coefficient vector to determine the amplitude values.

Video encoder 200 may transmit the sign values via a digital path. For instance, video encoder 200 may transmit the sign values through the digital path. Unpacking unit 316 of analog decompression unit 308 of video decoder 300 may receive the sign values and may receive an amplitude value for the coefficient vector from analog demodulation unit 314. Unpacking unit 316 may use the amplitude value for the coefficient vector to recover the modified coefficient vector. Unpacking unit 316 may then reconstruct the original coefficient vector by setting the signs of the coefficients in the modified coefficient vector to the corresponding signs indicated in the sign data.

Figure 7:
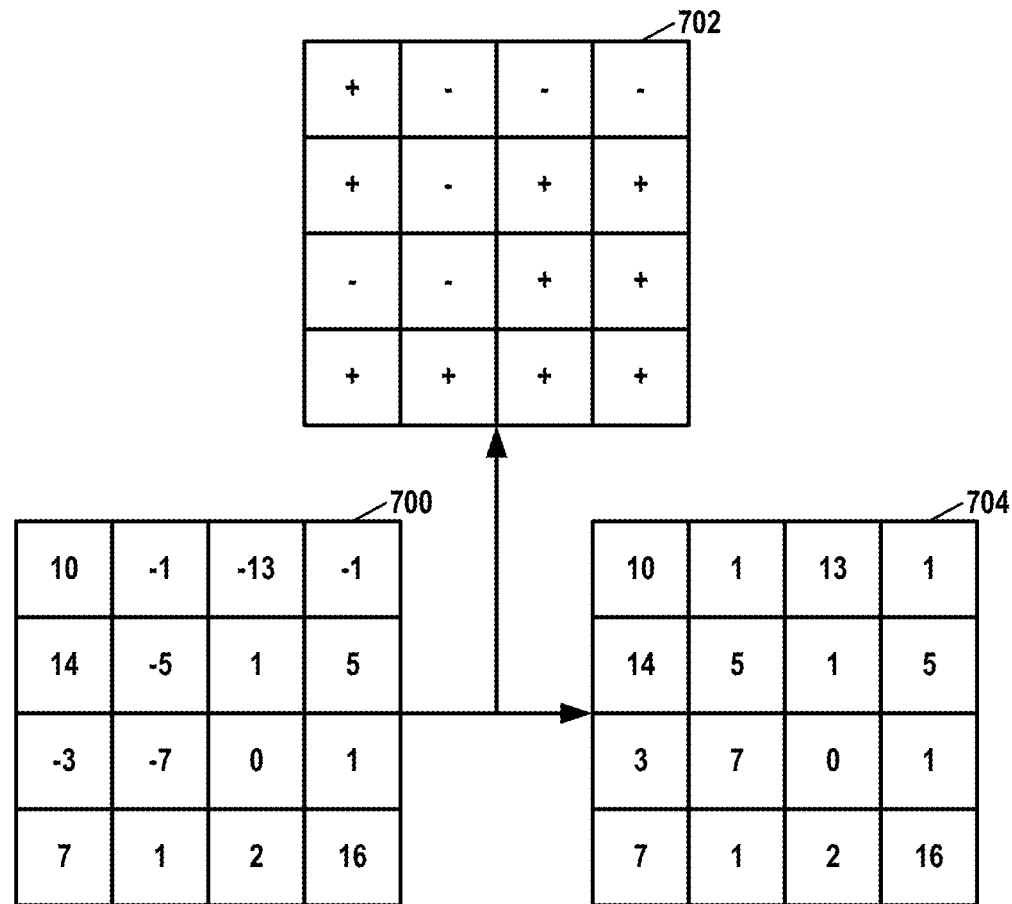
FIG. 7 is a conceptual diagram illustrating an example of data sign coding in accordance with one or more techniques of this disclosure.

FIG. 7 is a conceptual diagram illustrating an example of data sign coding in accordance with one or more techniques of this disclosure. In the example of FIG. 7, a coefficient vector 700 includes positive and negative coefficients. Packing unit 220 may generate sign data 702 indicating the signs of coefficients in coefficient vector 700. Additionally, packing unit 220 may replace coefficient vector 700 with a modified coefficient vector 704 containing absolute values of coefficients in coefficient vector 700. Packing unit 220 may use modified coefficient vector 704 to determine an amplitude value for coefficient vector 700.

In some examples, packing unit 220 may use minimum-value coding to convert the coefficients in a coefficient vector into unsigned values. For instance, to use minimum-value coding to convert the coefficients in the coefficient vector into unsigned values, packing unit 220 may determine a shift value equal to a most-negative coefficient in the coefficient vector. Packing unit 220 may then generate a modified coefficient vector by adding an absolute value of the shift value to each coefficient in the coefficient vector. Packing unit 220 may use the modified coefficient vector to determine an amplitude value for the coefficient vector.

Packing unit 220 may transmit the shift value via the digital path. Unpacking unit 316 of analog decompression unit 308 of video decoder 300 may receive the shift value and may receive an amplitude value for the coefficient vector from analog demodulation unit 314. Unpacking unit 316 may use the amplitude value for the coefficient vector to recover the modified coefficient vector. Unpacking unit 316 may then reconstruct the original coefficient vector by adding the shift value to each coefficient in the modified coefficient vector.

Figure 8:
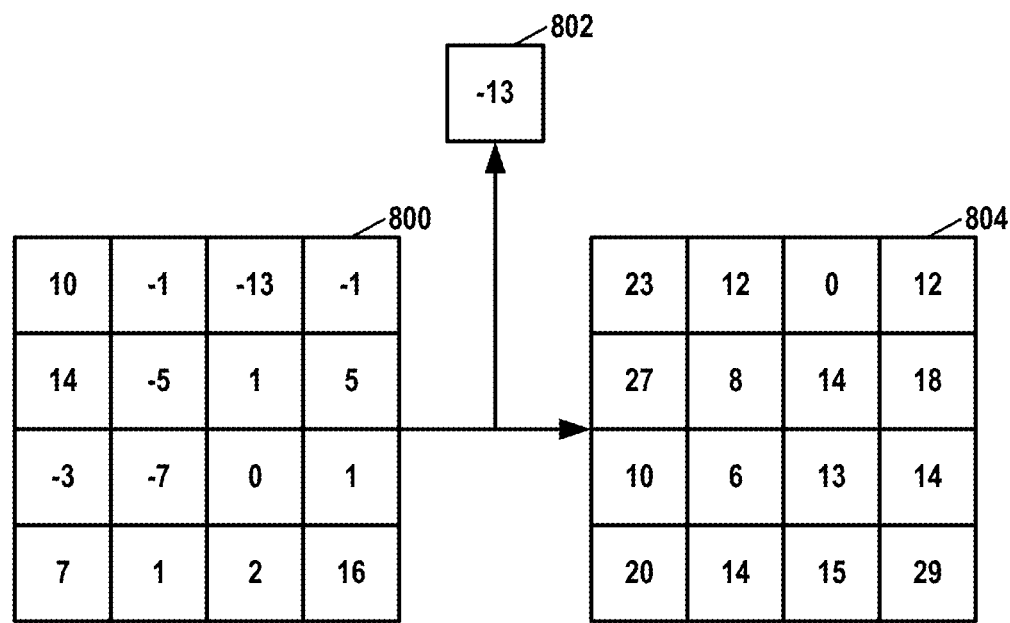
FIG. 8 is a conceptual diagram illustrating an example of minimum-value coding in accordance with one or more techniques of this disclosure.

FIG. 8 is a conceptual diagram illustrating an example of minimum-value coding in accordance with one or more techniques of this disclosure. In the example of FIG. 8, a coefficient vector 800 includes positive and negative coefficients. Packing unit 220 determines a shift value 802. Shift value 802 may be a most-negative coefficient in coefficient vector 800. Thus, in the example of FIG. 8, shift value 802 is equal to −13. Additionally, packing unit 220 may generate a modified coefficient vector 804 by adding the absolute value of the shift value to each coefficient in the coefficient vector. Video encoder 200 may transmit the shift value, e.g., through the digital path.

Figure 9:
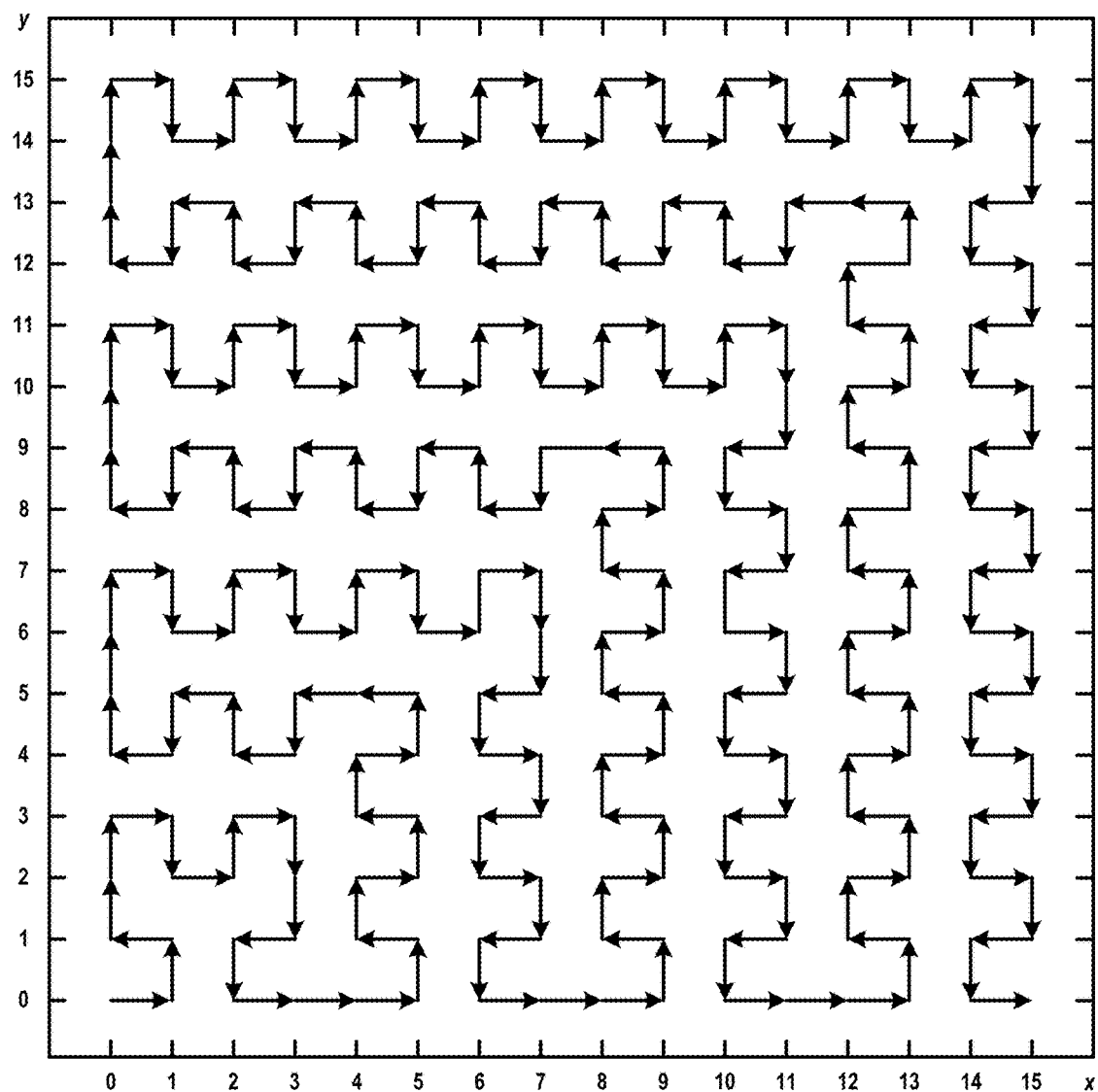
FIG. 9 is a conceptual diagram illustrating an example mapping pattern in accordance with one or more techniques of this disclosure.

FIG. 9 is a conceptual diagram illustrating an example mapping pattern in accordance with one or more techniques of this disclosure. FIG. 10 is a conceptual diagram illustrating amplitude values corresponding to the mapping pattern of FIG. 9, in accordance with one or more techniques of this disclosure. This disclosure may refer to the mapping pattern of FIG. 9 and FIG. 10 as an S-Snake mapping pattern. Packing unit 220 and unpacking unit 316 may use the S-Snake mapping pattern to determine unsigned amplitude values for coefficient vectors of unsigned coefficients that packing unit 220 converted from signed coefficients. Thus, the S-Snake mapping pattern is an example of a mapping pattern that maps unsigned coefficients to an unsigned amplitude value. As mentioned above, packing unit 220 may determine an amplitude value for a coefficient vector based on a mapping pattern. The mapping pattern maps each allowed coefficient vector to a unique amplitude value that is adjacent in an n-dimensional space to at least one other amplitude value that is adjacent to the unique amplitude value in a monotonic number line of the amplitude values. In the example of FIG. 9 and FIG. 10, n is equal to 2.

In the example of FIG. 9, each of axes x and y correspond to different coefficients in a coefficient vector. Amplitude values increase by 1 for each position along the chain of arrows starting from the position corresponding to a coefficient vector of (0, 0). For example, as shown in the example of FIG. 10, for a coefficient vector of (1, 10), packing unit 220 may determine that the corresponding amplitude value is 103. Similarly, unpacking unit 316 of may determine, based on an amplitude value of 103 that the corresponding coefficient vector is (1, 10). A similar type of mapping pattern may be extended into higher dimensions.

Figure 11:
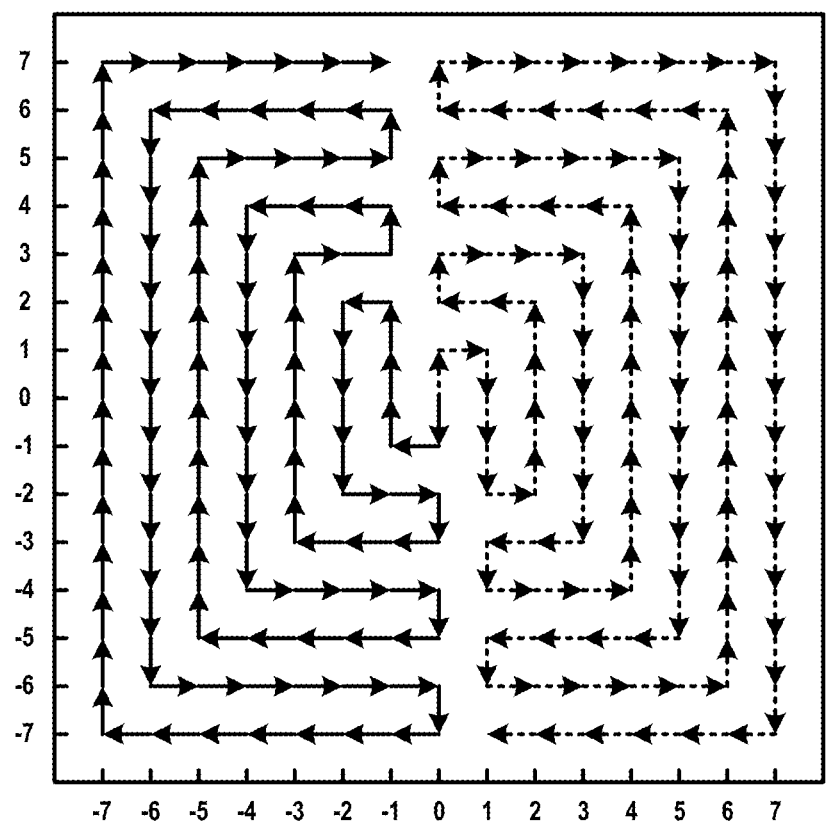
FIG. 11 is a conceptual diagram illustrating another example mapping pattern in accordance with one or more techniques of this disclosure.

FIG. 11 is a conceptual diagram illustrating an example mapping pattern in accordance with one or more techniques of this disclosure. FIG. 12 is a conceptual diagram illustrating amplitude values corresponding to the mapping pattern of FIG. 11, in accordance with one or more techniques of this disclosure. This disclosure may refer to the mapping pattern of FIG. 11 and FIG. 12 as an M-Snake mapping pattern. Packing unit 220 and unpacking unit 316 may use the M-Snake mapping pattern to determine signed amplitude values for coefficient vectors of signed coefficients. Thus, the M-Snake mapping pattern is an example of a mapping pattern that maps signed coefficients to a signed amplitude value. Packing unit 220 and unpacking unit 316 may use the mapping pattern of FIG. 11 and FIG. 12 in a similar manner as the mapping pattern of FIG. 9 and FIG. 10. However, packing unit 220 and unpacking unit 316 may use the mapping pattern of FIG. 9 and FIG. 10 with coefficient vectors that include signed values (i.e., positive and negative values). Because the mapping pattern of FIG. 9 and FIG. 10 can use coefficient vectors that include signed values, video encoder 200 may not need to signal as much side information (e.g., in the form of sign data or shift values). However, there may be some performance degradation associated with the use of signed values. For instance, signed coefficient may require an additional bit relative to unsigned coefficients of the same resolution. This additional bit increases the signed signal amplitude dynamic relative to unsigned coefficients (if unsigned coefficients were from 0, 1, . . . , A, the signed coefficients with same resolution is −A, . . . , −1, 0, 1, . . . A)). As power is scaled to a nominal level, the scaling is more aggressive in respect to a signal with higher dynamic range, thus performance may be lost.

A similar type of mapping pattern to that shown in FIG. 9 and FIG. 10 may be extended into higher dimensions.

Figure 13:
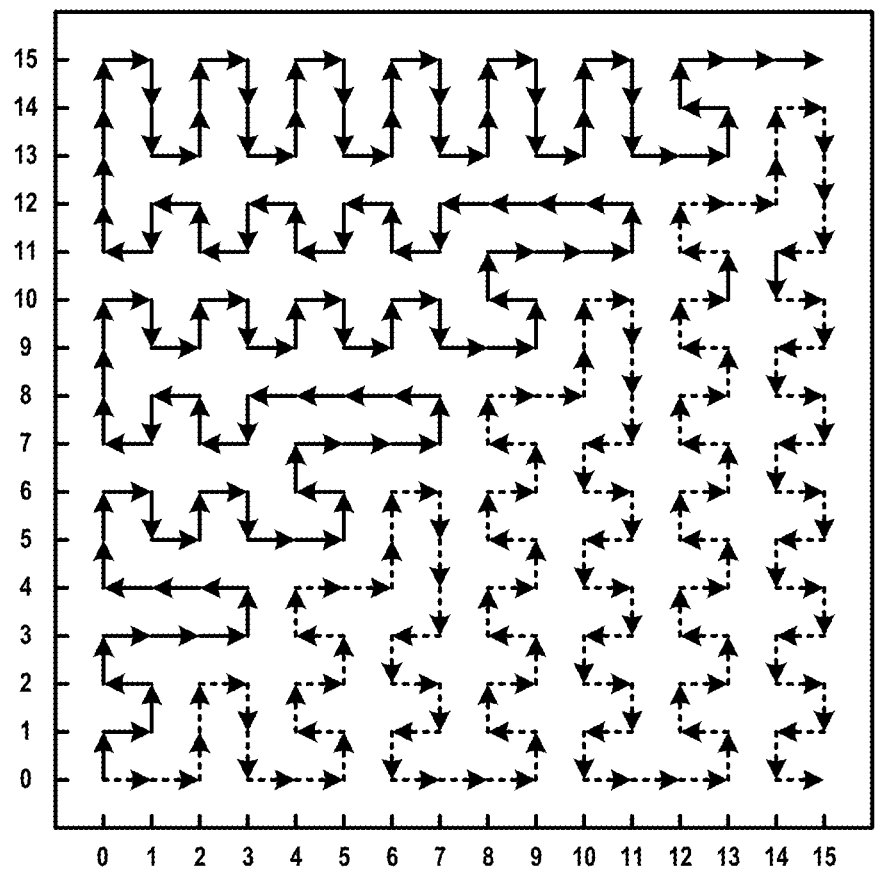
FIG. 13 is a conceptual diagram illustrating another example mapping pattern in accordance with one or more techniques of this disclosure.

FIG. 13 is a conceptual diagram illustrating an example mapping pattern in accordance with one or more techniques of this disclosure. FIG. 14 is a conceptual diagram illustrating amplitude values corresponding to the mapping pattern of FIG. 13, in accordance with one or more techniques of this disclosure. This disclosure may refer to the mapping pattern of FIG. 13 and FIG. 14 as an MS-Snake mapping pattern. Packing unit 220 and unpacking unit 316 may use the mapping pattern of FIG. 13 and FIG. 14 in a similar manner as the S-Snake mapping pattern of FIGS. 9 and 10. Like the S-Snake mapping pattern, packing unit 220 may use the MS-Snake mapping pattern to convert coefficient vectors containing only unsigned value to signed amplitude values.

The MS-Snake mapping pattern may provide compression gain with small video quality degradation. Moreover, the MS-Snake mapping pattern may improve noise resistance of the amplitude values. The MS-Snake mapping pattern maps unsigned numbers to signed amplitude values. Thus, the MS-Snake mapping pattern is an example of a mapping pattern that maps unsigned coefficients to a signed amplitude value. When using the MS-Snake mapping pattern, the number of bits may remain the same, but the dynamic power range may be reduced by 6 dB (as abs of max amplitude is smaller by 1 bit). Power scaling may be less aggressive, which may increase the signal resiliency and may therefore improve noise resistance. Additionally, the MS-Snake mapping pattern may introduce a unique noise suppression technique due to the use of multi-dimensional short arches. Using a 2D signed plane (of amplitude values) for mapping may reduce the mapped amplitude by 1 bit in respect to signed mapping, resulting in a lower dynamic range, which an important property for an analog modulated scheme for achieving a higher processing gain.

Although not illustrated in the figures of this disclosure, other types of mapping patterns may map signed coefficients an to unsigned amplitude value.

Figure 15:
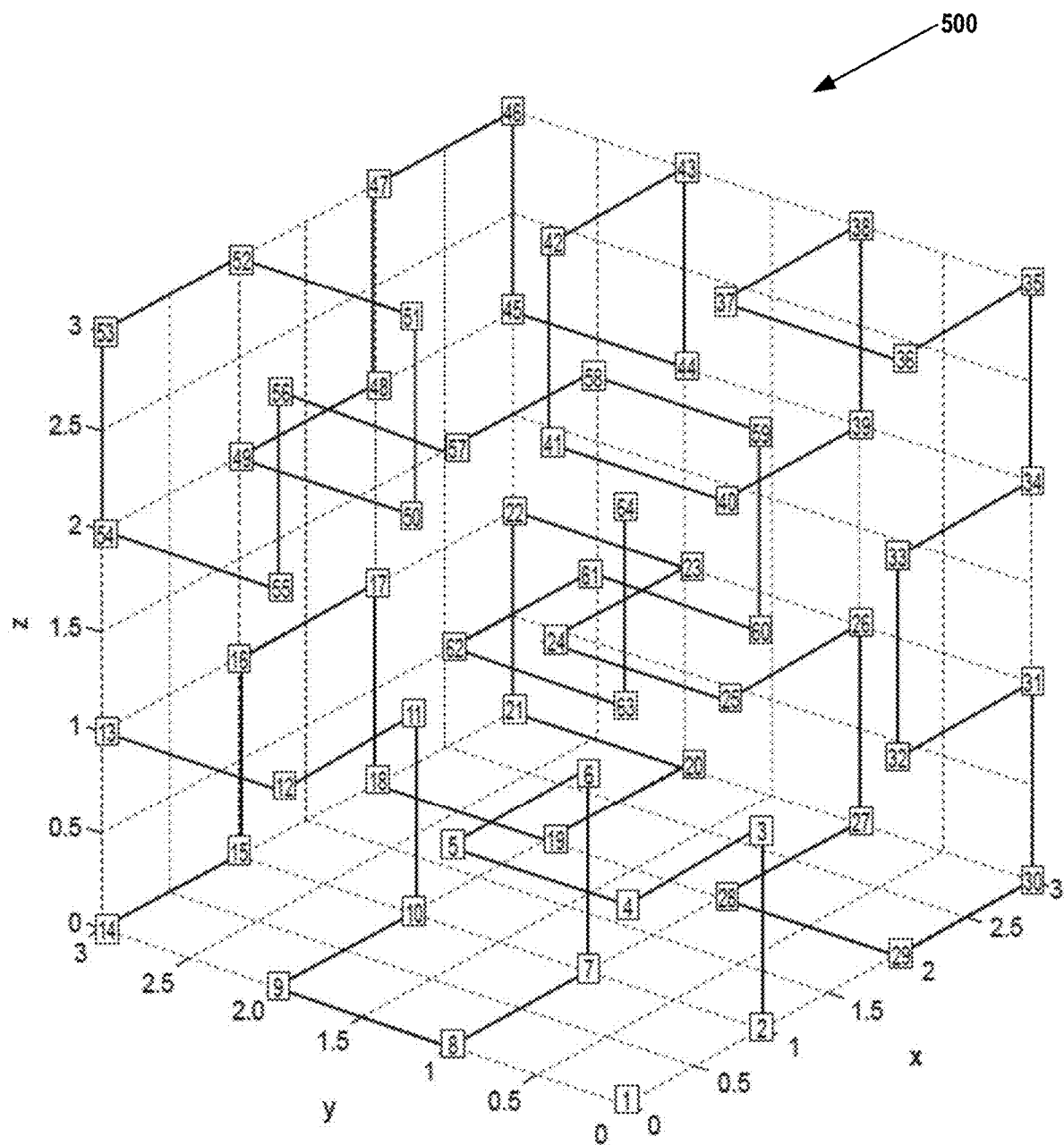
FIG. 15 is a conceptual diagram illustrating an example 3-dimensional mapping pattern in accordance with one or more techniques of this disclosure.

FIG. 15 is a conceptual diagram illustrating an example 3-dimensional mapping pattern 500 in accordance with one or more techniques of this disclosure. As mentioned above, packing unit 220 may determine an amplitude value for the coefficient vector based on a mapping pattern, where the mapping pattern maps each allowed coefficient vector to a unique amplitude value that is adjacent in an n-dimensional space to at least one other amplitude value that is adjacent to the unique amplitude value in a monotonic number line of the amplitude values. In the example of FIG. 15, n is equal to 3. Packing unit 220 may use mapping pattern 500 of FIG. 15 in a manner similar to the mapping patterns described elsewhere in this disclosure. Mapping pattern 500 is an example of a 3-dimensional S-Snake mapping pattern that maps vectors of unsigned coefficients to unsigned amplitude values. For instance, where the coefficient vector is equal to (0, 1, 2), packing unit 220 may determine an amplitude value of 62.

Figures 16, 17:
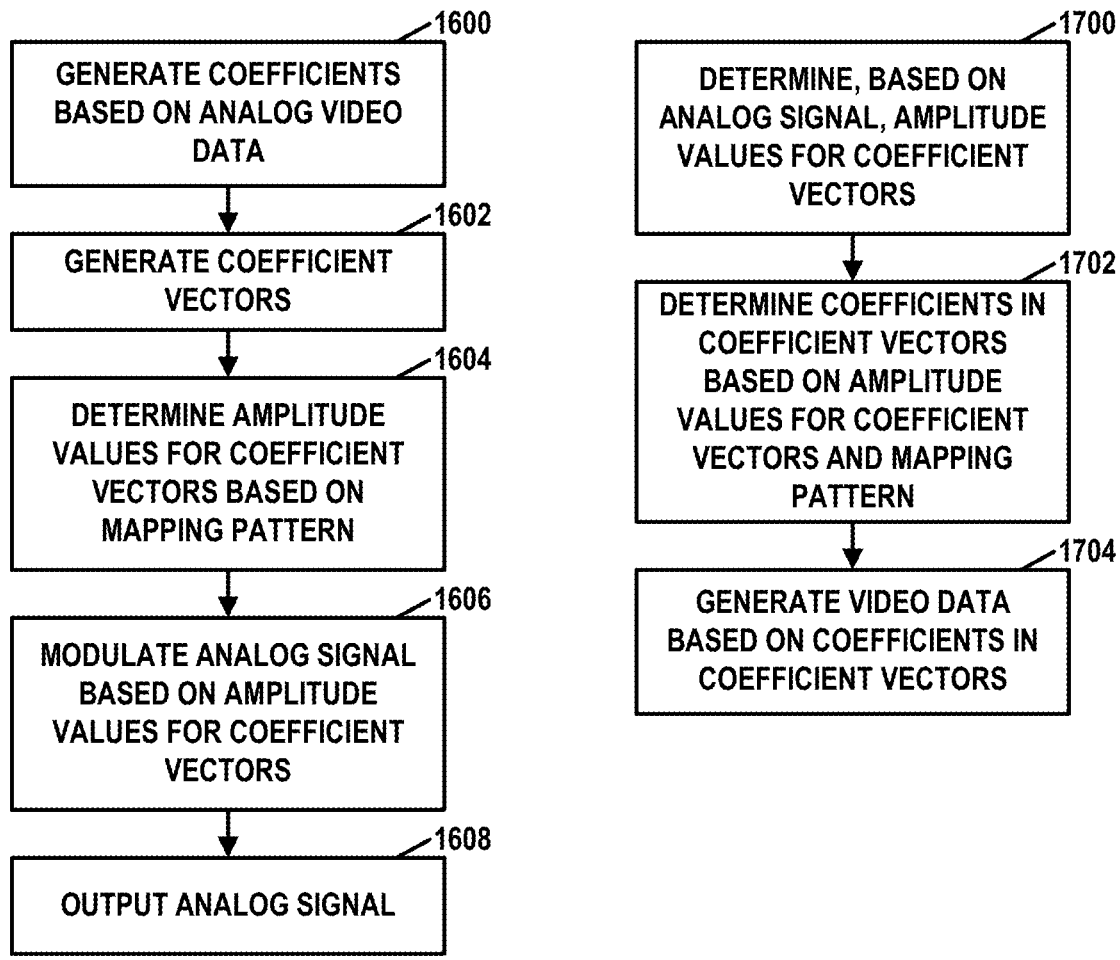
FIG. 16 is a flowchart illustrating an example method for encoding video data in accordance with one or more techniques of this disclosure.
FIG. 17 is a flowchart illustrating an example method for decoding video data in accordance with one or more techniques of this disclosure.

FIG. 16 is a flowchart illustrating an example method for encoding video data in accordance with one or more techniques of this disclosure. The flowcharts of this disclosure are presented as examples. Other examples may include more, fewer, or different actions, or actions may be performed in different orders.

In the example of FIG. 16, video encoder 200 may generate coefficients based on video data (1600). For instance, in one example of generating the coefficient based on the video data, prediction unit 204 of video encoder 200 may determine prediction data for the video data. In this example, residual generation unit 212 of video encoder 200 may generate residual data indicating differences between sample values in the prediction block and corresponding sample values in the block of video data. Furthermore, in this example, analog compression unit 214 may generate coefficients based on the residual data. For instance, binarization unit 216 of video encoder 200 may binarize the residual data to generate coefficients and quantization unit 218 may quantize the coefficients. In other examples of generating coefficients based on video data, video encoder 200 may perform more, fewer, or different steps. For instance, in some examples, video encoder 200 does not perform a quantization step. In still other examples, video encoder 200 does not perform a step of binarizing the residual data.

In some examples, video encoder 200 may generate digital values (e.g., bit sequences) based on the prediction data and modem 108 (e.g., modulation unit 414 of modem 108) may be configured to transmit the digital values. For instance, quantization unit 206 may generate quantized digital sample values based on digital sample values in the prediction data. Entropy encoding unit 208 may perform an entropy-encoding process that generates the digital values based on the quantized digital sample values. To transmit the digital values, modem 108 may generate bit sequences based on the entropy-encoded data, e.g., as described with respect to FIG. 4. Modulation unit 414 may determine analog symbols based on the bit sequences.

In some examples, analog compression unit 214 may modify initial coefficients to generate the coefficients. In one example consistent with FIG. 7, analog compression unit 214 (e.g., binarization unit 216 and/or quantization unit 218) may generate initial coefficients based on the video data. In this example, analog compression unit 214 may generate sign values indicating positive/negative signs of the initial coefficients. Furthermore, analog compression unit 214 may generate the coefficients as absolute values of the initial coefficients. In this example, modem 108 may be configured to signal data representing the sign values.

In another example of modifying the initial coefficients that is consistent with FIG. 8, the coefficients in the coefficient vector are non-negative versions of initial coefficients. In this example, as part of generating the coefficients based on the video data (e.g., based on residual data), analog compression unit 214 (e.g., binarization unit 216 and/or quantization unit 218) may generate the initial coefficients based on the residual data. In this example, analog compression unit 214 may determine a shift value (e.g., shift value 802 of FIG. 8) based on a most-negative initial coefficient of the initial coefficients. Analog compression unit 214 may perform a process that transforms the initial coefficients based on the shift value to the non-negative versions of the initial coefficients. In this example, modem 108 may be configured to signal data representing the shift value.

Furthermore, in the example of FIG. 16, packing unit 220 of video encoder 200 may generate coefficient vectors (1602). Each of the coefficient vectors includes n of the coefficients. Packing unit 220 may generate the coefficient vectors in one of a variety of ways. For instance, in one example, packing unit 220 may generate a coefficient vector as a group of n consecutive coefficients according to a coefficient coding order. Various coefficient coding orders may be used, such as raster scan order, zigzag scan order, reverse raster scan order, vertical scan order, and so on. In some examples, a coefficient vector may include one or more negative coefficients and one or more positive coefficients (i.e., signed coefficients). In some examples, a coefficient vector only includes non-negative coefficients (i.e., unsigned coefficients).

For each of the coefficient vectors, packing unit 220 may determine an amplitude value for the coefficient vector based on a mapping pattern (1604). For each respective allowed coefficient vector in a plurality of allowed coefficient vectors, the mapping pattern maps the respective allowed coefficient vector to a respective amplitude value in a plurality of amplitude values. The respective amplitude value is adjacent in an n-dimensional space to at least one other amplitude value in the plurality of amplitude values that is adjacent to the respective amplitude value in a monotonic number line of the amplitude values. FIGS. 9-15, which are discussed above, show example mapping patterns that packing unit 220 may use to determine amplitude values for coefficient vectors. Thus, in some examples, the mapping pattern may be one of an S-Snake pattern, an M-Snake pattern, an MS-Snake pattern, or another type of mapping pattern. The value n may be greater than or equal to 2.

In some examples, to determine the amplitude value for the coefficient vector, packing unit 220 may determine a position in the n-dimensional space. Coordinates of the position in the n-dimensional space are based on the coefficients of the coefficient vector, and the mapping pattern maps different positions in the n-dimensional space to different amplitude values in the plurality of amplitude values. Packing unit 220 may determine the amplitude value for the coefficient vector as the amplitude value corresponding to the determined position in the n-dimensional space.

In some examples, video encoder 200 may dynamically switch between mapping patterns according to one or more optimization criteria. For example, video encoder 200 may use the mapping pattern of FIGS. 9 and 10 when greater performance is required and may use the mapping pattern of FIGS. 11 and 12 when it is more desirable to send less side information. In this example, the performance may be measured in terms of noise resiliency, numbers of bits per analog symbol, or according to some other metric. In this example, video encoder 200 may switch between mapping patterns on a block-by-block basis, on a picture-by-picture basis, a sequence-by-sequence basis, or on another basis. In another example, video encoder 200 may dynamically switch between mapping patterns, e.g., in the manner described with respect to FIGS. 24-26.

Analog modulation unit 222 may then modulate an analog signal based on the amplitude values for the coefficient vectors (1606). Analog modulation unit 222 may perform analog amplitude modulation in accordance with any of the examples provided elsewhere in this disclosure, e.g., the examples described with respect to FIG. 5 and FIG. 6. For instance, analog modulation unit 222 may determine an analog symbol based on a pair of the amplitude values. The analog symbol may correspond to a phase shift and a power of a point in an I-Q plane that having coordinates indicated by the amplitude value pair. Analog modulation unit 222 may modulate the analog signal during a symbol sampling instant based on the determined phase shift and power. Modem 108 may be configured to output the analog signal (1608).

FIG. 17 is a flowchart illustrating an example method for decoding video data in accordance with one or more techniques of this disclosure. In the example of FIG. 17, analog demodulation unit 314 of video decoder 300 may determine, based on an analog signal, amplitude values for a plurality of coefficient vectors (1700). Analog demodulation unit 314 may perform the analog amplitude demodulation in accordance with any of the examples provided elsewhere in this disclosure, e.g., the examples described with respect to FIG. 5 and FIG. 6. For instance, analog demodulation unit 314 may determine a phase shift and a power for a symbol sampling instant of the analog signal. Analog demodulation unit 315 may determine a point in an I-Q plane indicated by the determined phase shift and power. Analog demodulation unit 314 may then determine an amplitude value pair as the coordinates in the point in the I-Q plane.

For each of the coefficient vectors, unpacking unit 316 may determine coefficients in the coefficient vector based on the amplitude value for the coefficient vector and a mapping pattern (1702). For each respective allowed coefficient vector in a plurality of allowed coefficient vectors, the mapping pattern may map the respective allowed coefficient vector to a respective amplitude value in a plurality of amplitude values. The respective amplitude value is adjacent in an n-dimensional space to at least one other amplitude value in the plurality of amplitude values that is adjacent to the respective amplitude value in a monotonic number line of the amplitude values. Each of the coefficient vectors may include n of the coefficients. FIGS. 9-15, which are discussed above, show example mapping patterns that unpacking unit 316 may use to determine amplitude values for coefficient vectors. Thus, in some examples, the mapping pattern may be one of an S-Snake pattern, an M-Snake pattern, an MS-Snake pattern, or another type of mapping pattern. The value n may be greater than or equal to 2. In some examples, unpacking unit 316 may determine the coefficients in the coefficient vector as coordinates of a position in the n-dimensional space that corresponds to the amplitude value, wherein the mapping pattern maps different positions in the n-dimensional space to different amplitude values in the plurality of amplitude values. In some examples, the coefficient vector includes one or more negative coefficients and one or more positive coefficients. In other examples, the coefficient vector may include only non-negative coefficients.

In some examples, such as the example of FIG. 7, as part of determining the coefficients, video decoder 300 may obtain sign values (e.g., via a digital path of modem 122), where the sign values indicate positive/negative signs of the coefficients in the coefficient vector. In such examples, video decoder 300 may determine, based on the amplitude value for the coefficient vector and the mapping pattern, absolute values of the coefficients in the coefficient vector. Video decoder 300 may reconstruct the coefficients in the coefficient vector at least in part by applying the sign values to the absolute values of the coefficients in the coefficient vector. In some example, such as the example of FIG. 8, as part of determining the coefficients, video decoder 300 may obtain (e.g., via a digital path of modem 122), data representing a shift value. In such examples, the shift value indicates a most-negative coefficient of the coefficients in the coefficient vector. Additionally, in such examples, video decoder 300 may determine, based on the amplitude value for the coefficient vector and the mapping pattern, intermediate values of the coefficients in the coefficient vector. Video decoder 300 may reconstruct the coefficients in the coefficient vector at least in part by adding the shift value to each of the intermediate values of the coefficients in the coefficient vector.

Furthermore, in the example of FIG. 17, video decoder 300 may generate video data based on the coefficients in the coefficient vectors (1704). For instance, in one example, dequantization unit 318 of video decoder 300 may dequantize the coefficients of the coefficient vectors. In this example, de-binarization unit 320 of video decoder 300 may perform a de-binarization process to convert the coefficients into digital sample values. For instance, de-binarization unit 320 may apply an inverse DCT to the coefficients to convert the coefficients into digital sample values. In this way, analog decompression unit 308 may generate digital sample values. Furthermore, in this example, entropy decoding unit 304 of video decoder 300 may obtain digital values (e.g., via digital path of modem 122). Video decoder 300 may generate prediction data based on the digital values. For instance, entropy decoding unit 304 may perform an entropy decoding process on the digital values to generate quantized digital sample values. Dequantization unit 306 of video decoder 300 may generate the prediction data by dequantizing the quantized digital sample values. Reconstruction unit 310 of video decoder 300 may generate video data based on the prediction data and the residual data, e.g., by adding corresponding digital sample values of the prediction block and the digital sample values generated by analog decompression unit 308. In this way, video decoder 300 is able to generate video data based on the coefficients in the coefficient vectors. In other examples, video decoder 300 may perform more, fewer, or different actions. For instance, in some examples, the dequantization steps performed by dequantization unit 306 and/or dequantization unit 318 are omitted. In some examples, video decoder 300 may omit the entropy decoding process performed by entropy decoding unit 304.

In accordance with one or more techniques of this disclosure, packing unit 220 may perform an interlacing process that unifies multiple coefficients into a single amplitude value. Performing the interlacing process may improve noise resistance and may provide compression gain relative to using two or more different symbol sampling instants to send two or more non-interlaced analog symbols. Packing unit 220 may perform the interlacing process to generate amplitude values instead of the process described elsewhere in this disclosure that uses a mapping pattern to generate amplitude values for coefficient vectors.

Figure 18:
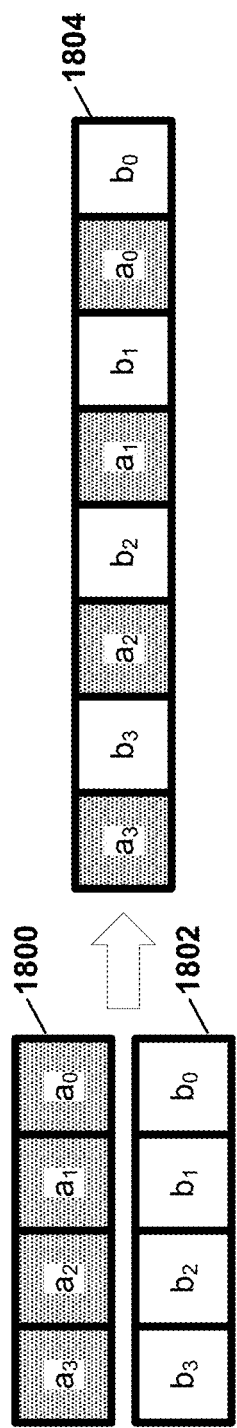
FIG. 18 is a conceptual diagram illustrating a first example of interlacing, in accordance with one or more techniques of this disclosure.

FIG. 18 is a conceptual diagram illustrating a first example of interlacing, in accordance with one or more techniques of this disclosure. In the example of FIG. 18, a first coefficient 1800 consists of four bits (i.e., bits $a_0$ through $a_3$) and a second coefficient 1802 consists of four bits (i.e., $b_0$ through $b_3$). In general, interlacing refers to inserting bits of one or more coefficients (e.g., in an alternating pattern, a round robin pattern, or other type of pattern) between bits of another coefficient. Packing unit 220 of video encoder 200 may perform an interlacing process that generates an amplitude value 1804 by interlacing the bits of coefficient 1800 with the bits of coefficient 1802. This disclosure may refer to amplitude values generated by performing the interlacing process as "interlaced amplitude values."

Analog modulation unit 222 may use pairs of interlaced amplitude values in the same manner as amplitude values described elsewhere in this disclosure. Unpacking unit 316 of video decoder 300 may receive interlaced amplitude values from analog demodulation unit 314 and may perform a deinterlacing process that reconstructs coefficients from the interlaced amplitude values. For instance, in the context of FIG. 18, unpacking unit 316 may perform a deinterlacing process that reconstructs coefficients 1800 and coefficient 1802 from interlaced amplitude value 1804.

Figure 19:
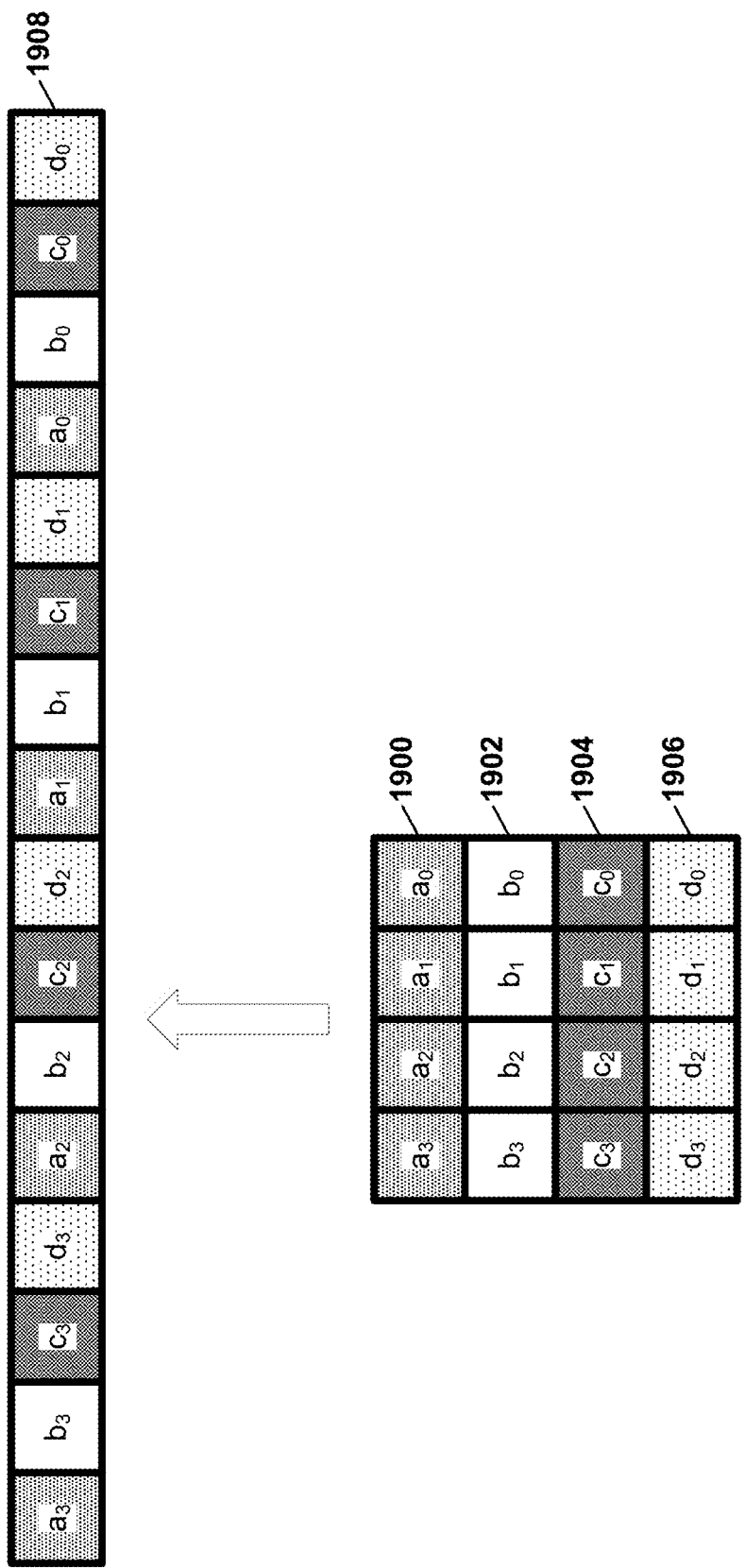
FIG. 19 is a conceptual diagram illustrating a second example of interlacing, in accordance with one or more techniques of this disclosure.

FIG. 19 is a conceptual diagram illustrating a second example of interlacing, in accordance with one or more techniques of this disclosure. In the example of FIG. 19, packing unit 220 of video encoder 200 performs an interlacing process that interlaces the bits of coefficients 1900, 1902, 1904, and 1906 to generate an interlaced amplitude value 1908. Unpacking unit 316 of video decoder 300 performs a deinterlacing process that deinterlaces the bits of interlaced amplitude value 1908 to form coefficients 1900, 1902, 1904, and 1906.

In some examples, packing unit 220 may dynamically select among different interlacing processes. As one can see from FIG. 18 and FIG. 19, interlaced amplitude values can include different numbers of bits depending on the interlacing process used to generate amplitude values from coefficients. Various characteristics of a channel through which source device 102 is transmitting the analog signal may dictate the spectral efficiency of the channel. The spectral efficiency of the channel indicates how many bits can be used in an amplitude value. For instance, if there is greater noise in the channel, the spectral efficiency may be lower and hence amplitude values may have fewer bits. Therefore, packing unit 220 may determine a value x based on the spectral efficiency of the channel and the number of bits per coefficient. For instance, packing unit 220 may determine the value x as the spectral efficiency divided by the number of bits per coefficient. Packing unit 220 may then use an interlacing process that interlaces the bits of x coefficients to form an interlaced amplitude value. In this way, packing unit 220 may select, based on a spectral efficiency of a channel through which the analog signal is transmitted, the interlacing process from a plurality of interlacing processes. Unpacking unit 316 of video decoder 300 may select the deinterlacing process from a plurality of deinterlacing processes. For instance, video encoder 200 may signal (e.g., via the digital path) data indicating the interlacing process. In some examples, each of the deinterlacing processes deinterlaces a different number of coefficients from the interlaced amplitude value.

Interlaced amplitude values can be noise sensitive at specific values. For instance, changes in power or phase of an analog signal during a symbol sampling instant may result in the addition of 1 to an interlaced amplitude value that analog demodulation unit 314 determines for the symbol sampling instant. The change in the packed amplitude value can result in significant differences between the original digital sample values and the digital sample values derived from the interlaced amplitude value.

Figure 20:
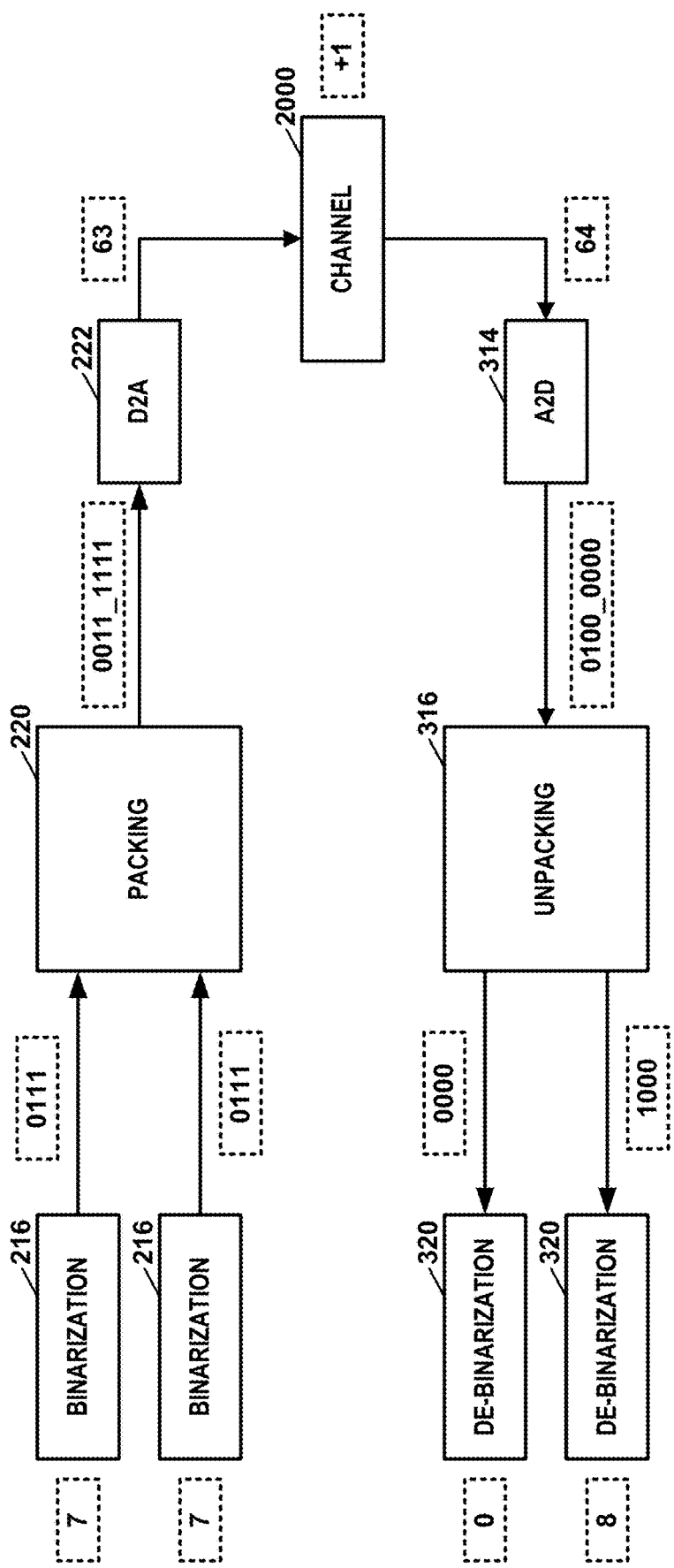
FIG. 20 is a block diagram illustrating example effects of noise on a coding process.

FIG. 20 is a block diagram illustrating example effects of noise on a coding process. In the example of FIG. 20, binarization unit 216 of video encoder 200 may receive two digital sample values, each equal to 7. Binarization unit 216 may convert the digital sample values to coefficients, both equal to 0111. Packing unit 220 may perform an interlacing process that interlaces bits of the coefficients to generate an interlaced amplitude value of 0011_1111 (which is equal 63 in decimal). Analog modulation unit 222 (labeled D2A, for digital to analog, in FIG. 20) may then perform analog modulation to modulate an analog signal based on the interlaced amplitude value. The analog signal may be transmitted via a channel 2000.

During transmission of the analog signal through channel 2000, noise may cause a 1-bit change to the interlaced amplitude value demodulated from the analog signal by analog demodulation unit 314 (labeled A2D, for analog to digital, in FIG. 20). For instance, changes in power or phase shift of the analog signal during a symbol sampling instant may cause analog demodulation unit 314 to determine a point in an I-Q plane that is different from the point in the I-Q plane corresponding to an original amplitude value pair. Thus, an interlaced amplitude value determined by analog demodulation unit 314 may be equal to 64 instead of 63. As shown in the example of FIG. 20, the interlaced amplitude value may be represented in binary as 0100_0000. Unpacking unit 316 may perform a deinterlacing process that converts the interlaced amplitude value of 0100_0000 into coefficients 0000 and 1000. De-binarization unit 320 may convert these coefficients into digital sample values, which in the example of FIG. 20 are equal to 0 and 8. Note that the digital sample values of 0 and 8 differ significantly from the original digital sample values of 7 and 7. This difference may have serious adverse effects on the quality of a decoded picture based on these digital sample values. It is noted that this noise vulnerability occurs primarily with respect to specific interlaced amplitude values. However, this noise vulnerability is not so serious at other interlaced amplitude values.

In accordance with one or more techniques of this disclosure that may address this issue, packing unit 220 may remap interlaced amplitude values to alternate interlaced amplitude values such that there are gap values in a number line of the interlaced amplitude values at positions between noise-vulnerable interlaced amplitude values in a number line of the interlaced amplitude values. The noise-vulnerable interlaced amplitude values in the number line of the interlaced amplitude values are interlaced amplitude values in which adding minimal noise (e.g., a 1-bit flip) may cause significant changes to the digital sample values determined based on the interlaced amplitude values. When analog demodulation unit 314 determines that an interlaced amplitude value demodulated from the analog signal is one of the gap values, analog demodulation unit 314 may round the interlaced amplitude value to a nearest one of the non-gap interlaced amplitude values.

Figure 21:
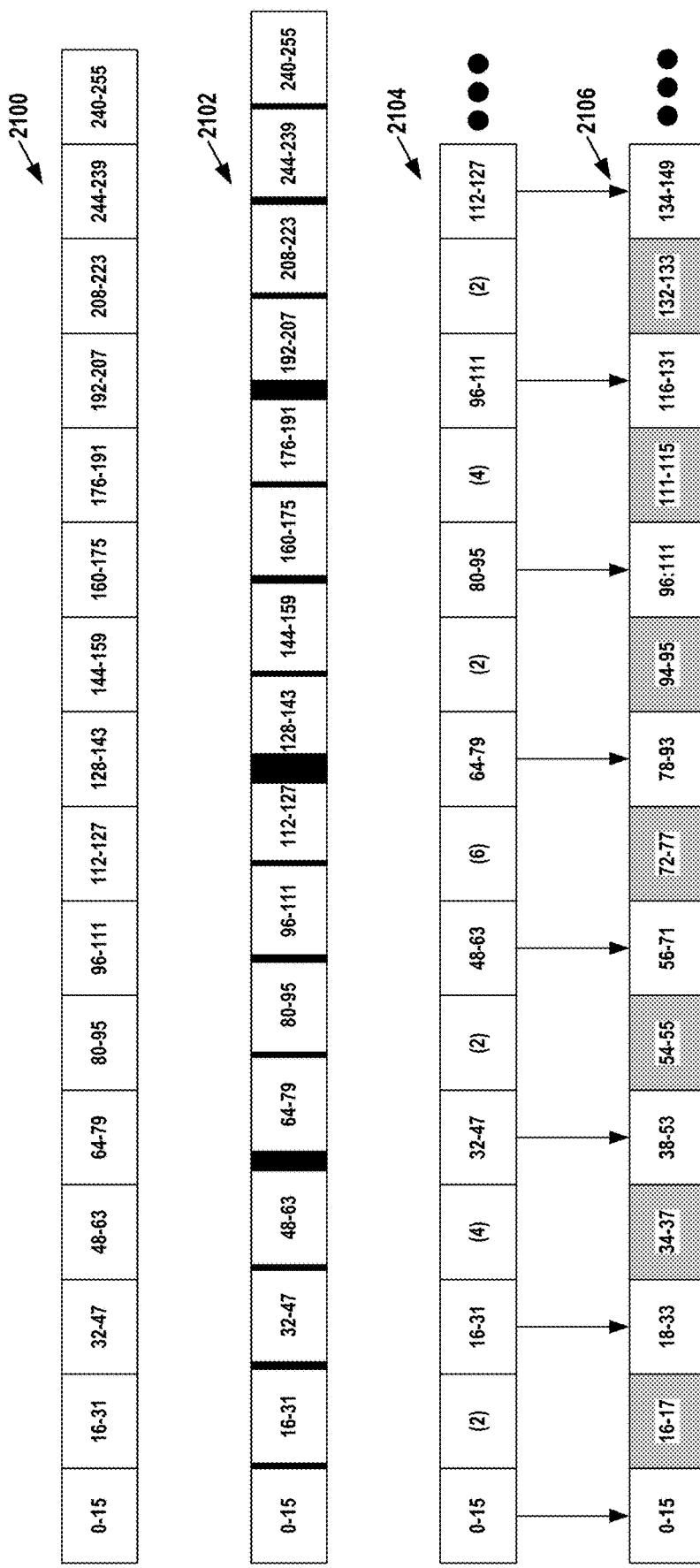
FIG. 21 is a conceptual diagram illustrating gap ranges in accordance with one or more techniques of this disclosure.

FIG. 21 is a conceptual diagram illustrating gap ranges in accordance with one or more techniques of this disclosure. In the example of FIG. 21, number line 2100 corresponds to a range of interlaced amplitude values. Each block in number line 2100 may correspond to series of interlaced amplitude values between noise-vulnerable interlaced amplitude values. Number line 2100 conceptually illustrates the insertion of gap values between noise-vulnerable interlaced amplitude values. Specifically, in the example of FIG. 21, dark bars correspond to ranges of gap values (i.e., gap ranges). The widths of the ranges of gap values may be correlated with (e.g., proportional to or having some other relationship with) the number of changed bits in a binary representation of an interlaced amplitude value from noise that changes a decimal value of the interlaced amplitude value by one value. For instance, as shown in number line 2104 of FIG. 21, 2 gap values may be inserted between 15 and 16, 4 gap values may be inserted between 31 and 32, 2 gap values may be inserted between 47 and 48, and so on.

Thus, as shown in number line 2106 of FIG. 21, analog modulation unit 222 may map interlaced amplitude values 0-15 to alternate interlaced amplitude values 0-15, interlaced amplitude values 16-31 to alternate interlaced amplitude values 18-33, interlaced amplitude values 32-47 to alternate interlaced amplitude values 38-53, interlaced amplitude values 48-63 to alternate interlaced amplitude values 56-71, and so on. Accordingly, analog demodulation unit 314 may convert alternate interlaced amplitude values 0-15 back to corresponding interlaced amplitude values 0-15; convert alternate interlaced amplitude values 16-17 (i.e., gap values) to interlaced amplitude values 15 and 16, respectively, convert alternate interlaced amplitude values 18-33 back to corresponding interlaced amplitude values 16-31; convert alternate interlaced amplitude values 34-35 (i.e., gap values) to interlaced amplitude value 31; convert alternate interlaced amplitude values 36-37 (i.e., gap values) to interlaced amplitude value 32; convert alternate interlaced amplitude values 38-53 to corresponding interlaced amplitude values 32-37; and so on.

FIG. 22 is a flowchart illustrating an example method for encoding video data in accordance with one or more techniques of this disclosure. In the example of FIG. 22, prediction unit 204 may generate prediction data for the video data (2200). Additionally, residual generation unit 212 may generate residual data based on the prediction data and digital sample values of the video data (2202). For example, residual generation unit 212 may subtract digital sample values of the prediction data from corresponding digital sample values of the video data to generate digital sample values of the residual data.

Analog compression unit 214 may generate coefficients based on the residual data (2204). For example, binarization unit 216 may perform a binarization process that generates the coefficients based on the residual data. In this example, quantization unit 218 may perform a quantization process that quantizes the coefficients.

In accordance with a technique of this disclosure, packing unit 220 may perform an interlacing process to generate an interlaced amplitude value (2206). The interlacing process interlaces bits of two or more of the coefficients to generate the interlaced amplitude value. For instance, in the example of FIG. 19, the interlacing process interlaces the bits of two of the coefficients to generate the interlaced amplitude value. In the example of FIG. 20, the interlacing process interlaces the bits of four of the coefficients to generate the interlaced amplitude value. In some examples, packing unit 220 selects, based on a spectral efficiency of a channel through which the analog signal is transmitted, the interlacing process from a plurality of interlacing processes. In some such examples, each of the interlacing processes interlaces a different number of the coefficients to generate the interlaced amplitude value.

Furthermore, video encoder 200 may be configured to generate digital values based on the prediction data (2208). For instance, quantization unit 206 may generate quantized digital sample values based on digital sample values in the prediction data. In this example, entropy encoding unit 208 may perform an entropy-encoding process that generates the digital values based on the quantized digital sample values.

Modem 108 may be configured to output one or more analog signals that are modulated based on the interlaced amplitude values and the digital values (2210). For instance, analog modulation unit 222 may determine an analog symbol corresponding to an amplitude value pair that includes the interlaced amplitude value. Modem 108 may transmit an analog signal during a symbol sampling instant based on a phase shift and power corresponding to the analog symbol. Modem 108 may also transmit an analog signal based on the digital values, e.g., in the manner described with respect to FIG. 4.

In some examples, analog modulation unit 222 performs a mapping process that maps the interlaced amplitude value from an original number line (e.g., number line 2100 of FIG. 21) to a mapped value in an alternate number line (e.g., alternate number line 2106 of FIG. 21) that includes one or more gap ranges. The gap ranges may be located at positions in the original number line correlated with impacts of noise in terms of bit flips in interlaced amplitude values demodulated from analog signals. The mapping process does not map any interlaced amplitude value to any value in any of the one or more gap ranges. Analog modulation unit 222 may generate an amplitude value pair that includes the mapped value. Analog modulation unit 222 may then determine an analog symbol based on the mapped value. Modem 108 may modulate an analog signal based on the analog symbol. Thus, modem 108 may modulate an analog signal based on the mapped value.

FIG. 23 is a flowchart illustrating an example method for decoding video data in accordance with one or more techniques of this disclosure. In the example of FIG. 23, analog demodulation unit 314 may determine an interlaced amplitude value based on an analog signal (2300). In some examples, as part of determining the interlaced amplitude value based on the analog signal, modem 112 may determine an analog symbol corresponding to a phase shift and power for a symbol sampling instant of the analog signal. The interlaced amplitude value may be an I-component or a Q-component of the coordinates of the analog symbol in an I-Q plane.

In some examples, a mapped value may be the I-component or Q-component of the coordinates of the analog symbol in the I-Q plane. The mapped value may have been generated using a mapping process that maps interlaced amplitude values in an original number line (e.g., number line 2100 of FIG. 21) to mapped values in an alternate number line (e.g., alternate number line 2106 of FIG. 21) that includes one or more gap ranges. The gap ranges may be located at positions in the original number line correlated with impacts of noise in terms of bit flips in interlaced amplitude values demodulated from analog signals and the mapping process does not map any of the interlaced amplitude values to any value in any of the one or more gap ranges. In this example, analog demodulation unit 314 may use an inverse of the mapping process to map the mapped value to the interlaced amplitude value. In some instances, the mapped value determined by demodulating the analog signal is in one of the gap ranges. In such instances, the inverse of the mapping process maps mapped values in the gap ranges to interlaced amplitude values in the original number line. In this way, analog demodulation unit 314 may be able to reduce the impact of noise on the analog signal.

Thus, in such examples, analog demodulation unit 314 may demodulate the analog signal to determine a mapped value generated using a mapping process that maps interlaced amplitude values in an original number line to mapped values in an alternate number line that includes one or more gap ranges, wherein the gap ranges are located at positions in the original number line correlated with impacts of noise in terms of bit flips in interlaced amplitude values demodulated from analog signals and the mapping process does not map any of the interlaced amplitude values to any value in any of the one or more gap ranges. Analog demodulation unit 314 may use an inverse of the mapping process to map the mapped value to the interlaced amplitude value.

Furthermore, in the example of FIG. 23, unpacking unit 316 may perform a deinterlacing process to generate two or more coefficients (2302). Bits of the two or more coefficients are interlaced in the interlaced amplitude value. In some examples, the deinterlacing process deinterlaces the bits of two of the coefficients (e.g., the reverse of the interlacing process shown in the example of FIG. 18). In some examples, the deinterlacing process deinterlaces the bits of four of the coefficients (e.g., the reverse of the interlacing process shown in the example of FIG. 19) from the interlaced amplitude value. In some examples, unpacking unit 316 may select, based on data transmitted in one or more analog signal, the deinterlacing process from a plurality of deinterlacing processes. In some such examples, each of the deinterlacing processes deinterlaces a different number of the coefficients.

Analog decompression unit 308 may generate residual data based on the two or more coefficients (2304). For instance, dequantization unit 318 may perform an inverse quantization process that inverse quantizes the coefficients. De-binarization unit 320 may perform a de-binarization process that generates the residual data based on the coefficients.

Additionally, video decoder 300 may obtain digital values (2306). For instance, modem 122 may be configured to obtain the digital values and provide the digital values to video decoder 300. Video decoder 300 may generate prediction data based on the digital values (2308). For instance, entropy decoding unit 304 may perform an entropy-decoding process that generates quantized digital sample values based on the digital values. Dequantization unit 306 may perform an inverse quantization process that generates digital sample values in the prediction data based on the inverse quantized digital sample values. Reconstruction unit 310 of video decoder 300 may reconstruct the video data based on the prediction data and the residual data (2310). For instance, reconstruction unit 310 may add digital sample values of the prediction data to corresponding digital sample values of the residual data to reconstruct digital sample values of the video data.

Figure 24:
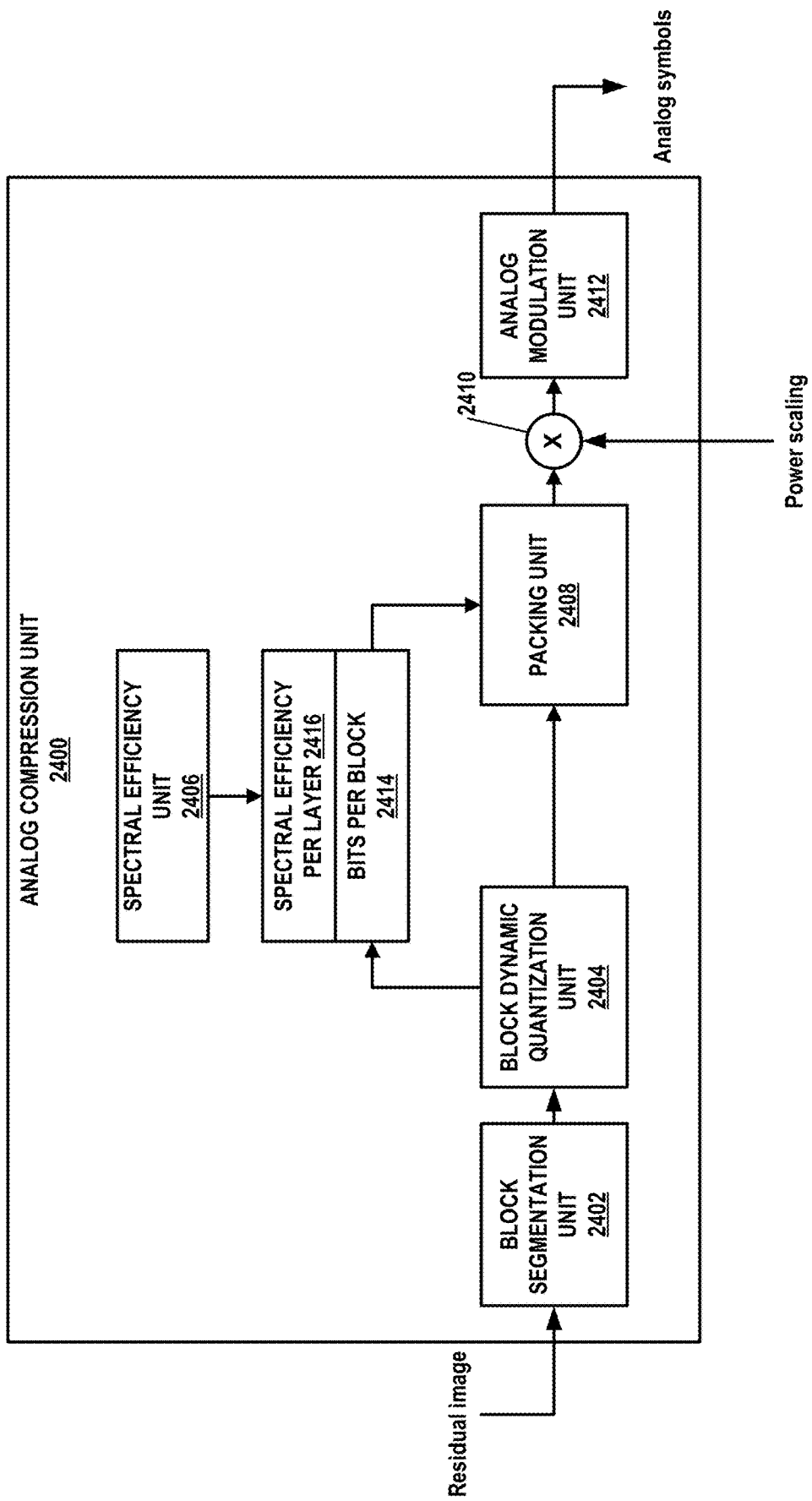
FIG. 24 is a block diagram illustrating an example analog compression unit that uses a variable symbol rate, in accordance with one or more techniques of this disclosure.

FIG. 24 is a block diagram illustrating an example analog compression unit 2400 that uses a variable symbol rate, in accordance with one or more techniques of this disclosure. Analog compression unit 2400 may be used in place of analog compression unit 214 of FIG. 2. In the example of FIG. 24, analog compression unit 2400 may include a block segmentation unit 2402, a block dynamic quantization unit 2404, a spectral efficiency unit 2406, a packing unit 2408, a scaling unit 2410, and an analog modulation unit 2412.

Block segmentation unit 2402 may receive residual data and segment the residual data into 2-dimensional blocks. In other words, block segmentation unit 2402 may divide a residual image of size N into N/K blocks, where K indicates the number of coefficients per block. The K coefficients per block i may be denoted as $b_{0,i}, b_{1,i} \ldots b_{k,i}$, where i=0, 1, . . . , N/K−1. In some examples, block segmentation unit 2404 may adaptively select the sizes of blocks based on one or more characteristics of the content of the blocks. For instance, block segmentation unit 2404 may select a larger block size for blocks in a region of a picture that contains relatively uniform digital sample values and may select smaller block sizes for regions of the picture that contain less uniform digital sample values. In some examples, block segmentation unit 2402 may apply a transform to the residual data of a block to generate coefficients of the block. For instance, block segmentation unit 2402 may apply a DCT (e.g., an integer DCT) or other transform to the residual data of a block to generate coefficients of the block. In some examples, the coefficients of the block may be residual digital sample values.

For each block i, block dynamic quantization unit 2404 may quantize block i to generate quantized coefficients, each of which consists of Q bits. The value of Q may be different for different blocks. Thus, this disclosure may denote the number of bits used to quantize coefficients of block i as $Q_i$. The quantized coefficients c of block i (where block i has size k) are denoted as $c_{0,i}, c_{1,i}, \ldots, c_{k,i}$.

In some examples, block dynamic quantization unit 2404 may quantize coefficients of a block based on a total entropy of the picture. For example, if the picture includes large areas of homogenous color (e.g., a large area of blue sky), the total entropy of the picture may be relatively low. Hence, when the total entropy of the picture is relatively low, higher levels of quantization may be used without significantly reducing the quality of the picture when decoded. Using higher levels of quantization may reduce the amount of information needed to represent the encoded version of the picture. However, if the picture includes large areas of complex and sharply varying colors, the total entropy of the picture may be relatively high. Hence, when the total entropy of the picture is relatively high, higher levels of quantization may significantly reduce the quality of the picture when decoded. In some examples, block dynamic quantization unit 2404 may use a predefined mapping or formula to translate entropy to a quantization parameter that block dynamic quantization unit 2404 uses to quantize the coefficients of the block. In some examples, block dynamic quantization unit 2404 may quantize the block based on the total entropy of the block itself instead of the total entropy of the picture.

At least partially because block dynamic quantization unit 2404 applies dynamic quantization to the blocks, the number of bits per block (i.e., the number of bits representing each of the quantized coefficients in a block) may vary from block to block. In the example of FIG. 22, block 2414 represents the number of bits.

Spectral efficiency unit 2406 may determine the spectral efficiency of a channel through which source device 102 will send the analog symbols. Methods for determining spectral efficiency may be defined in certain transmission standards, such as the 5G standard. Spectral efficiency may indicate how many bits source device 102 can convey through the channel to destination device 116 in an amplitude value during a symbol sampling instant. In other words, the spectral efficiency may correspond to the number of bits that may be used in an amplitude value.

The spectral efficiency of the channel may change over time. For instance, the spectral efficiency of the channel may change due to environmental conditions (e.g., rain, mist, snow, etc.). In some instances, the spectral efficiency of the channel may change when source device 102 and/or destination device 116 moves into or out of a building. In some instances, the spectral efficiency of the channel may change when source device 102 and/or destination device 116 moves closer or further from a wireless base station. In some instances, the spectral efficiency of the channel may change due to reflections off buildings or natural features.

In some examples, modem 108 may send and receive data using a Multiple Input-Multiple Output (MIMO) method. When transmitting data using a MIMO method, modem 108 may use multiple antennas to send and receive data. Sending data via different antennas may be analogous to sending the data via different channels. There may be different spectral efficiencies for these different channels. In this context, the different channels used in MIMO may be referred to as layers. Hence, spectral efficiency unit 2406 may determine different spectral efficiencies for each layer.

Similar to the discussion above regarding packing unit 220, packing unit 2408 may generate coefficient vectors and determine amplitude values for the coefficient vectors based on a mapping pattern. In the context of FIG. 24, each coefficient in a coefficient vector belongs to the same block. In some instances, there may be a single coefficient vector for a block. In other examples, there may be multiple coefficient vectors for a block. Moreover, similar to the discussion above regarding analog modulation unit 222, analog modulation unit 2412 may determine an analog symbol based on pairs of amplitude values. Analog modulation unit 2412 may modulate an analog signal based on the analog symbol.

In examples where modem 108 uses a MIMO method, the analog symbols determined by analog modulation unit 2412 based on amplitude values may be distributed among the different layers. In examples where modem 108 does not use MIMO (e.g., when only a single antenna is used), there may only be a single layer and spectral efficiency unit 2406 may determine a spectral efficiency of this single layer. In either case, modem 108 may use the same layer to transmit an analog signal representing the analog symbols based on amplitude values for coefficient vectors containing coefficients of the same block (i.e., block i). Hence, the spectral efficiency of the layer through which the analog symbols determined based on the amplitude values for coefficient vectors containing quantized coefficients of block i are sent may be denoted as $SE_i$. Similarly, the bits per block for block i may be denoted as $Q_i$.

Packing unit 2408 may use the spectral efficiency per layer 2416 ($SE_i$) and bits per block 2414 ($Q_i$) for block i when packing unit 2408 is performing a packing operation to convert a coefficient vector containing quantized coefficients of the block into an amplitude value. More specifically, packing unit 2408 may dynamically select, e.g., on a block-by-block basis, the dimensionality of the mapping pattern that packing unit 2408 uses to determine an amplitude value for a coefficient group. Stated another way, packing unit 2408 may dynamically select, e.g., on a block-by-block basis, the number of coefficients n in each coefficient vector. Because a higher value of n may lead to greater compression in terms of number of bits used to represent the amplitude value for a coefficient vector relative to the number of bits used to represent the coefficients in the coefficient vector, and because lower values of n may lead to less compression, the amplitude values determined by packing unit 2408 may have a variable bit rate. The value n for a block i may be denoted as $n_i$.

As mentioned above, packing unit 2408 may determine the mapping pattern based on the bits per block 2414 (i.e., $Q_i$) and the spectral efficiency per layer 2416 (i.e., $SE_i$). For example, packing unit 2408 may use a predefined 2-dimensional table having one dimension for $SE_i$ and one dimension for $Q_i$. Values in cells of the table indicate the value of $n_i$ (i.e., the number of coefficients in a coefficient vector containing coefficients of block i). In some examples, packing unit 2408 may determine the value of $n_i$ by dividing $SE_i$ by $Q_i$. In other words, $SE_i$ may be approximately equal to $n_i$ multiplied by $Q_i$.

In some examples, packing unit 2408 may determine the value $n_i$ based on $SE_i$ and $Q_i$. Packing unit 2408 may determine a mapping pattern that uses a $n_i$-dimensional space. In some examples, packing unit 2408 may select from among multiple mapping patterns that use the same $n_i$-dimensional space. In some examples, the mapping pattern may be asymmetric in the sense that there may be more allowed values (e.g., allowed values of quantized coefficients) in some dimensions than other dimensions. For instance, with reference to the example of FIG. 9, there may be more available numbers in the x axis than in the y axis. The use of such asymmetric mapping patterns may be useful in examples where $Q_i$ for block i is different from $Q_i$ for a block j. In an example where $Q_i$ is equal to 2 and $SE_i$ is equal to 8 bits, four quantized coefficients (i.e., $n_i=4$) that each contain 2 bits (i.e., $Q_i=2$) can be packed into a single 8-bit amplitude value. In another example, if $SE_i$ is equal to 8 bits, $Q_i$ is equal to 4, and $Q_1$ is equal to 2, packing unit 2408 may pack one quantized coefficient of block i and 2 quantized coefficients of block j to generate a single amplitude value.

Because the value of n may change from block to block, video encoder 200 may transmit the value of n to video decoder 300. In some examples, video encoder 200 may transmit the value of n through the digital path. In some examples, video encoder 200 may transmit the value of n when the value of n changes but does not necessarily transmit the value of n separately for each block.

Power scaling unit 2410 multiplies the amplitude values by dynamically selected scaling values. In this way, power scaling unit 2410 may generate scaled amplitude values. Power scaling unit 2410 may select the scaling values to ensure consistent power output of the amplitude values. Furthermore, in the example of FIG. 24, analog modulation unit 2412 may modulate an analog signal based on the scaled amplitude values. For instance, in some examples, analog modulation unit 2412 may determine an analog symbol based on a pair of the scaled amplitude values. Modem 108 may transmit the analog signal such that during a symbol sampling instant corresponding to the analog symbol, the analog signal has the phase shift and power corresponding to the analog symbol.

An analog decompression unit configured to work with respect to the analog compression unit 2400 of FIG. 24 may generally operate in a manner similar to analog decompression unit 308 (and components thereof) as discussed elsewhere in this disclosure. However, in some examples, unpacking unit 316 may obtain an indication of the value of n (which video encoder 200 may signal via the digital path) and may use an appropriate mapping pattern for the received value of n to unpack coefficients from amplitude values.

Figure 25:
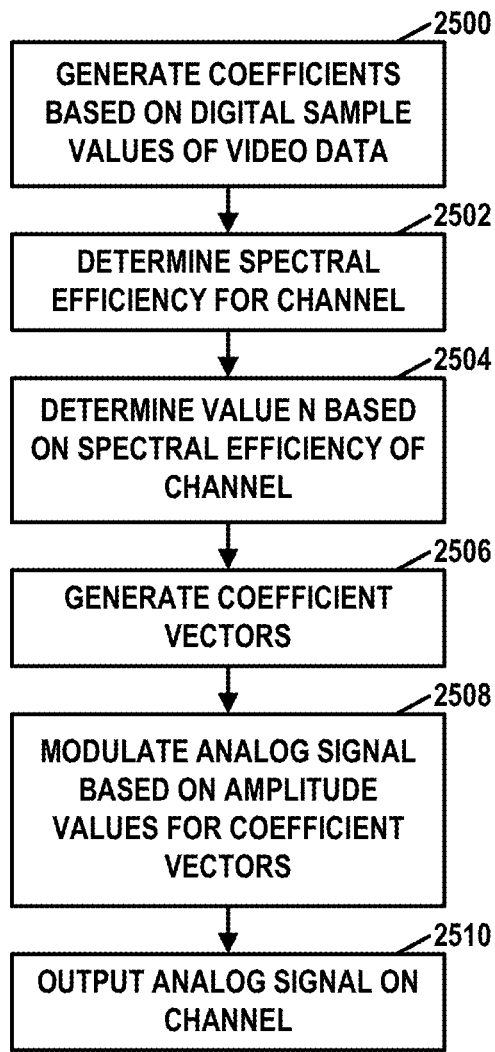
FIG. 25 is a flowchart illustrating an example method for encoding video data in accordance with one or more techniques of this disclosure.

FIG. 25 is a flowchart illustrating an example method for encoding video data in accordance with one or more techniques of this disclosure. In the example of FIG. 25, video encoder 200 may generate coefficients based on digital sample values of the video data (2500). In some examples, as part of generating the coefficients based on the video data, prediction unit 204 (FIG. 2) may generate prediction data for the video data. Residual generation unit 212 may generate residual data based on the prediction data and digital sample values of the video data. Analog compression unit 214 may generate the coefficients based on a block of digital sample values in the residual data. For instance, binarization unit 216 may perform a binarization process that generates the coefficients based on the residual data and block dynamic quantization unit 2404 may perform a quantization process that quantizes the coefficients. Furthermore, in some examples, video encoder 200 may generate digital values based on the prediction data. For instance, quantization unit 206 may quantize digital sample values of the prediction data and entropy encoding unit 208 may entropy encode the quantized digital sample values to generate the digital values. Modem 108 may be configured to transmit the digital values. For instance, modem 108 may be configured to generate bit sequences based on the digital values and modulate an analog signal based on the bit sequences.

Additionally, spectral efficiency unit 2406 may determine a spectral efficiency for a channel (2502). Furthermore, packing unit 2408 may determine a value n based on the spectral efficiency of the channel and a number of bits in quantized coefficients of the block (2504). For instance, packing unit 2408 may look up the value n based on the spectral efficiency of the channel and the number of bits in quantized coefficients of the block. In some examples, modem 108 is configured to output data indicating the spectral efficiency for the channel. In some examples, modem 108 is configured to output data indicating the value n.

Additionally, packing unit 2408 may generate coefficient vectors (2506). Each of the coefficient vectors includes n of the coefficients. For each of the coefficient vectors, packing unit 2408 may determine an amplitude value for the coefficient vector based on a mapping pattern. For each respective allowed coefficient vector in a plurality of allowed coefficient vectors, the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values. For example, packing unit 2408 may determine a position in the n-dimensional space. Coordinates of the position in the n-dimensional space are based on the coefficients of the coefficient vector and the mapping pattern maps different positions in the n-dimensional space to different amplitude values in the plurality of amplitude values. In this example, packing unit 2408 may determine the amplitude value for the coefficient vector as the amplitude value corresponding to the determined position in the n-dimensional space.

Source device 102 may modulate an analog signal based on the amplitude values for the coefficient vectors (2508). For instance, analog modulation unit 222 may determine analog symbols based on amplitude values and modem 108 may be configured to modulate the analog based on phase shifts and power corresponding to the analog symbols. Modem 108 may output the analog signal on the channel (2510).

Figure 26:
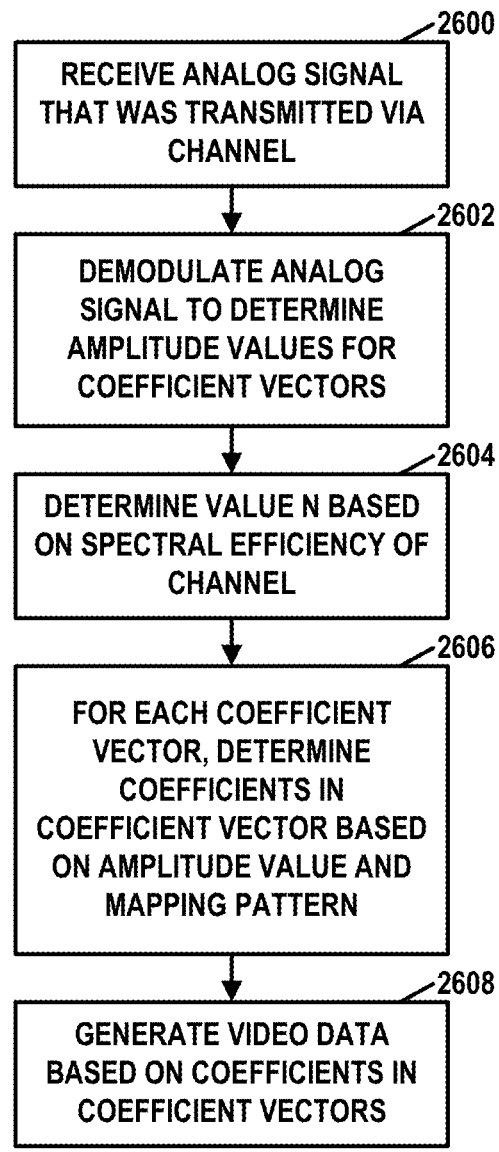
FIG. 26 is a flowchart illustrating an example method for decoding video data in accordance with one or more techniques of this disclosure.

FIG. 26 is a flowchart illustrating an example method for decoding video data in accordance with one or more techniques of this disclosure. In the example of FIG. 26, modem 122 of destination device 116 (FIG. 1) may be configured to receive an analog signal that was transmitted via a channel (2600).

Analog demodulation unit 314 (FIG. 3) may demodulate the analog signal to determine amplitude values for a plurality of coefficient vectors (2602). Analog demodulation unit 314 may demodulate the analog signal to determine the amplitude values as described in any of the examples provided elsewhere in this disclosure.

Unpacking unit 316 may determine a value n (2604). The value n is based on at the spectral efficiency of the channel (e.g., SEi) and a number of bits in quantized coefficients of the block (e.g., $Q_i$). For instance, unpacking unit 316 may determine the value of n by dividing $SE_i$ by $Q_i$. In some examples, modem 133 is configured to receive data indicating the spectral efficiency for the channel.

For each of the coefficient vectors, unpacking unit 316 may determine coefficients in the coefficient vector based on the amplitude value for the coefficient vector and a mapping pattern (2606). For each respective allowed coefficient vector in a plurality of allowed coefficient vectors, the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values. In some examples, as part of determining the coefficients in the coefficient vector, the unpacking unit 316 may determine the coefficients in the coefficient vector as coordinates of a position in the n-dimensional space that corresponds to the amplitude value, wherein the mapping pattern maps different positions in the n-dimensional space to different amplitude values in the plurality of amplitude values.

Furthermore, video decoder 300 may generate the video data based on the coefficients in the coefficient vectors (2608). In some examples, modem 122 may be configured to output digital values based on a received signal. In this example, video decoder 300 may generate prediction data based on the digital values. For instance, entropy decoding unit 304 may entropy decode the digital values to generate quantized digital sample values and dequantization unit 306 may inverse quantize the quantized digital sample values to generate the prediction data. Analog decompression unit 308 may generate a block of digital sample values in residual data based on the coefficients. For instance, dequantization unit 318 of analog decompression unit 308 may perform an inverse quantization process that inverse quantizes the coefficients and de-binarization unit 320 may perform a de-binarization process that generates the residual data based on the coefficients. Reconstruction unit 310 may generate digital sample values of the video data based on the residual data and the prediction data. For instance, reconstruction unit 310 may add digital sample values of the residual data to corresponding digital sample values of the prediction data to generate the digital sample values of the video data.

Examples in the various aspects of this disclosure may be used individually or in any combination.

The following is a non-limiting list of aspects that are in accordance with one or more techniques of this disclosure.

Aspect 1A. A method of encoding video data, the method comprising: generating coefficients based on the video data; generating coefficient vectors, wherein each of the coefficient vectors includes n of the coefficients; for each of the coefficient vectors, determining an amplitude value for the coefficient vector based on a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values; modulating an analog signal based on the amplitude values for the coefficient vectors; and outputting the analog signal.

Aspect 2A. The method of aspect 1A, wherein determining the amplitude value for the coefficient vector comprises: determining a position in the n-dimensional space, wherein coordinates of the position in the n-dimensional space are based on the coefficients of the coefficient vector, and the mapping pattern maps different positions in the n-dimensional space to different amplitude values in the plurality of amplitude values; and determining the amplitude value for the coefficient vector as the amplitude value corresponding to the determined position in the n-dimensional space.

Aspect 3A. The method of aspects 1A or 2A, wherein the mapping pattern maps unsigned coefficients to an unsigned amplitude value.

Aspect 4A. The method of aspects 1A or 2A, wherein the mapping pattern maps signed coefficients to a signed amplitude value.

Aspect 5A. The method of aspects 1A or 2A, wherein the mapping pattern maps unsigned coefficients to a signed amplitude value.

Aspect 6A. The method of any of aspects 1A-5A, wherein n is greater than or equal to 2.

Aspect 7A. The method of any of aspects 1A-3A or 5A-6A, wherein: generating the coefficients based on the video data comprises: generating initial coefficients based on the video data; generating sign values indicating positive/negative signs of the initial coefficients; and generating the coefficients as absolute values of the initial coefficients, and the method further comprises signaling data representing the sign values.

Aspect 8A. The method of any of aspects 1A-3A or 5A-6A, wherein: the coefficients are non-negative versions of initial coefficients, generating the coefficients based on the video data comprises: generating the initial coefficients based on the video data; determining a shift value based on a most-negative initial coefficient of the initial coefficients; and performing a process that transforms the initial coefficients based on the shift value to the non-negative versions of the initial coefficients, and the method further comprises signaling data representing the shift value.

Aspect 9A. The method of any of aspects 1A, 2A, 4A, and 6A-8A, wherein the coefficient vector includes one or more negative coefficients and one or more positive coefficients.

Aspect 10A. The method of any of aspects 1A-9A, wherein: generating the coefficients based on the video data comprises: generating prediction data for the video data; generating residual data based on the prediction data and digital sample values in the video data; and generating the coefficients based on the residual data, and the method further comprises: generating digital values based on the prediction data; and transmitting the digital values.

Aspect 11A. The method of aspect 10A, wherein generating the coefficients based on the residual data comprises: performing a binarization process that generates the coefficients based on the residual data; and performing a quantization process that quantizes the coefficients.

Aspect 12A. The method of aspects 10A or 11A, wherein generating the digital values based on the prediction data comprises: generating quantized digital sample values based on digital sample values in the prediction data; and performing an entropy-encoding process that generates the digital values based on the quantized digital sample values.

Aspect 13A. A method of decoding video data, the method comprising: determining, based on an analog signal, amplitude values for a plurality of coefficient vectors; for each of the coefficient vectors, determining coefficients in the coefficient vector based on the amplitude value for the coefficient vector and a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values; and generating the video data based on the coefficients in the coefficient vectors.

Aspect 14A. The method of aspect 13A, wherein determining coefficients in the coefficient vector based on the amplitude value for the coefficient vector comprises: determining the coefficients in the coefficient vector as coordinates of a position in the n-dimensional space that corresponds to the amplitude value, wherein the mapping pattern maps different positions in the n-dimensional space to different amplitude values in the plurality of amplitude values.

Aspect 15A. The method of aspects 13A or 14A, wherein the mapping pattern maps unsigned coefficients to an unsigned amplitude value.

Aspect 16A. The method of aspects 13A or 14A, wherein the mapping pattern maps signed coefficients to a signed amplitude value.

Aspect 17A. The method of aspect 13A or 14A, wherein the mapping pattern maps unsigned coefficients to a signed amplitude value.

Aspect 18A. The method of any of aspects 13A-17A, wherein determining the amplitude values for the plurality of coefficient vectors comprises: determining an analog symbol corresponding to a phase shift and a power for a symbol sampling instant of the analog signal; and determining the amplitude value for the coefficient vector as one of the coordinates of the analog symbol in an I-Q plane.

Aspect 19A. The method of any of aspects 13A-18A, wherein n is greater than or equal to 2.

Aspect 20A. The method of any of aspects 13A-15A or 17A-19A, wherein determining the coefficients in the coefficient vector based on the amplitude value and the mapping pattern comprises: obtaining sign values via a digital path of a modem, wherein the sign values indicate positive/negative signs of the coefficients in the coefficient vector; determining, based on the amplitude value for the coefficient vector and the mapping pattern, absolute values of the coefficients in the coefficient vector; and reconstructing the coefficients in the coefficient vector at least in part by applying the sign values to the absolute values of the coefficients in the coefficient vector.

Aspect 21A. The method of any of aspects 13A-15A or 17A-19A, wherein determining the coefficients in the coefficient vector based on the amplitude value and the mapping pattern comprises: obtaining, via a digital path of a modem, data representing a shift value, wherein the shift value indicates a most-negative coefficient of the coefficients in the coefficient vector; determining, based on the amplitude value for the coefficient vector and the mapping pattern, intermediate values of the coefficients in the coefficient vector; and reconstructing the coefficients in the coefficient vector at least in part by adding the shift value to each of the intermediate values of the coefficients in the coefficient vector.

Aspect 22A. The method of any of aspects 13A, 14A, 16A, or 18A-21A, wherein the coefficient vector includes one or more negative coefficients and one or more positive coefficients.

Aspect 23A. The method of any of aspects 13A-22A, wherein generating the video data based on the coefficients in the coefficient vector comprises: obtaining digital values via a digital path of a modem; generating prediction data based on the digital values; generating residual data based on the coefficients in the coefficient vectors; and generating the video data based on the prediction data and the residual data.

Aspect 24A. The method of aspect 23A, wherein generating the residual data based on the coefficients in the coefficient vectors comprises: performing an inverse quantization process that inverse quantizes the coefficients in the coefficient vectors; and performing a de-binarization process that generates the residual data based on the inverse-quantized coefficients in the coefficient vectors.

Aspect 25A. The method of any of aspects 23A-24A, wherein generating the prediction data based on the digital values comprises: performing an entropy-decoding process that generates the digital sample values based on the digital values; and generating the prediction data at least in part by inverse quantizing the digital sample values.

Aspect 26A. A device for encoding video data, the device comprising: one or more processors implemented in circuitry, the one or more processors configured to: generate coefficients based on video data; generate coefficient vectors, wherein each of the coefficient vectors includes n of the coefficients; and for each of the coefficient vectors, determine an amplitude value for the coefficient vector based on a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values; and a modem configured to modulate an analog signal based on the amplitude values for the coefficient vectors.

Aspect 27A. The device of aspect 26A, wherein the one or more processors are configured such that, as part of determining the amplitude value for the coefficient vector, the one or more processors: determine a position in the n-dimensional space, wherein coordinates of the position in the n-dimensional space are based on the coefficients of the coefficient vector, and the mapping pattern maps different positions in the n-dimensional space to different amplitude values in the plurality of amplitude values; and determine the amplitude value for the coefficient vector as the amplitude value corresponding to the determined position in the n-dimensional space.

Aspect 28A. The device of aspects 26A or 27A, wherein the mapping pattern maps unsigned coefficients to an unsigned amplitude value.

Aspect 29A. The device of any of aspects 26A-28, wherein the mapping pattern maps signed coefficients to a signed amplitude value.

Aspect 30A. The device of any of aspects 26A-28A, wherein the mapping pattern maps unsigned coefficients to a signed amplitude value.

Aspect 31A. The device of any of aspects 26A-30A, wherein n is greater than or equal to 2.

Aspect 32A. The device of any of aspects 26A-28A or 30A-31A, wherein: the one or more processors are configured such that, as part of generating the coefficients based on the residual data, the one or more processors: generate initial coefficients based on the residual data; generate sign values indicating positive/negative signs of the initial coefficients; and generate the coefficients as absolute values of the initial coefficients, and the modem is configured to transmit the sign values via a digital path.

Aspect 33A. The device of any of aspects 26A-28A or 30A-31A, wherein: the coefficients are non-negative versions of initial coefficients, the one or more processors are configured such that, as part of generating the coefficients based on the residual data, the one or more processors: generate the initial coefficients based on the residual data; determine a shift value based on a most-negative initial coefficient of the initial coefficients; and perform a process that transforms the initial coefficients based on the shift value to the non-negative versions of the initial coefficients, and the method further comprises signaling data representing the shift value.

Aspect 34A. The device of any of aspects 26A-27A, 29A, or 31A-33A, wherein the coefficient vector includes one or more negative coefficients and one or more positive coefficients.

Aspect 35A. The device of any of aspects 26A-34A, wherein: the one or more processors are configured such that, as part of generating the coefficients based on the video data, the one or more processors: generate prediction data for the video data; generate residual data based on the prediction data and digital sample values in the video data; and generate the coefficients based on the residual data, the one or more processors are further configured to generate digital values based on the prediction data, and the modem is configured to transmit the digital values.

Aspect 36A. The device of aspect 35A, wherein the one or more processors are configured such that, as part of generating the coefficients based on the residual data, the one or more processors: perform a binarization process that generates the coefficients based on the residual data; and perform a quantization process that quantizes the coefficients.

Aspect 37A. The device of any of aspects 35A-36A, wherein the one or more processors are configured such that, as part of generating the digital values based on the prediction data, the one or more processors: generate quantized digital sample values based on digital sample values in the prediction data; and perform an entropy-encoding process that generates the digital values based on the quantized digital sample values.

Aspect 38A. The device of any of aspects 26A-37A, wherein the device comprises one or more of a camera, a computer, a mobile device, a broadcast receiver device, or a set-top box.

Aspect 39A. A device for decoding video data, the device comprising: a modem configured to receive an analog signal; and one or more processors implemented in circuitry, the one or more processors configured to: determine, based on the analog signal, amplitude values for a plurality of coefficient vectors; for each of the coefficient vectors, determine coefficients in the coefficient vector based on the amplitude value for the coefficient vector and a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values; and generate video data based on the coefficients in the coefficient vectors.

Aspect 40A. The device of aspect 39A, wherein the one or more processors are configured such that, as part of determining coefficients in the coefficient vector based on the amplitude value for the coefficient vector, the one or more processors: determine the coefficients in the coefficient vector as coordinates of a position in the n-dimensional space that corresponds to the amplitude value, wherein the mapping pattern maps different positions in the n-dimensional space to different amplitude values in the plurality of amplitude values.

Aspect 41A. The device of aspects 39A or 40A, wherein the mapping pattern maps unsigned coefficients to an unsigned amplitude value.

Aspect 42A. The device of aspects 39A or 40A, wherein the mapping pattern maps signed coefficients to a signed amplitude value.

Aspect 43A. The device of aspects 39A or 40A, wherein the mapping pattern maps unsigned coefficients to a signed amplitude value.

Aspect 44A. The device of any of aspects 39A-43A, wherein: the modem is configured to determine an analog symbol corresponding to a phase shift and a power for a symbol sampling instant of the analog signal, and wherein the one or more processors are configured such that, as part of determining the amplitude values for the plurality of coefficient vectors, the one or more processors determine the amplitude value for the coefficient vector as one of the coordinates of the analog symbol in an I-Q plane.

Aspect 45A. The device of any of aspects 39A-44A, wherein n is greater than or equal to 2.

Aspect 46A. The device of any of aspects 39A-41A or 43A-45A, wherein the one or more processors are configured such that, as part of determining the coefficients in the coefficient vector based on the amplitude value and the mapping pattern, the one or more processors: obtain sign values via a digital path of the modem, wherein the sign values indicate positive/negative signs of the coefficients in the coefficient vector; determine, based on the amplitude value for the coefficient vector and the mapping pattern, absolute values of the coefficients in the coefficient vector; and reconstruct the coefficients in the coefficient vector at least in part by applying the sign values to the absolute values of the coefficients in the coefficient vector.

Aspect 47A. The device of any of aspects 39A-41A or 43A-45A, wherein the one or more processors are configured such that, as part of determining the coefficients in the coefficient vector based on the amplitude value and the mapping pattern, the one or more processors: obtain, via a digital path of the modem, data representing a shift value, wherein the shift value indicates a most-negative coefficient of the coefficients in the coefficient vector; determine, based on the amplitude value for the coefficient vector and the mapping pattern, intermediate values of the coefficients in the coefficient vector; and reconstruct the coefficients in the coefficient vector at least in part by adding the shift value to each of the intermediate values of the coefficients in the coefficient vector.

Aspect 48A. The device of any of aspects 39A-40A, 42A, 44A-47A, wherein the coefficient vector includes one or more negative coefficients and one or more positive coefficients.

Aspect 49A. The device of any of aspects 39A-48A, wherein the one or more processors are configured such that, as part of generating the video data based on the coefficients in the coefficient vector, the one or more processors: obtain digital values via a digital path of a modem; generate prediction data based on the digital values; generate prediction data for a current block of the analog video data; generate residual data based on the coefficients in the coefficient vectors; and generate the video data based on the prediction data and the residual data.

Aspect 50A. The device of aspect 49A, wherein the one or more processors are configured such that, as part of generating the residual data based on the coefficients in the coefficient vectors, the one or more processors: perform an inverse quantization process that inverse quantizes the coefficients in the coefficient vectors; and perform a de-binarization process that generates the residual data based on the inverse-quantized coefficients in the coefficient vectors.

Aspect 51A. The device of aspects 49A or 50A, wherein the one or more processors are configured such that, as part of generating the prediction data based on the digital values, the one or more processors: perform an entropy-decoding process that generates the digital sample values based on the digital values; and generate the prediction data at least in part by inverse quantizing the digital sample values.

Aspect 52A. The device of any of aspects 39A-51A, wherein the device comprises one or more of a camera, a computer, a mobile device, a broadcast receiver device, or a set-top box.

Aspect 53A. A device for encoding video data, the device comprising: means for generating coefficients based on video data; means for generating coefficient vectors, wherein each of the coefficient vectors includes n of the coefficients; for each of the coefficient vectors, means for determining an amplitude value for the coefficient vector based on a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values; and means for modulating an analog signal based on the amplitude values for the coefficient vectors.

Aspect 54A. A device for decoding video data, the device comprising: means for determining, based on an analog signal, amplitude values for a plurality of coefficient vectors; for each of the coefficient vectors, means for determining coefficients in the coefficient vector based on the amplitude value for the coefficient vector and a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values; and means for generating video data based on the coefficients in the coefficient vectors.

Aspect 55A. A computer-readable data storage medium having instructions stored thereon that, when executed, cause one or more processors to: generate coefficients based on video data; generate coefficient vectors, wherein each of the coefficient vectors includes n of the coefficients; for each of the coefficient vectors, determine an amplitude value for the coefficient vector based on a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values; and modulate an analog signal based on the amplitude values for the coefficient vectors.

Aspect 56A. A computer-readable data storage medium having instructions stored thereon that, when executed, cause one or more processors to: determine, based on an analog signal, amplitude values for a plurality of coefficient vectors; for each of the coefficient vectors, determine coefficients in the coefficient vector based on the amplitude value for the coefficient vector and a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values; and generate video data based on the coefficients in the coefficient vectors.

Aspect 1B. A method of encoding video data, the method comprising: generating coefficients based on digital sample values of the video data; determining a spectral efficiency for a channel on which to send an analog signal; determining a value n based on the spectral efficiency of the channel; generating coefficient vectors, wherein each of the coefficient vectors includes n of the coefficients; for each of the coefficient vectors, determining an amplitude value for the coefficient vector based on a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values, and modulating the analog signal based on the amplitude values for the coefficient vectors; and outputting the analog signal on the channel.

Aspect 2B. The method of aspect 1B, wherein determining the amplitude value for the coefficient vector comprises: determining a position in the n-dimensional space, wherein coordinates of the position in the n-dimensional space are based on the coefficients of the coefficient vector, and the mapping pattern maps different positions in the n-dimensional space to different amplitude values in the plurality of amplitude values; and determining the amplitude value for the coefficient vector as the amplitude value corresponding to the determined position in the n-dimensional space.

Aspect 3B. The method of any of aspects 1B-2B, wherein: generating the coefficients based on the video data comprises: generating prediction data for the video data; generating residual data based on the prediction data and digital sample values of the video data; and generating the coefficients based on a block of digital sample values in the residual data, and the method further comprises: generating digital values based on the prediction data; and transmitting the digital values.

Aspect 4B. The method of aspect 3B, wherein generating the coefficients based on the video data comprises: performing a binarization process that generates the coefficients based on the residual data; and performing a quantization process that quantizes the coefficients.

Aspect 5B. The method of aspect 4B, wherein determining the value n comprises determining the value n based on the spectral efficiency of the channel and a number of bits in quantized coefficients of the block.

Aspect 6B. The method of any of aspects 1B-5B, further comprising outputting data indicating the spectral efficiency for the channel.

Aspect 7B. A method of decoding video data, the method comprising: receiving an analog signal that was transmitted via a channel; demodulating the analog signal to determine amplitude values for a plurality of coefficient vectors; determining a value n, wherein the value n is based on the spectral efficiency of the channel; for each of the coefficient vectors, determining coefficients in the coefficient vector based on the amplitude value for the coefficient vector and a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values; and generating the video data based on the coefficients in the coefficient vectors.

Aspect 8B. The method of aspect 7B, wherein determining the coefficients in the coefficient vector comprises: determining the coefficients in the coefficient vector as coordinates of a position in the n-dimensional space that corresponds to the amplitude value, wherein the mapping pattern maps different positions in the n-dimensional space to different amplitude values in the plurality of amplitude values.

Aspect 9B. The method of aspects 7B or 8B, wherein: the method further comprises: receiving digital values; generating prediction data based on the digital values; and generating the video data based on the coefficients in the coefficient vectors comprises: generating a block of digital sample values in residual data based on the coefficients, and generating digital sample values of the video data based on the residual data and the prediction data.

Aspect 10B. The method of aspect 9B, wherein generating the block of digital sample values in the residual data based on the coefficients comprises: performing an inverse quantization process that inverse quantizes the coefficients; and performing a de-binarization process that generates the residual data based on the coefficients.

Aspect 11B. The method of aspect 10B, wherein the value n is based on the spectral efficiency of the channel and a number of bits in quantized coefficients of the block.

Aspect 12B. The method of any of aspects 7B-11B, further comprising receiving data indicating the spectral efficiency for the channel.

Aspect 13B. A device for encoding video data, the device comprising: a memory configured to store the video data; one or more processors implemented in circuitry, the one or more processors configured to: generate coefficients based on digital sample values of the video data; determine a spectral efficiency for a channel on which to output an analog signal; determine a value n based on the spectral efficiency of the channel; generate coefficient vectors, wherein each of the coefficient vectors includes n of the coefficients; for each of the coefficient vectors, determine an amplitude value for the coefficient vector based on a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values, and modulate the analog signal based on the amplitude values for the coefficient vectors; and a modem configured to output the analog signal on the channel.

Aspect 14B. The device of aspect 13B, wherein the one or more processors are configured such that, as part of determining the amplitude value for the coefficient vector, the one or more processors: determine a position in the n-dimensional space, wherein coordinates of the position in the n-dimensional space are based on the coefficients of the coefficient vector, and the mapping pattern maps different positions in the n-dimensional space to different amplitude values in the plurality of amplitude values; and determine the amplitude value for the coefficient vector as the amplitude value corresponding to the determined position in the n-dimensional space.

Aspect 15B. The device of any of aspects 13B-14B, wherein: the one or more processors are configured such that, as part of generating the coefficients based on the video data, the one or more processors: generate prediction data for the video data; generate residual data based on the prediction data and digital sample values of the video data; and generate the coefficients based on a block of digital sample values in the residual data, and the one or more processors are further configured to generate digital values based on the prediction data, and the modem is configured to transmit the digital values.

Aspect 16B. The device of aspect 15B, wherein the one or more processors are configured such that, as part of generating the coefficients based on the video data, the one or more processors: perform a binarization process that generates the coefficients based on the residual data; and perform a quantization process that quantizes the coefficients.

Aspect 17B. The device of aspect 16B, wherein the one or more processors are configured such that, as part of determining the value n, the one or more processors determine the value n based on the spectral efficiency of the channel and a number of bits in quantized coefficients of the block.

Aspect 18B. The device of any of aspects 13B-17, wherein the modem is further configured to output data indicating the spectral efficiency for the channel.

Aspect 19B. The device of any of aspects 13B-18B, wherein the device comprises one or more of a camera, a computer, a mobile device, a broadcast receiver device, or a set-top box.

Aspect 20B. A device for decoding video data, the device comprising: a modem configured to receive an analog signal that was transmitted via a channel; one or more processors implemented in circuitry, the one or more processors configured to: demodulate the analog signal to determine amplitude values for a plurality of coefficient vectors; determine a value n, wherein the value n is based on the spectral efficiency of the channel; for each of the coefficient vectors, determine coefficients in the coefficient vector based on the amplitude value for the coefficient vector and a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values; generate the video data based on the coefficients in the coefficient vectors.

Aspect 21B. The device of aspect 20B, wherein the one or more processors are configured such that, as part of determining the coefficients in the coefficient vector, the one or more processors: determine the coefficients in the coefficient vector as coordinates of a position in the n-dimensional space that corresponds to the amplitude value, wherein the mapping pattern maps different positions in the n-dimensional space to different amplitude values in the plurality of amplitude values.

Aspect 22B. The device of aspects 20B or 21B, wherein: the modem is further configured to receive digital values; the one or more processors are further configured to generate prediction data based on the digital values; and the one or more processors are configured such that, as part of generating the video data based on the coefficients in the coefficient vectors, the one or more processors: generate a block of digital sample values in residual data based on the coefficients, and generate digital sample values of the video data based on the residual data and the prediction data.

Aspect 23B. The device of aspect 22B, wherein the one or more processors are configured such that, as part of generating the block of digital sample values in the residual data based on the coefficients, the one or more processors: perform an inverse quantization process that inverse quantizes the coefficients; and perform a de-binarization process that generates the residual data based on the coefficients.

Aspect 24B. The device of aspect 23B, wherein the value n is based on the spectral efficiency of the channel and a number of bits in quantized coefficients of the block.

Aspect 25B. The device of any of aspects 20B-24B, wherein the modem is further configured to receive data indicating the spectral efficiency for the channel.

Aspect 26B. The device of any of aspects 20B-25B, wherein the device comprises one or more of a camera, a computer, a mobile device, a broadcast receiver device, or a set-top box.

Aspect 27B. A device for encoding video data, the device comprising: means for generating coefficients based on digital sample values of the video data; means for determining a spectral efficiency for a channel on which to output an analog signal; means for determining a value n based on the spectral efficiency of the channel; means for generating coefficient vectors, wherein each of the coefficient vectors includes n of the coefficients; for each of the coefficient vectors, means for determining an amplitude value for the coefficient vector based on a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values, and means for modulating the analog signal based on the amplitude values for the coefficient vectors; and means for outputting the analog signal on the channel.

Aspect 28B. A device for decoding video data, the device comprising: means for receiving an analog signal that was transmitted via a channel; means for demodulating the analog signal to determine amplitude values for a plurality of coefficient vectors; means for determining a value n, wherein the value n is based on the spectral efficiency of the channel; for each of the coefficient vectors, means for determining coefficients in the coefficient vector based on the amplitude value for the coefficient vector and a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values; means for generating the video data based on the coefficients in the coefficient vectors.

Aspect 29B. A computer-readable data storage medium having instructions stored thereon that, when executed, cause one or more processors to: generate coefficients based on digital sample values of video data; determine a spectral efficiency for a channel on which to output an analog signal; determine a value n based on the spectral efficiency of the channel; generate coefficient vectors, wherein each of the coefficient vectors includes n of the coefficients; for each of the coefficient vectors, determine an amplitude value for the coefficient vector based on a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values, and modulate the analog signal based on the amplitude values for the coefficient vectors; and output the analog signal on the channel.

Aspect 30B. A computer-readable data storage medium having instructions stored thereon that, when executed, cause one or more processors to: receive an analog signal that was transmitted via a channel; demodulate the analog signal to determine amplitude values for a plurality of coefficient vectors; determine a value n, wherein the value n is based on the spectral efficiency of the channel; for each of the coefficient vectors, determine coefficients in the coefficient vector based on the amplitude value for the coefficient vector and a mapping pattern, wherein for each respective allowed coefficient vector in a plurality of allowed coefficient vectors: the mapping pattern maps the respective allowed coefficient vector to a respective amplitude value in a plurality of amplitude values, and the respective amplitude value is adjacent in an n-dimensional space to at least one other amplitude value in the plurality of amplitude values that is adjacent to the respective amplitude value in a monotonic number line of the amplitude values; and generate video data based on the coefficients in the coefficient vectors.

Aspect 1C. A method of encoding video data, the method comprising: generating prediction data for the video data; generating residual data based on the prediction data and digital sample values of the video data; generating coefficients based on the residual data; performing an interlacing process to generate an interlaced amplitude value, wherein the interlacing process interlaces bits of two or more of the coefficients to generate the interlaced amplitude value; generating digital values based on the prediction data; and outputting one or more analog signals modulated based on the interlaced amplitude value and the digital values.

Aspect 2C. The method of aspect 1C, wherein: the method further comprises performing a mapping process that maps the interlaced amplitude value from an original number line to a mapped value in an alternate number line that includes one or more gap ranges, wherein the gap ranges are located at positions in the original number line correlated with impacts of noise in terms of bit flips in interlaced amplitude values demodulated from analog signals, and the mapping process does not map any interlaced amplitude value to any value in any of the one or more gap ranges, and outputting the one or more analog signals comprises modulating an analog signal based on the mapped value.

Aspect 3C. The method of aspects 1C or 2C, wherein the interlacing process interlaces the bits of two or four of the coefficients.

Aspect 4C. The method of any of aspects 1C-3C, wherein generating the coefficients based on the residual data comprises: performing a binarization process that generates the coefficients based on the residual data; and performing a quantization process that quantizes the coefficients.

Aspect 5C. The method of any of aspects 1C-4C, wherein generating the digital values based on the prediction data comprises: generating quantized digital sample values based on digital sample values in the prediction data; and performing an entropy-encoding process that generates the digital values based on the quantized digital sample values.

Aspect 6C. The method of any of aspects 1C-5C, further comprising selecting, based on a spectral efficiency of a channel through which the analog signal is transmitted, the interlacing process from a plurality of interlacing processes.

Aspect 7C. The method of aspect 6C, wherein each of the interlacing processes interlaces a different number of the coefficients.

Aspect 8C. A method of decoding video data, the method comprising: determining an interlaced amplitude value based on an analog signal; performing a deinterlacing process to generate two or more coefficients, wherein bits of the two or more coefficients are interlaced in the interlaced amplitude value; generating residual data based on the two or more coefficients; obtaining digital values; generating prediction data based on the digital values; and reconstructing the video data based on the prediction data and the residual data.

Aspect 9C. The method of aspect 8C, wherein determining the interlaced amplitude value based on the analog signal comprises: demodulating the analog signal to determine a mapped value generated using a mapping process that maps interlaced amplitude values in an original number line to mapped values in an alternate number line that includes one or more gap ranges, wherein the gap ranges are located at positions in the original number line correlated with impacts of noise in terms of bit flips in interlaced amplitude values demodulated from analog signals and the mapping process does not map any of the interlaced amplitude values to any value in any of the one or more gap ranges; and using an inverse of the mapping process to map the mapped value to the interlaced amplitude value.

Aspect 10C. The method of aspects 9C, wherein: the mapped value determined by demodulating the analog signal is in one of the gap ranges, and the inverse of the mapping process maps mapped values in the gap ranges to values in the original number line.

Aspect 11C. The method of any of aspects 8C-10C, wherein the deinterlacing process deinterlaces the bits of two or four of the coefficients.

Aspect 12C. The method of any of aspects 8C-11C, wherein determining the interlaced amplitude value based on the analog signal comprises: determining an analog symbol corresponding to a phase shift and power for a symbol sampling instant of the analog signal, wherein the interlaced amplitude value is equal to a coordinate of the analog symbol in an I-Q plane.

Aspect 13C. The method of any of aspects 8C-12C, wherein generating the residual data based on the coefficients comprises: performing an inverse quantization process that inverse quantizes the coefficients; and performing a de-binarization process that generates the residual data based on the coefficients.

Aspect 14C. The method of any of aspects 8C-13C, wherein generating the prediction data based on the digital values comprises: performing an entropy-decoding process that generates quantized digital sample values based on the digital values; and performing an inverse quantization process that generates digital sample values in the prediction data based on the inverse quantized digital sample values.

Aspect 15C. The method of any of aspects 8C-13C, further comprising selecting, based on a spectral efficiency of a channel through which the analog signal is transmitted, the deinterlacing process from a plurality of deinterlacing processes.

Aspect 16C. The method of aspect 15C, wherein each of the deinterlacing processes deinterlaces a different number of the coefficients.

Aspect 17C. A device for encoding video data, the device comprising: a memory configured to store the video data, one or more processors implemented in circuitry, the one or more processors configured to: generate prediction data for the video data; generate residual data based on the prediction data and digital sample values of the video data; generate coefficients based on the residual data; perform an interlacing process to generate an interlaced amplitude value, wherein the interlacing process interlaces bits of two or more of the coefficients to generate the interlaced amplitude value; and generate digital values based on the prediction data; and a modem configured to output one or more analog signals modulated based on the interlaced amplitude value and the digital values.

Aspect 18C. The device of aspect 17C, wherein: the one or more processors are further configured to perform a mapping process that maps the interlaced amplitude value from an original number line to a mapped value in an alternate number line that includes one or more gap ranges, wherein the gap ranges are located at positions in the original number line correlated with impacts of noise in terms of bit flips in interlaced amplitude values demodulated from analog signals, and the mapping process does not map any interlaced amplitude value to any value in any of the one or more gap ranges, and the one or more processors are configured such that, as part of outputting the one or more analog signals, the modem modulates an analog signal based on the mapped value.

Aspect 19C. The device of aspects 17C or 18C, wherein the interlacing process interlaces the bits of two or four of the coefficients.

Aspect 20C. The device of any of aspects 17C-19C, wherein the one or more processors are configured such that, as part of generating the coefficients based on the residual data, the one or more processors: perform a binarization process that generates the coefficients based on the residual data; and perform a quantization process that quantizes the coefficients.

Aspect 21C. The device of any of aspects 17C-20C, wherein the one or more processors are configured such that, as part of generating the digital values based on the prediction data, the one or more processors: generate quantized digital sample values based on digital sample values in the prediction data; and perform an entropy-encoding process that generates the digital values based on the quantized digital sample values.

Aspect 22C. The device of any of aspects 17C-21C, wherein the one or more processors are further configured to select, based on a spectral efficiency of a channel through which the analog signal is transmitted, the interlacing process from a plurality of interlacing processes.

Aspect 23C. The device of aspect 22C, wherein each of the interlacing processes interlaces a different number of the coefficients.

Aspect 24C. The device of any of aspects 17C-23C, wherein the device comprises one or more of a camera, a computer, a mobile device, a broadcast receiver device, or a set-top box.

Aspect 25C. A device for decoding video data, the device comprising: a modem configured to obtain an analog signal and digital values; and one or more processors implemented in circuitry, the one or more processors configured to: determine an interlaced amplitude value based on an analog signal; perform a deinterlacing process to generate two or more coefficients, wherein bits of the two or more coefficients are interlaced in the interlaced amplitude value; generate residual data based on the two or more coefficients; obtain digital values; generate prediction data based on the digital values; and reconstruct the video data based on the prediction data and the residual data.

Aspect 26C. The device of aspect 25C, wherein the one or more processors are configured such that, as part of determining the interlaced amplitude value based on the analog signal, the one or more processors: demodulate the analog signal to determine a mapped value generated using a mapping process that maps interlaced amplitude values in an original number line to mapped values in an alternate number line that includes one or more gap ranges, wherein the gap ranges are located at positions in the original number line correlated with impacts of noise in terms of bit flips in interlaced amplitude values demodulated from analog signals and the mapping process does not map any of the interlaced amplitude values to any value in any of the one or more gap ranges; and use an inverse of the mapping process to map the mapped value to the interlaced amplitude value.

Aspect 27C. The device of aspect 26C, wherein: the mapped value determined by demodulating the analog signal is in one of the gap ranges, and the inverse of the mapping process maps mapped values in the gap ranges to values in the original number line.

Aspect 28C. The device of any of aspects 25C-27C, wherein the deinterlacing process deinterlaces the bits of two or four of the coefficients.

Aspect 29C. The device of any of aspects 25C-28C, wherein the one or more processors are configured such that, as part of determining the interlaced amplitude value based on the analog signal, the one or more processors: determine an analog symbol corresponding to a phase shift and power for a symbol sampling instant of the analog signal, wherein the interlaced amplitude value is equal to a coordinate of the analog symbol in an I-Q plane.

Aspect 30C. The device of any of aspects 25C-29C, wherein the one or more processors are configured such that, as part of generating the residual data based on the coefficients, the one or more processors: perform an inverse quantization process that inverse quantizes the coefficients; and perform a de-binarization process that generates the residual data based on the coefficients.

Aspect 31C. The device of any of aspects 25C-30C, wherein the one or more processors are configured such that, as part of generating the prediction data based on the digital values, the one or more processors: perform an entropy-decoding process that generates quantized digital sample values based on the digital values; and perform an inverse quantization process that generates digital sample values in the prediction data based on the inverse quantized digital sample values.

Aspect 32C. The device of aspect 31C, wherein the one or more processors are further configured to select, based on a spectral efficiency of a channel through which the analog signal is transmitted, the deinterlacing process from a plurality of deinterlacing processes.

Aspect 33C. The device of aspect 32C, wherein each of the deinterlacing processes deinterlaces a different number of the coefficients.

Aspect 34C. The device of any of aspects 27C-33C, wherein the device comprises one or more of a camera, a computer, a mobile device, a broadcast receiver device, or a set-top box.

Aspect 35C. A device for encoding video data, the device comprising: means for generating prediction data for the video data; means for generating residual data based on the prediction data and digital sample values of the video data; means for generating coefficients based on the residual data; means for performing an interlacing process to generate an interlaced amplitude value, wherein the interlacing process interlaces bits of two or more of the coefficients to generate the interlaced amplitude value; and means for modulating an analog signal based on the interlaced amplitude value; means for generating digital values based on the prediction data; and means for outputting the analog signal and digital values based on the prediction block.

Aspect 36C. A device for decoding video data, the device comprising: means for determining an interlaced amplitude value based on an analog signal; means for performing a deinterlacing process to generate two or more coefficients, wherein bits of the two or more coefficients are interlaced in the interlaced amplitude value; means for generating residual data based on the two or more coefficients; means for obtaining digital values; means for generating prediction data based on the digital values; and means for reconstructing the video data based on the prediction data and the residual data.

Aspect 37C. A computer-readable data storage medium having instructions stored thereon that, when executed, cause one or more processors to: generate prediction data for video data; generate residual data based on the prediction data and digital sample values of the video data; generate coefficients based on the residual data; perform an interlacing process to generate an interlaced amplitude value, wherein the interlacing process interlaces bits of two or more of the coefficients to generate the interlaced amplitude value; and modulate an analog signal based on the interlaced amplitude value; generate digital values based on the prediction data; and output the analog signal and digital values based on the prediction block.

Aspect 38C. A computer-readable data storage medium having instructions stored thereon that, when executed, cause one or more processors to: determine an interlaced amplitude value based on an analog signal; perform a deinterlacing process to generate two or more coefficients, wherein bits of the two or more coefficients are interlaced in the interlaced amplitude value; generate residual data based on the two or more coefficients; obtain digital values; generate prediction data based on the digital values; and reconstruct video data based on the prediction data and the residual data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors (e.g., programmable processors), such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
generating coefficients based on digital sample values of the video data;
determining a spectral efficiency for a channel on which to send an analog signal;
determining a value n based on the spectral efficiency of the channel;
generating coefficient vectors, wherein each of the coefficient vectors includes n of the coefficients;
for each of the coefficient vectors, determining an amplitude value for the coefficient vector based on a mapping pattern, wherein for each respective allowed coefficient vector in a plurality of allowed coefficient vectors:
the mapping pattern maps the respective allowed coefficient vector to a respective amplitude value in a plurality of amplitude values, and
the respective amplitude value is adjacent in an n-dimensional space to at least one other amplitude value in the plurality of amplitude values that is adjacent to the respective amplitude value in a monotonic number line of the amplitude values, and
modulating the analog signal based on the amplitude values for the coefficient vectors; and
outputting the analog signal on the channel.

2. The method of claim 1, wherein determining the amplitude value for the coefficient vector comprises:
determining a position in the n-dimensional space, wherein coordinates of the position in the n-dimensional space are based on the coefficients of the coefficient vector, and the mapping pattern maps different positions in the n-dimensional space to different amplitude values in the plurality of amplitude values; and
determining the amplitude value for the coefficient vector as the amplitude value corresponding to the determined position in the n-dimensional space.

3. The method of claim 1, wherein:
generating the coefficients based on the video data comprises:
generating prediction data for the video data;
generating residual data based on the prediction data and digital sample values of the video data; and
generating the coefficients based on a block of digital sample values in the residual data, and
the method further comprises:
generating digital values based on the prediction data; and
transmitting the digital values.

4. The method of claim 3, wherein generating the coefficients based on the video data comprises:
performing a binarization process that generates the coefficients based on the residual data; and performing a quantization process that quantizes the coefficients.

5. The method of claim 4, wherein determining the value n comprises determining the value n based on the spectral efficiency of the channel and a number of bits in quantized coefficients of the block.

6. The method of claim 1, further comprising outputting data indicating the spectral efficiency for the channel.

7. A method of decoding video data, the method comprising:
receiving an analog signal that was transmitted via a channel;
demodulating the analog signal to determine amplitude values for a plurality of coefficient vectors;
determining a value n, wherein the value n is based on the spectral efficiency of the channel;
for each of the coefficient vectors, determining coefficients in the coefficient vector based on the amplitude value for the coefficient vector and a mapping pattern, wherein for each respective allowed coefficient vector in a plurality of allowed coefficient vectors:
the mapping pattern maps the respective allowed coefficient vector to a respective amplitude value in a plurality of amplitude values, and
the respective amplitude value is adjacent in an n-dimensional space to at least one other amplitude value in the plurality of amplitude values that is adjacent to the respective amplitude value in a monotonic number line of the amplitude values; and
generating the video data based on the coefficients in the coefficient vectors.

8. The method of claim 7, wherein determining the coefficients in the coefficient vector comprises:
determining the coefficients in the coefficient vector as coordinates of a position in the n-dimensional space that corresponds to the amplitude value, wherein the mapping pattern maps different positions in the n-dimensional space to different amplitude values in the plurality of amplitude values.

9. The method of claim 7, wherein:
the method further comprises:
receiving digital values;
generating prediction data based on the digital values; and
generating the video data based on the coefficients in the coefficient vectors comprises:
generating a block of digital sample values in residual data based on the coefficients, and
generating digital sample values of the video data based on the residual data and the prediction data.

10. The method of claim 9, wherein generating the block of digital sample values in the residual data based on the coefficients comprises:
performing an inverse quantization process that inverse quantizes the coefficients; and
performing a de-binarization process that generates the residual data based on the coefficients.

11. The method of claim 10, wherein the value n is based on the spectral efficiency of the channel and a number of bits in quantized coefficients of the block.

12. The method of claim 7, further comprising receiving data indicating the spectral efficiency for the channel.

13. A device for encoding video data, the device comprising:
a memory configured to store the video data;
one or more processors implemented in circuitry, the one or more processors configured to:
generate coefficients based on digital sample values of the video data;
determine a spectral efficiency for a channel on which to output an analog signal;
determine a value n based on the spectral efficiency of the channel;
generate coefficient vectors, wherein each of the coefficient vectors includes n of the coefficients;
for each of the coefficient vectors, determine an amplitude value for the coefficient vector based on a mapping pattern, wherein for each respective allowed coefficient vector in a plurality of allowed coefficient vectors:
the mapping pattern maps the respective allowed coefficient vector to a respective amplitude value in a plurality of amplitude values, and
the respective amplitude value is adjacent in an n-dimensional space to at least one other amplitude value in the plurality of amplitude values that is adjacent to the respective amplitude value in a monotonic number line of the amplitude values, and
modulate the analog signal based on the amplitude values for the coefficient vectors; and
a modem configured to output the analog signal on the channel.

14. The device of claim 13, wherein the one or more processors are configured such that, as part of determining the amplitude value for the coefficient vector, the one or more processors:
determine a position in the n-dimensional space, wherein coordinates of the position in the n-dimensional space are based on the coefficients of the coefficient vector, and the mapping pattern maps different positions in the n-dimensional space to different amplitude values in the plurality of amplitude values; and
determine the amplitude value for the coefficient vector as the amplitude value corresponding to the determined position in the n-dimensional space.

15. The device of claim 13, wherein:
the one or more processors are configured such that, as part of generating the coefficients based on the video data, the one or more processors:
generate prediction data for the video data;
generate residual data based on the prediction data and digital sample values of the video data; and
generate the coefficients based on a block of digital sample values in the residual data, and
the one or more processors are further configured to generate digital values based on the prediction data, and
the modem is configured to transmit the digital values.

16. The device of claim 15, wherein the one or more processors are configured such that, as part of generating the coefficients based on the video data, the one or more processors:
perform a binarization process that generates the coefficients based on the residual data; and
perform a quantization process that quantizes the coefficients.

17. The device of claim 16, wherein the one or more processors are configured such that, as part of determining the value n, the one or more processors determine the value n based on the spectral efficiency of the channel and a number of bits in quantized coefficients of the block.

18. The device of claim 13, wherein the modem is further configured to output data indicating the spectral efficiency for the channel.

19. The device of claim 13, wherein the device comprises one or more of a camera, a computer, a mobile device, a broadcast receiver device, or a set-top box.

20. A device for decoding video data, the device comprising:
a modem configured to receive an analog signal that was transmitted via a channel;
one or more processors implemented in circuitry, the one or more processors configured to:
demodulate the analog signal to determine amplitude values for a plurality of coefficient vectors;
determine a value n, wherein the value n is based on the spectral efficiency of the channel;
for each of the coefficient vectors, determine coefficients in the coefficient vector based on the amplitude value for the coefficient vector and a mapping pattern, wherein for each respective allowed coefficient vector in a plurality of allowed coefficient vectors:
the mapping pattern maps the respective allowed coefficient vector to a respective amplitude value in a plurality of amplitude values, and
the respective amplitude value is adjacent in an n-dimensional space to at least one other amplitude value in the plurality of amplitude values that is adjacent to the respective amplitude value in a monotonic number line of the amplitude values; and
generate the video data based on the coefficients in the coefficient vectors.

21. The device of claim 20, wherein the one or more processors are configured such that, as part of determining the coefficients in the coefficient vector, the one or more processors:
determine the coefficients in the coefficient vector as coordinates of a position in the n-dimensional space that corresponds to the amplitude value, wherein the mapping pattern maps different positions in the n-dimensional space to different amplitude values in the plurality of amplitude values.

22. The device of claim 20, wherein:
the modem is further configured to receive digital values;
the one or more processors are further configured to generate prediction data based on the digital values; and
the one or more processors are configured such that, as part of generating the video data based on the coefficients in the coefficient vectors, the one or more processors:
generate a block of digital sample values in residual data based on the coefficients, and
generate digital sample values of the video data based on the residual data and the prediction data.

23. The device of claim 22, wherein the one or more processors are configured such that, as part of generating the block of digital sample values in the residual data based on the coefficients, the one or more processors:
perform an inverse quantization process that inverse quantizes the coefficients; and
perform a de-binarization process that generates the residual data based on the coefficients.

24. The device of claim 23, wherein the value n is based on the spectral efficiency of the channel and a number of bits in quantized coefficients of the block.

25. The device of claim 20, wherein the modem is further configured to receive data indicating the spectral efficiency for the channel.

26. The device of claim 20, wherein the device comprises one or more of a camera, a computer, a mobile device, a broadcast receiver device, or a set-top box.

27. A device for encoding video data, the device comprising:
means for generating coefficients based on digital sample values of the video data;
means for determining a spectral efficiency for a channel on which to output an analog signal;
means for determining a value n based on the spectral efficiency of the channel;
means for generating coefficient vectors, wherein each of the coefficient vectors includes n of the coefficients;
for each of the coefficient vectors, means for determining an amplitude value for the coefficient vector based on a mapping pattern, wherein for each respective allowed coefficient vector in a plurality of allowed coefficient vectors:
the mapping pattern maps the respective allowed coefficient vector to a respective amplitude value in a plurality of amplitude values, and
the respective amplitude value is adjacent in an n-dimensional space to at least one other amplitude value in the plurality of amplitude values that is adjacent to the respective amplitude value in a monotonic number line of the amplitude values, and
means for modulating the analog signal based on the amplitude values for the coefficient vectors; and
means for outputting the analog signal on the channel.

28. A device for decoding video data, the device comprising:
means for receiving an analog signal that was transmitted via a channel;
means for demodulating the analog signal to determine amplitude values for a plurality of coefficient vectors;
means for determining a value n, wherein the value n is based on the spectral efficiency of the channel;
for each of the coefficient vectors, means for determining coefficients in the coefficient vector based on the amplitude value for the coefficient vector and a mapping pattern, wherein for each respective allowed coefficient vector in a plurality of allowed coefficient vectors:
the mapping pattern maps the respective allowed coefficient vector to a respective amplitude value in a plurality of amplitude values, and
the respective amplitude value is adjacent in an n-dimensional space to at least one other amplitude value in the plurality of amplitude values that is adjacent to the respective amplitude value in a monotonic number line of the amplitude values; and
means for generating the video data based on the coefficients in the coefficient vectors.

29. A computer-readable data storage medium having instructions stored thereon that, when executed, cause one or more processors to:
generate coefficients based on digital sample values of video data;
determine a spectral efficiency for a channel on which to output an analog signal;
determine a value n based on the spectral efficiency of the channel;
generate coefficient vectors, wherein each of the coefficient vectors includes n of the coefficients;

for each of the coefficient vectors, determine an amplitude value for the coefficient vector based on a mapping pattern, wherein for each respective allowed coefficient vector in a plurality of allowed coefficient vectors:
- the mapping pattern maps the respective allowed coefficient vector to a respective amplitude value in a plurality of amplitude values, and
- the respective amplitude value is adjacent in an n-dimensional space to at least one other amplitude value in the plurality of amplitude values that is adjacent to the respective amplitude value in a monotonic number line of the amplitude values, and modulate the analog signal based on the amplitude values for the coefficient vectors; and output the analog signal on the channel.

30. A computer-readable data storage medium having instructions stored thereon that, when executed, cause one or more processors to:

receive an analog signal that was transmitted via a channel;

demodulate the analog signal to determine amplitude values for a plurality of coefficient vectors;

determine a value n, wherein the value n is based on the spectral efficiency of the channel;

for each of the coefficient vectors, determine coefficients in the coefficient vector based on the amplitude value for the coefficient vector and a mapping pattern, wherein for each respective allowed coefficient vector in a plurality of allowed coefficient vectors:
- the mapping pattern maps the respective allowed coefficient vector to a respective amplitude value in a plurality of amplitude values, and
- the respective amplitude value is adjacent in an n-dimensional space to at least one other amplitude value in the plurality of amplitude values that is adjacent to the respective amplitude value in a monotonic number line of the amplitude values; and generate video data based on the coefficients in the coefficient vectors.

\* \* \* \* \*